(12) United States Patent
Zheng et al.

(10) Patent No.: US 12,088,989 B2
(45) Date of Patent: Sep. 10, 2024

(54) EARPHONE

(71) Applicant: SHENZHEN SHOKZ CO., LTD., Guangdong (CN)

(72) Inventors: Zeying Zheng, Shenzhen (CN); Jiang Xu, Shenzhen (CN); Yonggen Wang, Shenzhen (CN); Haofeng Zhang, Shenzhen (CN); Gan Lai, Shenzhen (CN); Chong Wang, Shenzhen (CN); Liwei Wang, Shenzhen (CN); Ruixin Han, Shenzhen (CN); Lei Zhang, Shenzhen (CN); Junjiang Fu, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 178 days.

(21) Appl. No.: 17/646,492

(22) Filed: Dec. 30, 2021

(65) Prior Publication Data
US 2022/0124428 A1 Apr. 21, 2022

Related U.S. Application Data

(63) Continuation-in-part of application No. PCT/CN2021/109154, filed on Jul. 29, 2021.

(30) Foreign Application Priority Data

Jul. 29, 2020 (CN) .......................... 202010743396.4
Nov. 24, 2020 (CN) .......................... 202011328519.4

(51) Int. Cl.
*H04R 1/10* (2006.01)
*H04R 9/06* (2006.01)

(52) U.S. Cl.
CPC .......... *H04R 1/105* (2013.01); *H04R 1/1016* (2013.01); *H04R 1/1041* (2013.01);
(Continued)

(58) Field of Classification Search
CPC .... H04R 1/105; H04R 1/1016; H04R 1/1041; H04R 1/1083; H04R 1/1091; H04R 9/06
(Continued)

(56) References Cited

U.S. PATENT DOCUMENTS 8,401,219 B2 * 3/2013 Hankey .................. B21C 23/18
381/384
8,449,374 B2 5/2013 Meyer et al.
(Continued)

FOREIGN PATENT DOCUMENTS

CN 202931524 U 5/2013
CN 204539469 U 8/2015
(Continued)

OTHER PUBLICATIONS

Decision of Grant in Russian Application No. 2022130164 mailed on Apr. 28, 2023, 22 pages.
(Continued)

*Primary Examiner* — Disler Paul
(74) *Attorney, Agent, or Firm* — METIS IP LLC

(57) ABSTRACT

The present disclosure discloses an earphone. The earphone may include a hook-shaped component, a connecting component, and a holding component. When the earphone is in a wearing state, the hook-shaped component may be configured to hang between a rear side of an ear of a user and a head of the user. The holding component may be configured to contact a front side of the ear. The connecting component may be configured to connect the hook-shaped component and the holding component and extend from the head to an outside of the head to cooperate with the hook-shaped component to provide the holding component with a pressing force on the front side of the ear.

19 Claims, 17 Drawing Sheets

(52) U.S. Cl.
CPC ......... *H04R 1/1066* (2013.01); *H04R 1/1083* (2013.01); *H04R 1/1091* (2013.01); *H04R 9/06* (2013.01)

(58) Field of Classification Search
USPC ..................................................... 381/72, 74
See application file for complete search history.

(56) References Cited

U.S. PATENT DOCUMENTS

| | | | | |
|---|---|---|---|---|
| 8,885,856 | B2* | 11/2014 | Sacha | H04R 25/65 |
| | | | | 381/322 |
| 8,929,582 | B2* | 1/2015 | Silvestri | H04R 1/1058 |
| | | | | 381/370 |
| 8,938,030 | B2* | 1/2015 | Tseng | H04N 21/6143 |
| | | | | 375/326 |
| 9,369,813 | B2* | 6/2016 | Kvist | H04R 25/554 |
| 10,951,970 | B1* | 3/2021 | Struzik | H04R 1/105 |
| 2007/0172091 | A1 | 7/2007 | Tsai et al. | |
| 2009/0067658 | A1 | 3/2009 | Lin | |
| 2009/0095566 | A1 | 4/2009 | Leong et al. | |
| 2011/0211723 | A1 | 9/2011 | Annunziato et al. | |
| 2012/0189154 | A1 | 7/2012 | Howes et al. | |
| 2013/0182881 | A1* | 7/2013 | Horino | H04R 1/1016 |
| | | | | 381/380 |
| 2016/0337746 | A1 | 11/2016 | Birath | |
| 2017/0048603 | A1 | 2/2017 | Matsuo et al. | |
| 2017/0357214 | A1 | 12/2017 | Choi et al. | |
| 2018/0184187 | A1 | 6/2018 | Silvestri et al. | |
| 2019/0222918 | A1* | 7/2019 | Mackellar | A61B 5/372 |
| 2019/0238976 | A1 | 8/2019 | Silvestri et al. | |
| 2019/0261077 | A1 | 8/2019 | Dominijanni et al. | |
| 2019/0349661 | A1 | 11/2019 | Berg | |
| 2020/0084531 | A1 | 3/2020 | Mainini et al. | |

FOREIGN PATENT DOCUMENTS

| | | |
|---|---|---|
| CN | 104883635 A | 9/2015 |
| CN | 107682765 A | 2/2018 |
| EP | 2303205 | 9/2015 |
| EP | 3425922 A1 | 1/2019 |
| JP | 2015070468 A | 4/2015 |
| WO | 2005053352 A1 | 6/2005 |
| WO | 2021133679 A1 | 7/2021 |

OTHER PUBLICATIONS

The Extended European Search Report in European Application No. 22216662.1 mailed on Apr. 28, 2023, 12 pages.
The Extended European Search Report in European Application No. 21850910.7 mailed on Jul. 11, 2023, 13 pages.
International Search Report in PCT/CN2021/109154 mailed on Nov. 3, 2021, 7 pages.
Written Opinion in PCT/CN2021/109154 mailed on Nov. 3, 2021, 5 pages.
Notice of Preliminary Rejection in Korean Application No. 10-2022-7042942 mailed on Nov. 21, 2023, 8 pages.
Notice of Preliminary Rejection in Korean Application No. 10-2022-7045388 mailed on Nov. 29, 2023, 8 pages.
Notice of Rejection in Japanese Application No. 2022-577715 mailed on Jan. 29, 2024, 14 pages.

* cited by examiner

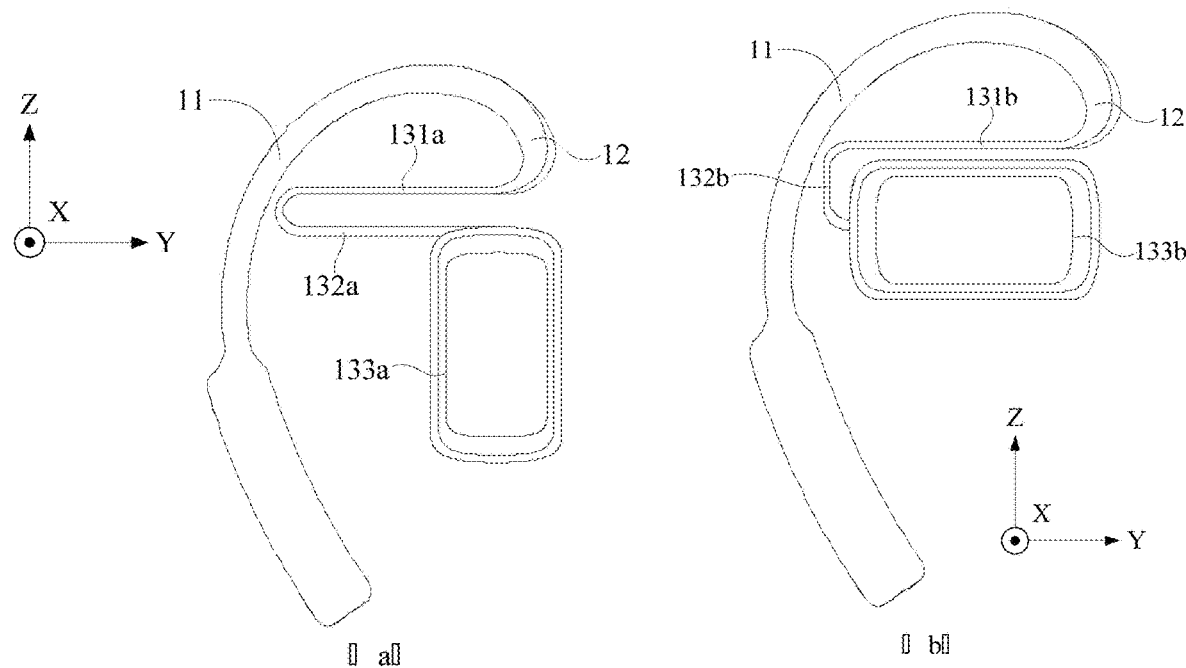
FIG. 13
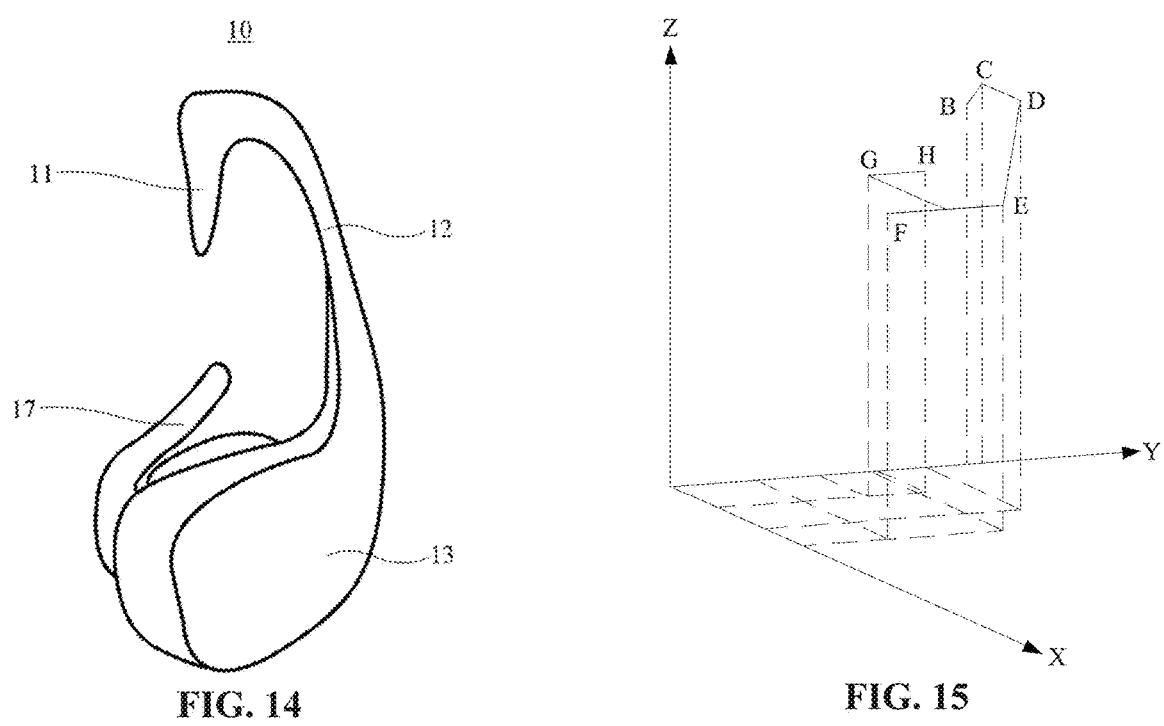
FIG. 14
FIG. 15

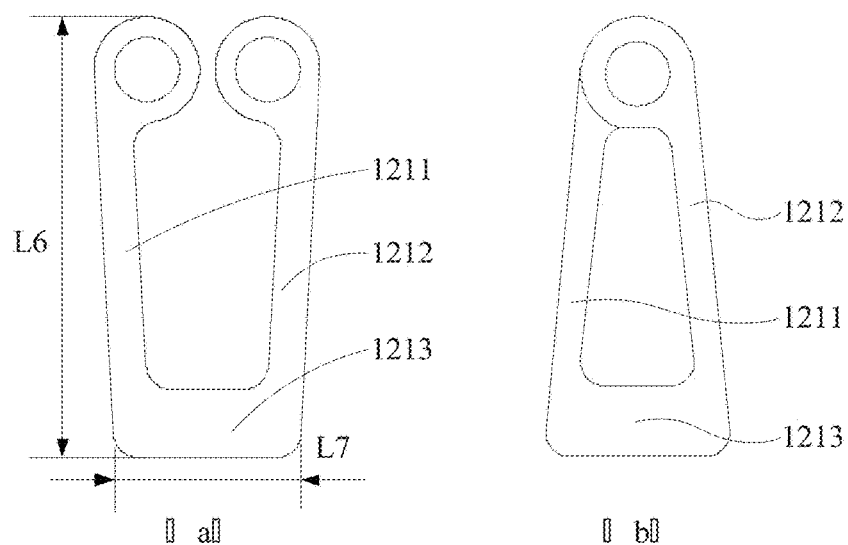
FIG. 23
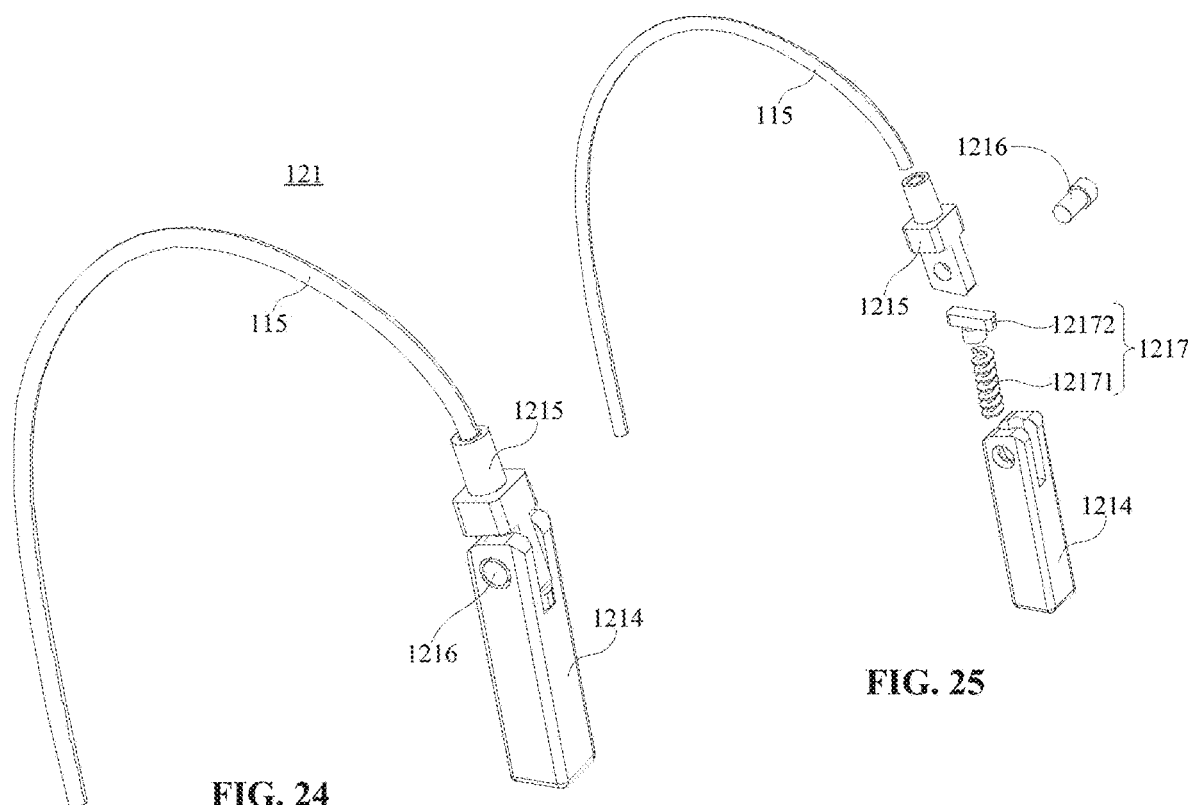
FIG. 24
FIG. 25

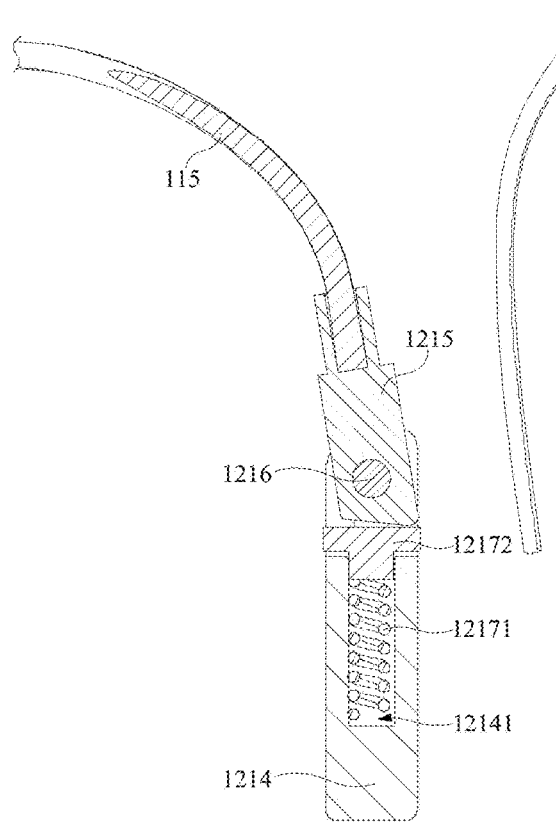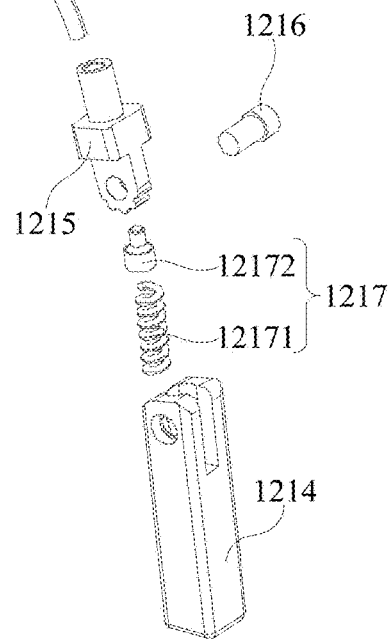
FIG. 26  FIG. 27
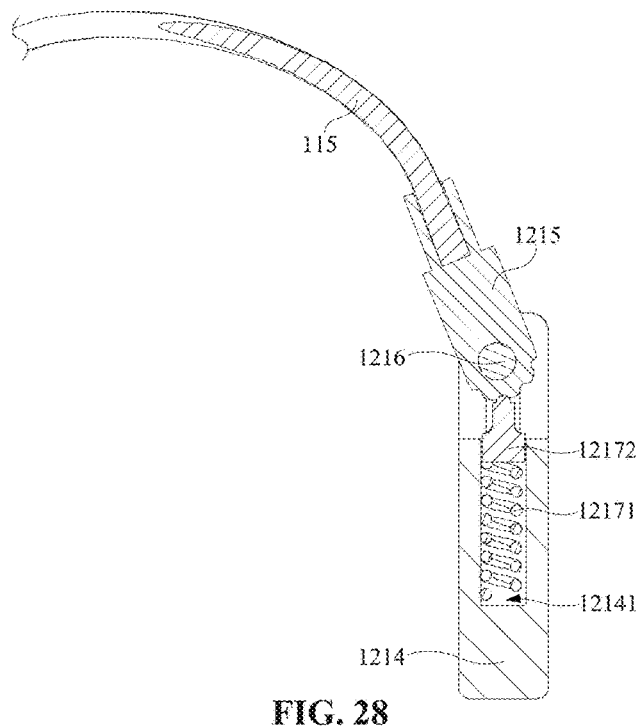
FIG. 28

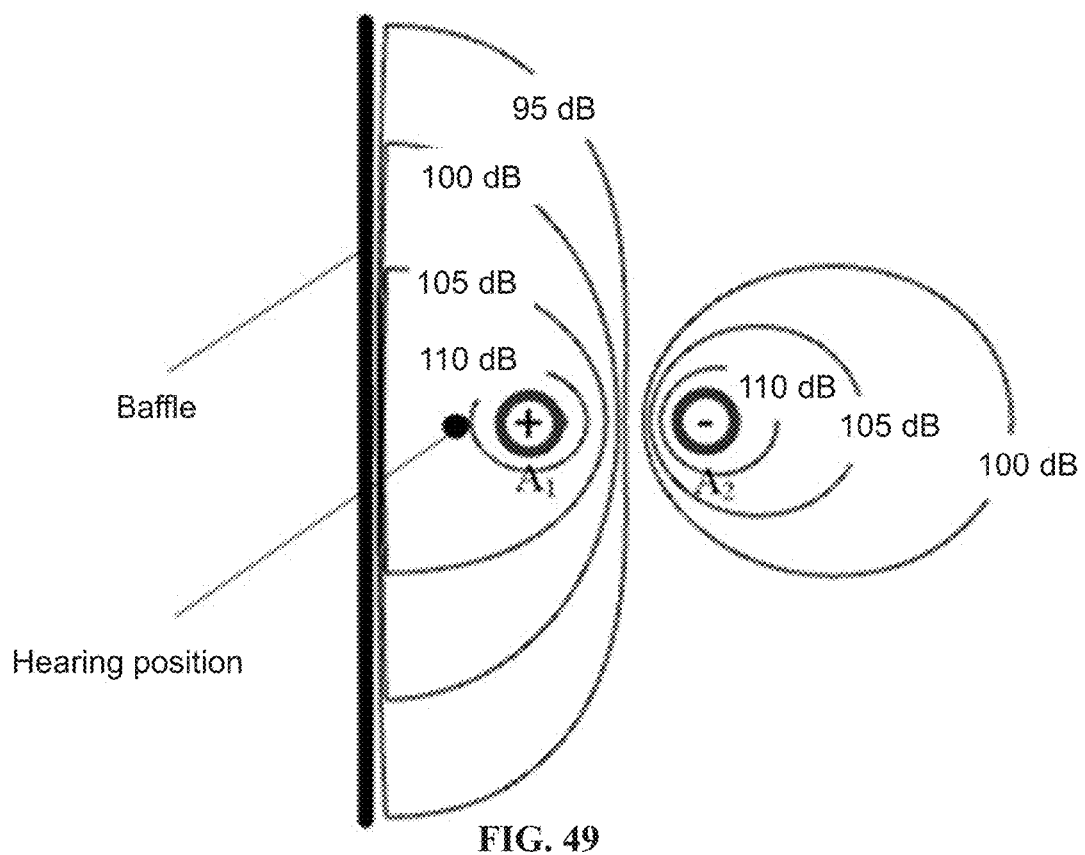
FIG. 49
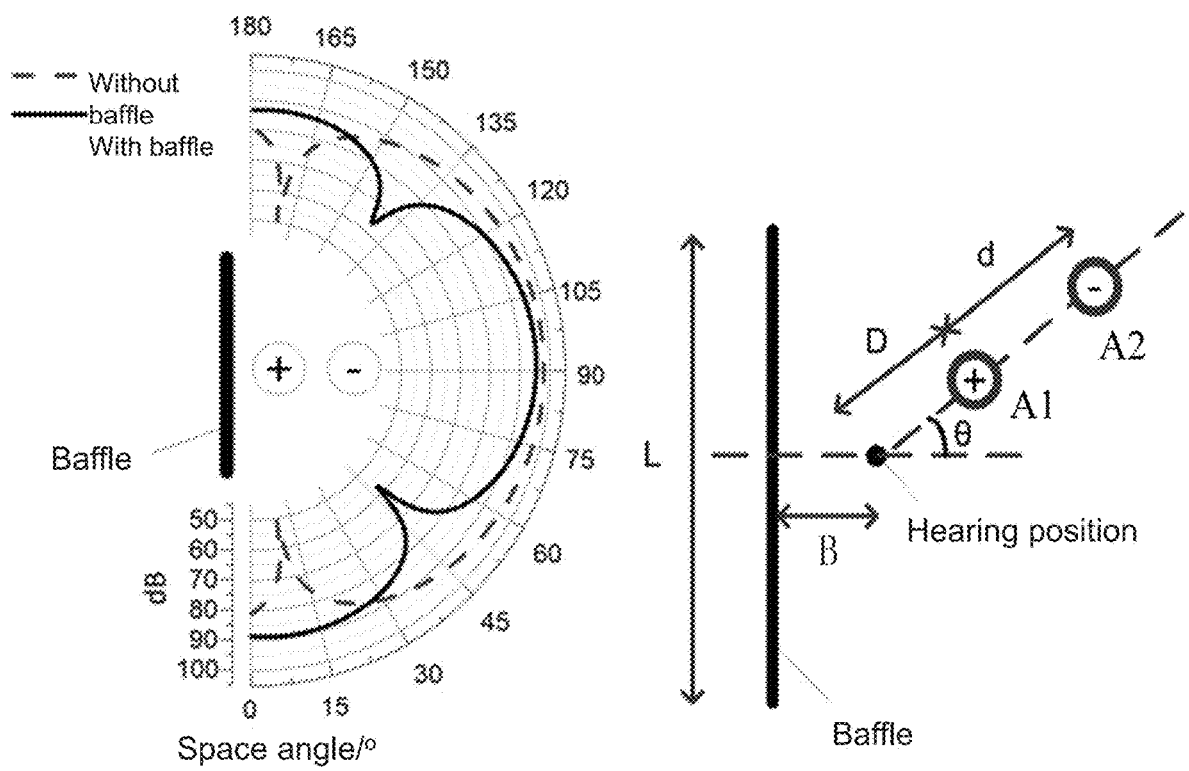
FIG. 50
FIG. 51

EARPHONE

CROSS REFERENCE TO RELATED APPLICATIONS

This application is a continuation in part of International Patent Application No. PCT/CN2021/109154, filed on Jul. 29, 2021, which claims priority of Chinese Patent Application No. 202010743396.4, filed on Jul. 29, 2020, and Chinese Patent Application No. 202011328519.4, filed on Nov. 24, 2020, the entire contents of each of which are incorporated herein by reference.

TECHNICAL FIELD

This application relates to the technical field of loudspeaker apparatuses, and in particular, to an earphone.

BACKGROUND

Earphones have been widely used in people's daily life and can be used in combination with electronic devices such as mobile phones, computers, etc., to provide users with a feast of hearing. According to the working principle of earphones, the earphones may be generally classified into air conduction earphones and bone conduction earphones. According to the way the users wear earphones, the earphones may be generally classified into headsets, ear-hook earphones, and in-ear earphones. According to an interactive manner between the earphones and the electronic devices, the earphones may be generally classified into wired earphones and wireless earphones.

SUMMARY

The present disclosure provides an earphone. The earphone may include a hook-shaped component, a connecting component, and a holding component. In a wearing state, the hook-shaped component may be configured to hang between a rear side of an ear of a user and a head of the user. The holding component may be configured to contact a front side of the ear. The connecting component may be configured to connect the hook-shaped component and the holding component and extend from the head to an outside of the head to cooperate with the hook-shaped component to provide the holding component with a pressing force on the front side of the ear.

In some embodiments, in a direction from a first connection point between the hook-shaped component and the connecting component to a free end of the hook-shaped component, the hook-shaped component may be bent toward the rear side of the ear to form a first contact point with the rear side of the ear, and the holding component may form a second contact point with the front side of the ear. A distance between the first contact point and the second contact point along an extending direction of the connecting component in a natural state may be smaller than that in a wearing state to provide the holding component with the pressing force on the front side of the ear.

In some embodiments, the hook-shaped component further may form a third contact point with the rear side of the ear. The third contact point may be located between the first connection point and the first contact point and close to the first connection point. A distance between projections of the first contact point and the third contact point on a reference plane perpendicular to the extending direction of the connecting component in the natural state may be smaller than that in the wearing state.

In some embodiments, in a direction from a first connection point between the hook-shaped component and the connecting component to a free end of the hook-shaped component, the hook-shaped component may be bent toward the head to form a first contact point and a second contact point with the head. The first contact point may be located between the second contact point and the first connection point, so that the hook-shaped component may form a lever structure with the first contact point as a fulcrum. A force directed to the outside of the head and provided by the head at the second contact point may be transformed into a force directed to the head at the first connection point by the lever structure to provide the holding component with the pressing force on the front side of the ear through the connecting component.

In some embodiments, the holding component may extend and be held in a concha boat of the ear.

In some embodiments, an elastic metal wire may be arranged inside the hook-shaped component. The elastic metal wire may have a major axis direction and a minor axis direction orthogonal to each other on a cross section of the elastic metal wire, and a size of the elastic metal wire in the major axis direction may be greater than a size of the elastic metal wire in the minor axis direction, so that the hook-shaped component and the holding component may cooperate to form an elastic clamping for the ear.

In some embodiments, a ratio of the size of the elastic metal wire in the major axis direction to the size of the elastic metal wire in the minor axis direction may be between 4:1 and 6:1.

In some embodiments, the elastic metal wire may be in a shape of an arc in the minor axis direction, and a ratio of a height of the arc to the size of the elastic metal wire in the major axis direction may be within a range of 0.1-0.4.

In some embodiments, the extending component may be arranged on the holding component, and extends into any one of a concha cavity, a concha boat, a triangular fossa, and a scapha of the ear in the wearing state. The extending component may be arranged on the hook-shaped component, and hook a helix and/or an antihelix of the ear in the wearing state.

In some embodiments, in the wearing state, a side of the holding component in contact with a skin of the user may be defined as an inner surface, a side opposite to the inner surface may be defined as an outer surface, a side of the holding component facing an ear hole of the ear may be defined as a lower surface, a side opposite to the lower surface may be defined as an upper surface, and a side of the holding component facing the rear side of the ear may be defined as a rear surface. The extending component may be arranged on any one of the inner surface, the lower surface, the upper surface, and the rear surface.

In some embodiments, the extending component may be detachably connected to the holding component.

In some embodiments, the extending component may be sleeved on the holding component through an elastic sleeve.

In some embodiments, in the wearing state, the connecting component may be connected to a lower edge of the holding component.

In some embodiments, the holding component may be configured with a core and have a multi-section structure to adjust a relative position of the core on an overall structure of the earphone.

In some embodiments, the holding component may include a first holding section, a second holding section, and a third holding section connected end to end in sequence. An end of the first holding section away from the second holding section may be connected to the connecting component. The second holding section may be folded back relative to the first holding section and maintain a distance therebetween to make the first holding section and the second holding section be in a U-shaped structure, and the core may be arranged on the third holding section.

In some embodiments, the holding component may include a first holding section, a second holding section, and a third holding section connected end to end in sequence. An end of the first holding section away from the second holding section may be connected to the connecting component. The second holding section may be bent relative to the first holding section. The third holding section and the first holding section may be arranged side by side with each other at a distance, and the core may be arranged on the third holding section.

In some embodiments, the holding component may have a thickness direction, a length direction, and a height direction orthogonal to each other. The thickness direction may be configured as a direction in which the holding component is close to or away from the ear in the wearing state, and the height direction may be configured as a direction in which the holding component is close to or away from a top of the user's head in the wearing state. In the natural state, and viewed from a side of the earphone facing the top of the user's head in the wearing state, the holding component may be at least spaced apart from a section of the hook-shaped component close to the connecting component in the thickness direction. The connecting component may be arranged in a shape of an arc and connected between the holding component and the hook-shaped component.

In some embodiments, in the thickness direction, a minimum distance between the section of the hook-shaped component close to the connecting component and the holding component may be greater than 0 and smaller than or equal to 5 mm.

In some embodiments, edges of the section of the hook-shaped component close to the connecting component, the connecting component, and the holding component facing the ear may be arranged in a shape of a circuitous arc. In a reference direction that passes through a roundabout inflection point of the circuitous arc and is parallel to the length direction, a minimum width of the circuitous arc along the thickness direction at a position 3 mm away from the roundabout inflection point may be in a range of 1 mm to 5 mm.

In some embodiments, a side of the holding component facing the ear may be configured with a sound hole, and a distance between a center of the sound hole and the section of the hook-shaped component close to the connecting component in the thickness direction may be in a range of 3 mm to 6 mm.

In some embodiments, a side of the holding component facing the ear may include a first region and a second region. The first region may be configured with a sound hole. The second region may be farther away from the connecting component than the first region and more protruding toward the ear than the first region, so as to allow the sound hole to be spaced from the ear in the wearing state.

In some embodiments, a distance between the second region and the section of the hook-shaped component close to the connecting component in the thickness direction may be in a range of 1 mm to 5 mm.

In some embodiments, an orthographic projection of the section of the hook-shaped component close to the connecting component in the thickness direction may partially overlap the second region.

In some embodiments, a maximum protrusion height of the second region relative to the first region in the thickness direction may be greater than or equal to 1 mm.

In some embodiments, the holding component may be in contact with an antihelix of the ear.

BRIEF DESCRIPTION OF THE DRAWINGS

To describe the technical solutions in the embodiments of the present disclosure clearly, the following may introduce the drawings illustrated in the description of the embodiments briefly. Obviously, the drawings in the following descriptions may be some examples or embodiments of the present disclosure. For those skilled in the art, other drawings may be obtained from these drawings without creative work.

FIG. 13 is a schematic diagram illustrating a front view of a structure of an earphone according to some embodiments of the present disclosure;

FIG. 14 is a schematic diagram illustrating a structure of an earphone according to some embodiments of the present disclosure;

FIG. 15 is a schematic diagram illustrating a mechanical model of the earphone in FIG. 14 in a wearing state;

FIG. 23 is a schematic diagram illustrating a structure of the rotating shaft assembly in FIG. 22 before and after assembly;

FIG. 24 is a schematic diagram illustrating a structure of a rotating shaft assembly according to another embodiment of the present disclosure;

FIG. 25 is a schematic diagram illustrating a disassembled structure of the rotating shaft assembly in FIG. 24 according to an embodiment of the present disclosure;

FIG. 26 is a schematic diagram illustrating a cross-sectional structure of the rotating shaft assembly in FIG. 25;

FIG. 27 is a schematic diagram illustrating a disassembled structure of the rotating shaft assembly in FIG. 24 according to another embodiment of the present disclosure;

FIG. 28 is a schematic diagram illustrating a cross-sectional structure of the rotating shaft assembly in FIG. 27;

FIG. 49 is a schematic diagram illustrating a sound field distribution of an acoustic dipole with a baffle according to some embodiments of the present disclosure;

FIG. 50 is a schematic diagram illustrating a sound pressure in far-field of when an acoustic dipole with and without a baffle according to some embodiments of the present disclosure;

FIG. 51 is a schematic diagram illustrating a theoretical model of an acoustic dipole with a baffle according to some embodiments of the present disclosure;

DETAILED DESCRIPTION

The present disclosure may be further described in detail with reference to the following drawings and embodiments. It should be noted that the following examples are only used to illustrate the present disclosure, which do not limit the scope of the present disclosure. The following embodiments are only part of the embodiments of the present disclosure, but not all of the embodiments. All other embodiments obtained by those skilled in the art without creative works may be in the protection scope of the present disclosure.

An "embodiment" mentioned in the present disclosure may indicate that a specific feature, structure, or characteristic described in combination with the embodiment may be included in at least one embodiment of the present disclosure. Those skilled in the art may clearly and implicitly understand that the embodiments described in the present disclosure may be combined with other embodiments.

Figure 1:
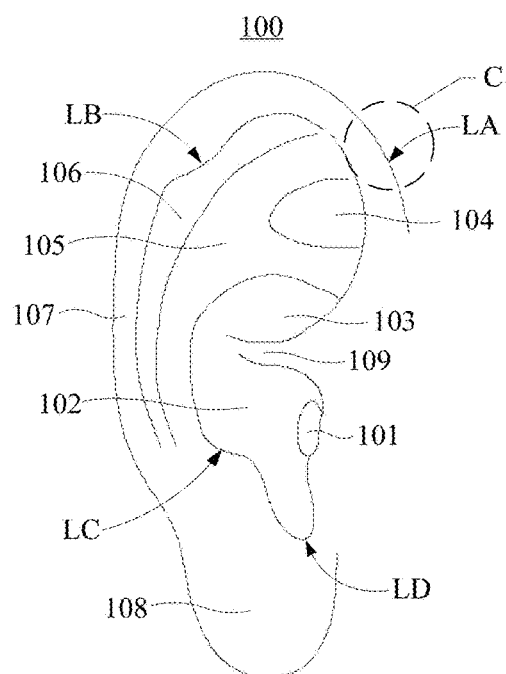
FIG. 1 is a schematic diagram illustrating a front view of a structure of a contour of a user's ear according to some embodiments of the present disclosure.

Referring to FIG. 1, FIG. 1 is a schematic diagram illustrating a front view of a structure of a contour of a user's ear according to some embodiments of the present disclosure.

As shown in FIG. 1, in addition to an external ear canal 101 and a nearby concha cavity 102 of an ear 100 of a user, parts of the ear 100 such as a concha boat 103, a triangular fossa 104, etc., may also be used to meet the wearing requirements of earphones because they have a certain depth and volume in a three-dimensional space In other words, by rationally designing the structure of the earphone, the wearing of the earphone may also be achieved with the help of the ear 100 of the user except for the external ear canal 101, and the external ear canal 101 of the user may be "liberated", thereby increasing the physical health of the user, and reducing the probability of traffic accidents. Accordingly, the present disclosure provides an earphone that mainly uses an upper part of the ear 100 of the user (including a region where the concha boat 103, the triangular fossa 104, an antihelix 105, a scapha 106, a helix 107, etc., are located) to realize the wearing of the earphone. In some embodiments, in order to improve the wearing comfort and reliability of the earphone, an earlobe 108 of the user and other parts may also be further used. Further, for ease of description, some relatively special physiological positions on the ear 100 may be further identified. The special physiological positions may include an upper ear root LA connecting a front edge of the helix 107 and the head, a Darwin's nodule LB on the helix 107, a helix notch LC of an end of the antihelix 105 close to the earlobe 108 and facing the concha cavity 102, an intertragic notch LD of an end of the concha cavity 102 close to the earlobe 108, etc. Due to individual differences among users, physiological positions such as Darwin's nodules may not be obvious or even non-existent on some users' ears, but this does not indicate that other users' ears do not have the physiological position.

It should be noted that although the external ear canal has a certain depth to extend to a tympanic membrane, for ease of description and in combination with FIG. 1, unless otherwise specified in the present disclosure, the external ear canal specifically may refer to an entrance away from the tympanic membrane, that is, an ear hole. Further, the "front side of the ear" mentioned in the present disclosure may be a concept relative to the "rear side of the ear". The front side of the ear may refer to a side of the ear facing away from the head, as shown in FIG. 1, and the rear side of the ear may refer to a side of the ear facing the head. Both the front side and the rear side of the ear are relative to the ear of the user.

Figure 2:
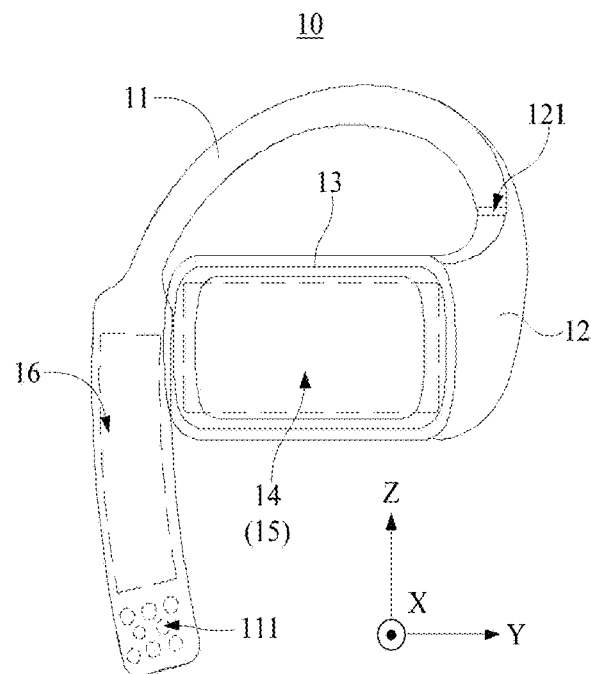
FIG. 2 is a schematic diagram illustrating a front view of a structure of an exemplary earphone according to some embodiments of the present disclosure.
Figure 3:
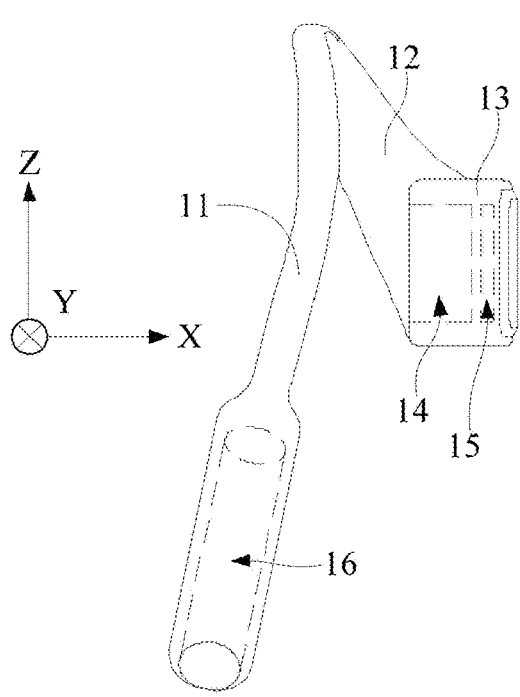
FIG. 3 is a schematic diagram illustrating a left side view of the structure of the earphone in FIG. 2.
Figure 4:
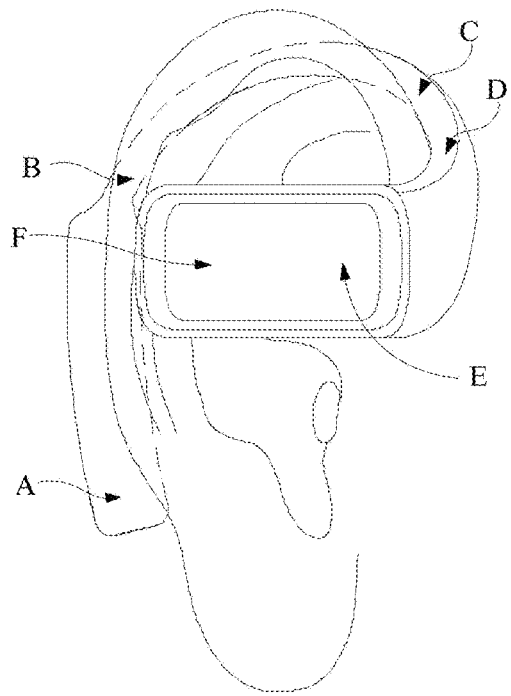
FIG. 4 is a schematic diagram illustrating a front side view of the earphone in FIG. 2 in a wearing state.
Figure 5:
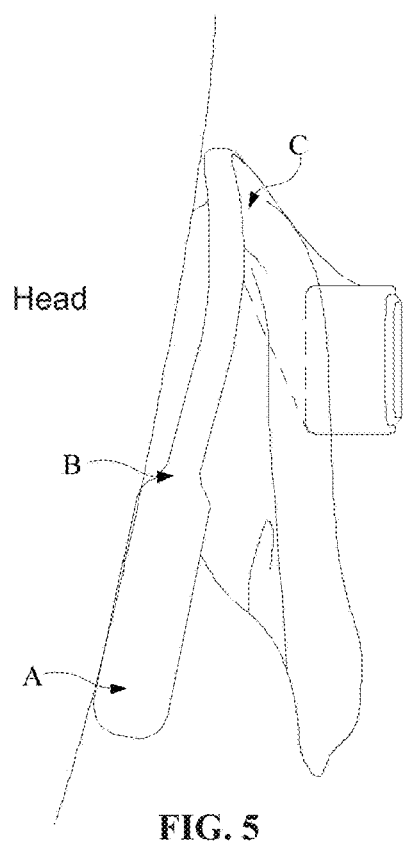
FIG. 5 is a schematic diagram illustrating a rear side view of the earphone in FIG. 2 in a wearing state.

Referring to FIG. 2 to FIG. 5, FIG. 2 is a schematic diagram illustrating a front view of a structure of an exemplary earphone according to some embodiments of the present disclosure. FIG. 3 is a schematic diagram illustrating a left side view of the structure of the earphone in FIG. 2. FIG. 4 is a schematic diagram illustrating a front side view of the earphone in FIG. 2 in a wearing state. FIG. 5 is a schematic diagram illustrating a rear side view of the earphone in FIG. 2 in a wearing state. It should be noted that three directions of X, Y, and Z of the earphone are shown in FIG. 2 mainly to show three planes of XY, XZ, and YZ, so as to facilitate the corresponding illustration in the following description. Therefore, all directional indications (such as up, down, left, right, front, back . . . ) in the present disclosure are mainly used to explain a relative position relationship between components, movement states of the components, or the like, in a specific posture (as shown in FIG. 2). If the specific posture changes, the directional indications may change accordingly.

As shown in FIG. 2 and FIG. 3, the earphone 10 may include a hook-shaped component 11, a connecting component 12, and a holding component 13. The connecting component 12 may connect the hook-shaped component 11 and the holding component 13, so that the earphone 10 may be curved in a three-dimensional space when the earphone 10 is in a non-wearing state (that is, in a natural state). In other words, in the three-dimensional space, the hook-shaped component 11, the connecting component 12, and the holding component 13 may not be coplanar. In such cases, as shown in FIG. 4 and FIG. 5, when the earphone 10 is in the wearing state, the hook-shaped component 11 may be mainly configured to hang between a rear side of an ear and a head of a user, and the holding component 13 may be mainly configured to contact a front side of the ear, thereby allowing the holding component 13 and the hook-shaped component 11 to cooperate to clamp the ear. For example, the connecting component 12 may extend from the head along a coronal axis of the user towards an outside of the head to cooperate with the hook-shaped component 11 to provide the holding component 13 with a pressing force on the front side of the ear. The holding component 13 may specifically press against a region where the concha boat, the triangular fossa, the antihelix, and other parts are located under the action of the pressing force so that the earphone 10 may not cover the external ear canal of the ear when the earphone 10 is in the wearing state. As another example, when the earphone 10 is in the wearing state, a projection of the holding component 13 on the ear of the user may mainly fall within a range of the helix of the ear. Further, the holding component 13 may be arranged at a side of the external ear canal of the ear close to the top of the head of the user and in contact with the helix and/or the antihelix. In this way, the holding component 13 may be prevented from covering the external ear canal, thereby liberating the two ears of the user. A contact area between the holding component 13 and the ear may also be increased, thereby improving the wearing comfort of the earphone 10.

It should be noted that based on standards of ANSI: 53.36, 53.25 and IEC: 60318-7, a simulator (e.g., GRAS 45BC KEMAR) with head and (left and right) ears may be made. Therefore, the description of "a user wears an earphone" or "an earphone is in a wearing state" may refer to that the earphone is worn on the ear of the simulator mentioned above. Accordingly, the "wearing state" mentioned in the present disclosure may refer to a normal wearing state of the earphone after being worn on the ear of the simulator mentioned above. For ease of description, the normal wearing state may further be illustrated from a perspective of the front side and the rear side of the ear, such as the normal wearing state shown in FIG. 4 and FIG. 5, and another example of the normal wearing state shown in FIG. 9 and FIG. 10. Of cause, due to individual differences among users, an actual wearing state of the earphone 10 may be different from the normal wearing state mentioned above.

For adult male users, the thickness of the ears may be relatively thick (commonly known as "thick ears"). By rationally designing (exemplary illustrations may be described below) structural parameters, such as a shape, a size, or the like, of the connecting component 12, and the connection relationship with the hook-shaped component 11 and the holding component 13, it may ensure that the earphone 10 fits the ear as much as possible to improve the wearing stability of the earphone 10, and the earphone 10 can be prevented from over-clamping the helix near the upper ear root, that is, the upper ear root may be naturally bypassed to improve the wearing comfort of the earphone 10. Further, for users such as children, minors, or adult women, the thickness of the ears may be often relatively thin (commonly known as "thin ears"). In particular, compared to the thickness of the ears of adult men, in order to increase the fit of the earphone 10 with the ears of the user when the earphone 10 is in the wearing state, the size of the connecting component 12 may be small. For example, the connecting component 12 may be an arc transition between the holding component 13 and the hook-shaped component 11.

Further, the earphone 10 may also include a core 14, a mainboard 15, and a battery 16. The core 14 may be mainly used to convert an electrical signal into the corresponding mechanical vibration (that is, "sound generation"), and may be electrically connected to the mainboard 15 and the battery 16 through corresponding conductors. The mainboard 15 may be mainly used to control the sound generation of the core 14, and the battery 16 may be mainly used to provide power for the sound generation of the core 14. The earphone 10 described in the present disclosure may also include a sound transmitter such as a microphone, or a pickup device, and may also include a communication device such as a Bluetooth device, or an NFC (Near Field Communication) device, which may be electrically connected to the mainboard 15 and the battery 16 through the corresponding conductors to realize corresponding functions.

For example, the core 14 may be fixed to the holding component 13. When the earphone 10 is in the wearing state, the core 14 may be pressed against the ears of the user tightly under the action of the pressing force. Further, when the earphone 10 is in the wearing state, as shown in FIG. 4, since the holding component 13 is mainly arranged at the front side of the ear of the user, in addition to fixing the core 14, the holding component 13 may also be configured with some function buttons (not shown in FIG. 2) that facilitate the interaction between the user and the earphone 10. The mainboard 15 may also be arranged in the holding component 13 to shorten a wiring distance between the core 14 and the mainboard 15, and the wiring distance between function keys, or the like, and the mainboard 15. It should be noted that since the holding component 13 may be configured with the core 14, the mainboard 15, the function buttons, or the like, and arranged in front of the ear of the user when the earphone 10 is in the wearing state, so that the battery 16 may be arranged in the hook-shaped component 11 and mainly be arranged between the rear side of the ear and the head of the user when the earphone 10 is in the wearing state (as shown in FIG. 5). In this way, the capacity of the battery 16 may be increased to improve the endurance of the earphone 10, and the weight of the earphone 10 may also be balanced to improve the stability and comfort of the earphone 10 in terms of wearing.

Further, the inventor(s) of the present disclosure has discovered in a long-term study that a weight ratio of a total weight of the holding component 13 to a total weight of a part of the hook-shaped component 11 corresponding to the battery 16 (hereinafter referred to as a battery part) may be within 4:1, preferably within 3:1, and more preferably within 2.5:1. Combined with FIG. 2 and FIG. 3, in some embodiments, the total weight of the holding component 13 may be the weight of the holding component 13 and the weight of structural components such as the core 14, the mainboard 15, etc., therein. The total weight of the battery part may be the weight of the battery part and the weight of structural components such as the battery 16 therein. It may be easy for those skilled in the art to know that the structural components in the holding component 13 and the structural components in the battery part may be changed according to design needs. The adjustments to the structural components in different parts may be included in the technical solution of the present disclosure, and the weight ratio may not be affected, which is not repeated herein. At this time, the weight of the earphone 10 may be more evenly distributed at two ends of the earphone 10, and the ears of the user may also serve as a fulcrum to support the earphone 10 when the earphone 10 is in the wearing state so that the earphone 10 may at least not slip off when the earphone 10 is in the wearing state. Certainly, the ears of the user may bear most of the weight of the earphone 10, which may easily cause discomfort when worn for a long time. Therefore, the hook-shaped component 11, the connecting component 12, the holding component 13, and other structures may be made of soft materials (such as polycarbonate, polyamide, acrylonitrile-butadiene-styrene copolymer, silica gel, etc.) to improve the wearing comfort of the earphone 10. Further, in order to improve the structural strength of the earphone 10, elastic metal wires such as spring steel, titanium alloy, titanium-nickel alloy, chromium-molybdenum steel, aluminum alloy, copper alloy, etc., may also be arranged in the structure of the hook-shaped component 11, the connecting component 12, the holding component 13, or other structures.

It should be noted that to take into account the comfort and stability of the earphone 10 in terms of wearing, the following improvements may also be made:

1) The connecting component 12 and the battery part may be made of relatively hard material, and a middle part between the connecting component 12 and the battery part may be made of relatively soft materials mentioned above. In some embodiments, the middle part may also adopt a "soft-wrapped-hard" structure. For example, when the user wears the earphone 10, a region of the hook-shaped component 11 that is in contact with the user may be made of the relatively soft materials mentioned above, and the rest of the regions may be made of the relatively hard materials mentioned above. Different materials may be formed by technologies such as a two-color injection molding technology, a spray paint technology, etc. The relatively hard materials mentioned above may include, but are not limited to, polycarbonate (PC), polyamides (PA), acrylonitrile-butadiene-styrene copolymer (ABS), polystyrene (PS), High Impact Polystyrene (HIPS), Polypropylene (PP), Polyethylene Terephthalate (PET), Polyvinyl Chloride (PVC)), Polyurethanes (PU), Polyethylene (PE), Phenol-Formaldehyde (PF), Poly (ester sulfones), PES, Polyvinylidene chloride (PVDC)), Polymethyl Methacrylate (PMMA), Poly-ether-ether-ketone (PEEK), or the like, or a mixture of at least two thereof, or a mixture formed with reinforcing agents such as glass fibers, carbon fibers, etc. Further, the spray paint may specifically be rubber hand-feel paint, elastic hand-feel paint, plastic elastic paint, or the like.

2) Since the earphone 10 is worn by the user, a part of the earphone 10 may be in contact with the skin of the user (hereinafter referred to as a skin contact region). Moreover, the material of the skin contact region may generally affect the comfort of the user when wearing the earphone 10 for a long time. Thus, the skin contact region may be made of the relatively soft materials mentioned above, and the other regions may be made of the relatively hard materials mentioned above. Different materials may be formed by technologies such as a two-color injection molding, a spray paint technology, etc.

In some embodiments, the Shore hardness of the relatively softer materials may be in ranges of 45-85A, 30-60D. Both the relatively softer materials and the relatively hard materials may cover the elastic metal wires.

Further, different users may have large differences in age, gender, and gene-controlled trait expression. As a result, the ears and heads of different users may be of different sizes and shapes. In such cases, the hook-shaped component 11 may be rotatable with respect to the connecting component 12, or the holding component 13 may be rotatable with respect to the connecting component 12, or a part of the connecting component 12 may be rotatable with respect to the other part of the connecting component 12, so that a relative positional relationship of the hook-shaped component 11, the connecting component 12, and the holding component 13 in the three-dimensional space can be adjusted, thus the earphone 10 may adapt to different users, that is, to increase the applicability of the earphone 10 to users in terms of wearing. For example, the connecting component 12 may be made of deformable materials such as a soft steel wire. The user may bend the connecting component 12 to rotate one part relative to the other part to adjust the relative positions of the hook-shaped component 11, the connecting component 12, and the holding component 13 in the three-dimensional space, thereby satisfying the wearing needs. As another example, the connecting component 12 may be configured with a rotating shaft mechanism 121, through which the user may also adjust the relative positions of the hook-shaped component 11, the connecting component 12, and the holding component 13 in the three-dimensional space to satisfy the wearing needs. The detailed structure of the rotating shaft mechanism 121 may be within the understanding of those skilled in the art, which may not be described in detail herein. Further, if the hook-shaped component 11 and the connecting component 12 are movably connected by the rotating shaft mechanism 121, the hook-shaped component 11 may rotate relative to the connecting component 12. If the holding component 13 and the connecting component 12 are movably connected by the rotating shaft mechanism 121, the holding component 13 may rotate relative to the connecting component 12. If a part of the connecting component 12 is movably connected with another part of the connecting component 12 by the rotating shaft mechanism 121, the part of the connecting component 12 may be rotated relative to another part of the connecting component 12.

Figure 6:
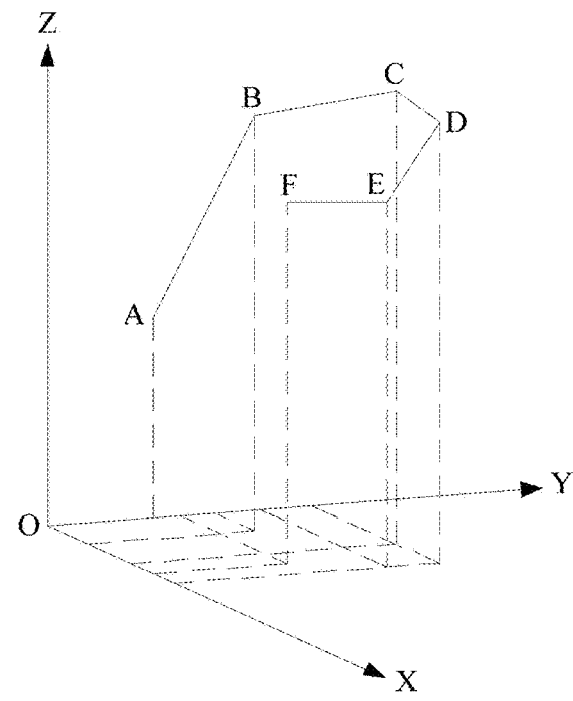
FIG. 6 is a schematic diagram illustrating a mechanical model of the earphone in FIG. 2 in a wearing state.

Referring to FIG. 6, FIG. 6 is a schematic diagram illustrating a mechanical model of the earphone in FIG. 2 in a wearing state. It should be noted that the YZ plane in FIG. 6 may be regarded as a plane where the head of the user is located. The ABC section in FIG. 6 may be regarded as the hook-shaped component. The CD section in FIG. 6 may be regarded as the connecting component. The DEF section in FIG. 6 may be regarded as the holding component. Further, point C in FIG. 6 may correspond to a region where an upper proximal end of the ear in FIG. 1 is located (e.g., a region indicated by the dashed box C in FIG. 1).

As shown in FIG. 4 to FIG. 6, when the earphone 10 is in the wearing state, the ABC section may be mainly arranged at the rear side of the ear of the user, the DEF section may be mainly arranged at the front side of the ear of the user, and the CD section may be mainly adapted to the thickness of the ear of the user. In such cases, the BC section, the CD section, and the DEF section may form a structure similar to a "clip", so that the earphone 10 may be clamped on the ear of the user, thereby forming a basic wearing state. The following description may be an exemplary description of the force and stability of the earphone 10 in terms of wearing:

As shown in FIG. 6, in a direction from a first connection point C between the hook-shaped component 11 and the connecting component 12 to a free end of the hook-shaped component 11 (for example, the end where the point A in FIG. 6 is located), the hook-shaped component 11 may be bent toward the head of the user, and form a first contact point B and a second contact point A with the head. The first contact point B may be arranged between the second contact point A and the first connection point C. It should be noted that the first contact point B and the second contact point A may be both defined points in the mechanical model. In actual wearing, due to differences in the physiological structures of the heads and ears of different users, a certain impact on the actual wearing of the earphone 10 may exist. The position of the earphone 10 that is in contact with the head when the earphone 10 is actually worn may correspond to the free end of the hook-shaped component 11, or any point between the free end and the first contact point B. In some embodiments, the AB section may also partially or entirely abut against the head of the user. The mechanical model and the actual wearing stability principle may be the same as the technical solutions mentioned above. Those skilled in the art may easily learn, adjust, and combine the content based on the technical solutions of the present disclosure without creative work, which may not be repeated herein. In this way, the hook-shaped component 11 may form a lever structure with the first contact point B as a fulcrum. The free end of the hook-shaped component 11 may be pressed against the head of the user, the head of the user may provide a force directed to the outside of the head at the second contact point A, which may be transformed into a force directed to the head at the first connection point C through the lever structure, and the holding component 13 may be provided with a pressing force on the front side of the ear through the connecting component 12.

It should be noted that in order to enable the free end of the hook-shaped component 11 to press against the head of the user when the earphone 10 is in the wearing state, and to enable the head of the user to provide a force directed to the outside of the head at the second contact point A, at least the following conditions may be satisfied: an angle formed between the free end of the hook-shaped component 11 and the YZ plane when the earphone 10 is in the non-wearing state may be greater than an angle formed between the free end of the hook-shaped component 11 and the YZ plane when the earphone 10 is in the wearing state. The larger the angle formed between the free end of the hook-shaped component 11 and the YZ plane when the earphone 10 is in the non-wearing state, the tighter the free end of the hook-shaped component 11 may press against the head of the user when the earphone 10 is in the wearing state, and the larger the force directed to the outside of the head at the second contact point A provided by the head of the user correspondingly.

It should be noted that when the free end of the hook-shaped component 11 is pressed against the head of the user, in addition to making the head of the user provide a force directed to the outside of the head at the second contact point A, it may also cause at least the BC section of the hook-shaped component 11 to form another pressing force on the rear side of the ear, which may cooperate with the pressing force formed by the holding component 13 on the front side of the ear, so as to form a "front and rear pinching" pressing effect on the ear of the user, thereby improving the stability of the earphone 10 in terms of wearing.

Further, the battery 16 may be mainly arranged at the AB section of the hook-shaped component 11 so as to overcome the weight of the holding component 13, and structures therein such as the core 14, and the mainboard 15, thereby improving the stability of the earphone 10 in terms of wearing. In some embodiments, the surface of the hook-shaped component 11 in contact with the ear and/or the head of the user may be set as a frosted surface, a textured surface, or the like, to increase the friction between the hook-shaped component 11 and the ear and/or the head of the user, and overcome the self-weight of the holding component 13 and structures therein such as the core 14, the mainboard 15, or the like, thereby improving the stability of the earphone 10 in terms of wearing. Further, the free end of the hook-shaped component 11 (especially a region where the point A is located) may be deformed, so that when the earphone 10 is in the wearing state, the free end of the hook-shaped component 11 may be pressed against the head of the user and deformed. In such cases, the contact area between the free end of the hook-shaped component 11 and the head of the user may be enlarged, thereby improving the comfort and stability of the earphone 10 in terms of wearing. For example, the hook-shaped component 11 may be formed by two-color injection molding, and the elastic modulus of the free end (especially the region where the point A is located) may be smaller than that of other regions, so as to increase the deformability of the free end. As another example, the free end of the hook-shaped component 11 may be configured with one or more holes 111 in a hollow structure to increase the deformability of the free end. The hole(s) 111 may be through-hole(s) and/or blind hole(s). A count of the hole(s) 111 may be one or more, and an axial direction of the hole(s) 111 may be perpendicular to the contact area between the free end of the hook-shaped component 11 and the head of the user.

Figure 16:
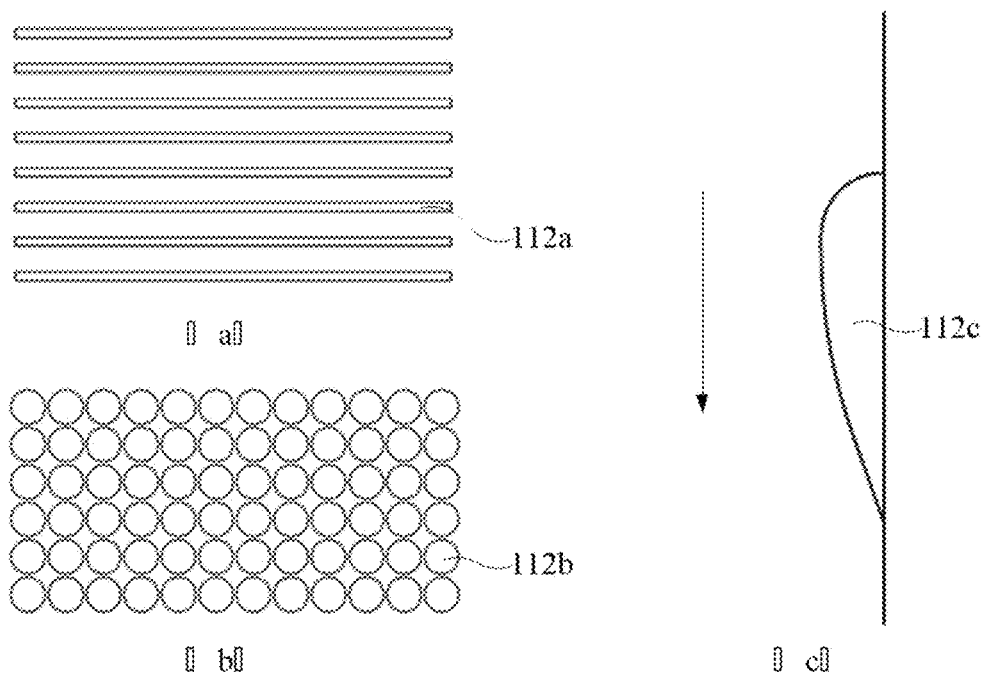
FIG. 16 is a schematic diagram illustrating surface structures of a skin contact area of a battery part according to some embodiments of the present disclosure.

It should be noted that to take into account the comfort and stability of the earphone 10 in terms of wearing, the following improvements may also be made. FIG. 16 is a schematic diagram illustrating surface structures of a skin contact area of a battery part according to some embodiments of the present disclosure.

1) The skin contact region of the battery part may be formed with a texture structure. As shown in diagram (a) in FIG. 16, the texture structure may include a plurality of strip-shaped protrusions 112a spaced apart along a length direction of the hook-shaped component 11. As shown in diagram (b) in FIG. 16, the texture structure may also include a plurality of dot-shaped protrusions 112b spaced apart along the length direction of the hook-shaped component 11. In some embodiments, the texture structure may also be a grid-like shape.

2) As shown in diagram (c) in FIG. 16, the skin contact region of the battery part may also be configured with a semi-spindle protrusion 112c extending along the length direction of the hook-shaped component 11. Taking the free end of the hook-shaped component 11 as a reference, in a direction close to the free end of the hook-shaped component 11 (the direction shown by the arrow in FIG. 16), a protrusion height of each part of the semi-spindle protrusion 112c relative to the hook-shaped component 11 may gradually increase and then gradually decrease. In this way, during a process that the user is wearing the earphone 10, the semi-spindle protrusion 112c and the skin of the user may generate as little resistance as possible. After the user finishes wearing the earphone 10, the semi-spindle protrusion 112c and the skin of the user may generate as much resistance as possible to prevent the earphone 10 from falling off.

3) When the skin contact region of the battery part is arranged as a frosted surface, a material with relatively goof skin affinity may be preferred.

All kinds of protrusions mentioned above may be selected from a material with a relatively soft texture, a relatively large damping coefficient, and a certain degree of skin-friendliness. Further, through the various embodiments described above, a coefficient of friction of the skin contact region of the battery part may be in a range of 0.1-1.0.

Merely by way of example, a linear distance between the projection of the point C on the YZ plane and the projection of the EF segment on the YZ plane may be in a range of 10-17 mm, preferably may be in a range of 12-16 mm, and more preferably may be in a range of 13-15 mm. The angle between the projection of the BC segment on the XY plane and the projection of the DE segment on the XY plane may be in a range of 0-25°, preferably may be in a range of 0-20°, and more preferably may be in a range of 2-20°. Further, the angle between the AB segment and a normal line passing through the point B of the XY plane may be in a range of 0-25°, preferably may be in a range of 0-20°, and more preferably may be in a range of 2-20°. In some embodiments, a linear distance between the projection of point C on the XY plane and the projection of the EF segment on the XY plane may be in a range of 2-4 mm, and preferably may be 2.8 mm. In other embodiments, a linear distance between the projection of point C on the XY plane and the projection of the EF segment on the XY plane may be in a range of 1-4 mm and preferably may be 2.5 mm. Therefore, the connecting component 12 may bypass the upper ear root of the ear when the earphone 10 is in the wearing state, thereby improving the wearing comfort of the earphone 10.

Based on the above detailed description, according to an aspect of the present disclosure, the weight of the earphone 10 may be distributed reasonably and evenly, so that the ear of the user may serve as a fulcrum to support the earphone 10 when the earphone 10 is in the wearing state. According to another aspect of the present disclosure, the connecting component 12 may be arranged between the hook-shaped component 11 and the holding component 13 of the earphone 10, so that when the earphone 10 is in the wearing state, the connecting component 12 may cooperate with the hook-shaped component 11 to provide the holding component 13 with a pressing force on the front side of the ear, thus the earphone 10 may be firmly attached to the ear of the user when in the wearing state. Such a setting may improve the stability of the earphone 10 in terms of wearing, and the reliability of the earphone 10 in terms of sound generation.

Figure 7:
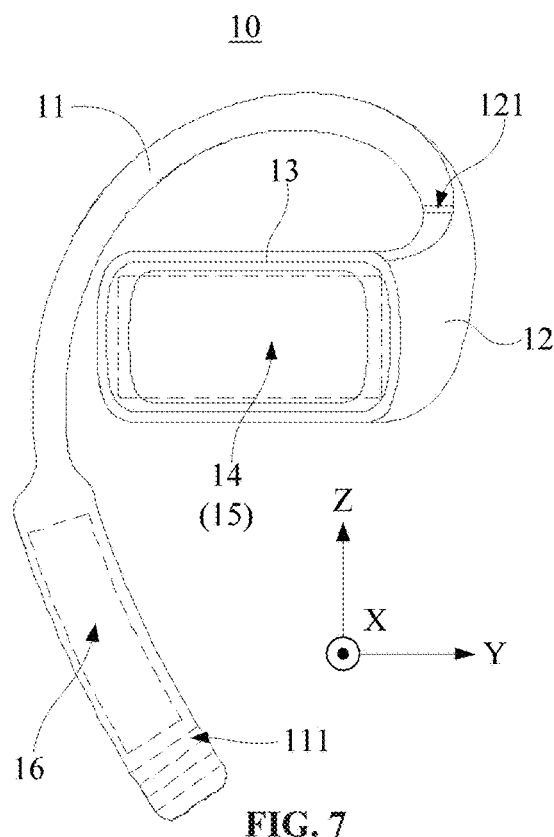
FIG. 7 is a schematic diagram illustrating a front view of a structure of an earphone according to some embodiments of the present disclosure.
Figure 8:
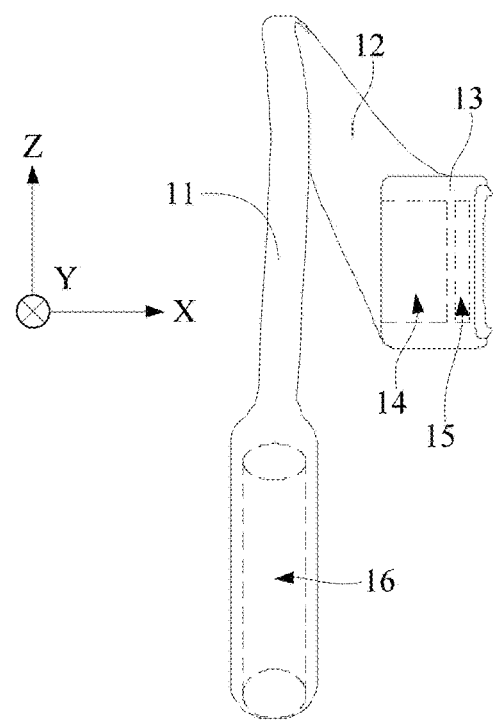
FIG. 8 is a schematic diagram illustrating a left side view of the earphone in FIG. 7.
Figure 9:
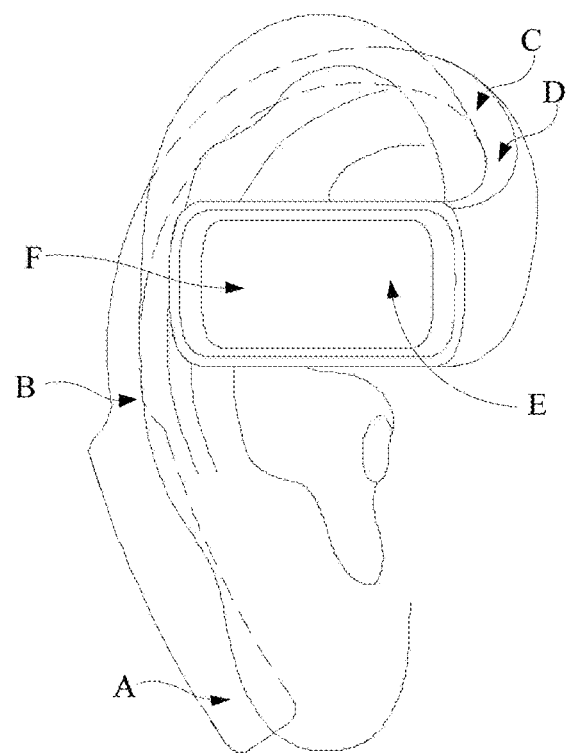
FIG. 9 is a schematic diagram illustrating a front side view of the earphone in FIG. 7 in a wearing state.
Figure 10:
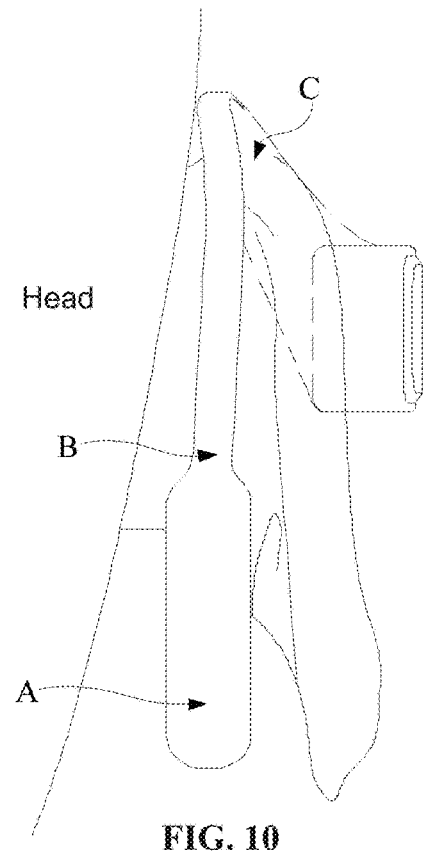
FIG. 10 is a schematic diagram illustrating a rear side view of the earphone in FIG. 7 in a wearing state.
Figure 11:
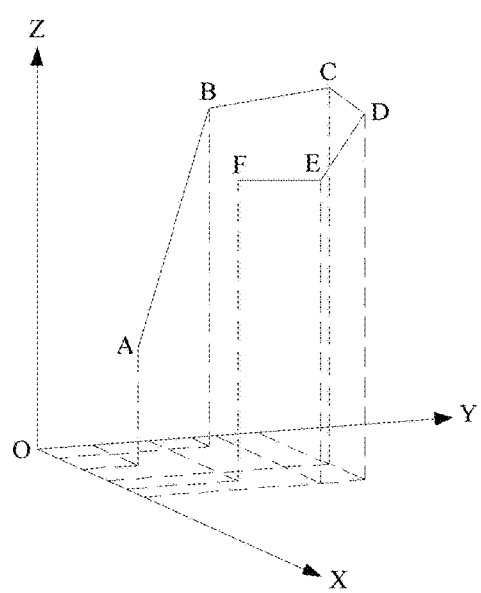
FIG. 11 is a schematic diagram illustrating a mechanical model of the earphone in FIG. 7 in a wearing state.

Referring to FIG. 7 to FIG. 11, FIG. 7 is a schematic diagram illustrating a front view of a structure of an earphone according to some embodiments of the present disclosure. FIG. 8 is a schematic diagram illustrating a left side view of the earphone in FIG. 7. FIG. 9 is a schematic diagram illustrating a front side view of the earphone in FIG. 7 in a wearing state. FIG. 10 is a schematic diagram illustrating a rear side view of the earphone in FIG. 7 in a wearing state. FIG. 11 is a schematic diagram illustrating a mechanical model of the earphone in FIG. 7 in a wearing state. It should be noted that the YZ plane in FIG. 11 may be regarded as the plane where the head of the user is located. The ABC section in FIG. 11 may be regarded as the hook-shaped component, the CD section in FIG. 11 may be regarded as the connecting component, and the DEF section in FIG. 11 may be regarded as the holding component. Further, the Point C in FIG. 11 may correspond to a region where the upper proximal end of the ear in FIG. 1 is located (a region indicated by the dashed box C in FIG. 1).

As shown in FIG. 4 to FIG. 6, when the earphone 10 is in the wearing state, the ABC section may be mainly located at the rear side of the ear of the user, the DEF section may be mainly located at the front side of the ear of the user, and the CD section may be mainly configured to adapt to the thickness of the ear of the user. In such cases, the BC section, the CD section, and the DEF section may form a structure similar to a "clip", so that the earphone 10 may be clamped on the ear of the user, thereby forming a basic state of wearing. The following description may be an exemplary description of the force and stability of the earphone 10 in terms of wearing:

The main difference from the embodiments mentioned above may be that, in the embodiment, as shown in FIG. 7 and FIG. 8, the hook-shaped component 11 may be closer to the holding component 13 as a whole, so that when the earphone 10 is in the wearing state, as shown in FIG. 9 and FIG. 10, the free end of the hook-shaped component 11 away from the connecting component 12 may act on the rear side of the ear of the user instead of pressing against the head of the user.

As shown in FIG. 11, in a direction from the first connection point C between the hook-shaped component 11 and the connecting component 12 to the free end of the hook-shaped component 11 (for example, the end where point A is located in FIG. 11), the hook-shaped component 11 may be bent toward the rear side of the ear to form a first contact point B with the rear side of the ear. The holding component 13 may form a second contact point F with the front side of the ear. For the earphone 10, in the natural state (that is, the non-wearing state), a distance between the first contact point B and the second contact point F along the extending direction (i.e., the coronal axis) of the connecting component 12 may be less than a distance between the first contact point B and the second contact point F along the extending direction of the connecting component 12 in the wearing state, thereby providing the holding component 13 with the pressing force against the front side of the ear. In other words, when the earphone 10 is in the natural state, the distance between the first contact point B and the second contact point F along the extending direction of the connecting component 12 may be less than the thickness of the ear of the user, so that the earphone 10 may be clipped to the ear of the user like a "clip" in the wearing state.

Further, a first line BC may be provided between the first contact point B and the first connection point C, and a second line EF may be provided between the second contact point F and the second connection point E of the holding component 13 and the connecting component 12.

Further, the hook-shaped component 11 may also extend in a direction away from the connecting component 12, that is, an overall length of the hook-shaped component 11 may be extended, so that when the earphone 10 is in the wearing state, the hook-shaped component 11 may also form a third contact point A with the rear side of the ear. The first contact point B may be located between the first connection point C and the third contact point A, and close to the first connection point C. For the earphone 10, in the natural state, the distance between the projections of the first contact point B and the third contact point A on a reference plane perpendicular to the extending direction of the connecting component 12 (e.g., the YZ plane in FIG. 11) may be less than the distance between the projections of the first contact point B and the third contact point A on the reference plane perpendicular to the extending direction of the connecting component 12 (e.g., the YZ plane in FIG. 11) in the wearing state. With the arrangement mentioned above, not only can the free end of the hook-shaped component 11 press against the rear side of the ear of the user, but also the ABC section can be in a C shape, wherein the third contact point A may also be arranged in a region of the ear near the earlobe, thus the hook-shaped component 11 may clamp the ear of the user in a vertical direction (as indicated by arrow Z in FIG. 11) to overcome the self-weight of the holding component 13. In addition, after the overall length of the hook-shaped component 11 is extended, the hook-shaped component may not only clamp the ear of the user in the vertical direction but also increase the contact area between the hook-shaped component 11 and the ear of the user, that is, the friction between the hook-shaped component 11 and the ear of the user may be increased, thereby improving the stability of the earphone 10 in terms of wearing.

It should be noted that to take into account the comfort and stability of the earphone 10 in terms of wearing, the following improvements may also be made:

1) Since the hook-shaped component 11 needs to match different ears of users, and the different ears of users may have different sizes and shapes, the free end of the hook-shaped component 11 (for example, the battery part) may be prone to hang in the air when a user with small ears wears the earphone 10. That is, the hook-shaped component 11 and the ear of the user may form the first contact point B only. Accordingly, in combination with FIG. 7 and FIG. 8, for the hook-shaped component 11, an outer diameter of the battery part may be larger than that of the other middle parts, that is, a step difference may exist, thereby forming a structure of progressive necking. With the arrangement mentioned above, in combination with FIG. 9 and FIG. 10, when the user wears the earphone 10, the hook-shaped component 11 may not only form the first contact point B with the ear of the user but also the free end of the hook-shaped component 11 may form the third contact point A with the ear of the user. That is, the battery part may form the third contact point A with the ear of the user under any circumstances. Obviously, to adapt to a wide user group, a plurality of progressive necking structures may be distributed at intervals along the length direction of the hook-shaped component 11.

2) In the same situation, a ratio of the length of the battery part to a long diameter of the outer diameter of the battery part may also affect the attachment of the hook-shaped component 11 to the ear of the user. The inventor(s) of the application has discovered in long-term research that, in combination with FIG. 7 and FIG. 8, the ratio of the length to the long diameter of the outer diameter of the battery part may be within 6:1, preferably may be within 4:1. At this time, the hook-shaped component 11 may not only form the first contact point B with the ear of the user, but the free end may also form the third contact point A with the ear of the user. That is, the battery part may fit the user's ears.

Figure 12:
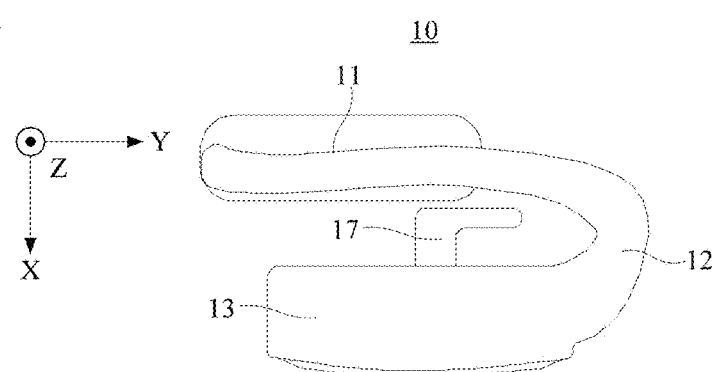
FIG. 12 is a schematic diagram of a top view of a structure of an earphone according to some embodiments of the present disclosure.

Referring to FIG. 12, FIG. 12 is a schematic diagram of a top view of a structure of an earphone according to some embodiments of the present disclosure.

Based on the description mentioned above, in combination with FIG. 1, the ear 100 of the user may generally have recessed regions such as the concha cavity 102, the concha boat 103, the triangular fossa 104, the scapha 106, or the like. Correspondingly, the ear 100 of the user may also generally have protruding regions such as the antihelix 105, the helix 107, a helix feet 109, or the like. Based on the concave and convex structures of the ear 100, the earphone 10 may also be tightly attached with the corresponding positions of the ear 100 by ways of elastic clamping, elastic abutting, hooking and covering, or the like, thereby improving the comfort and reliability of the earphone 10 in terms of wearing.

Further, in combination with FIG. 2 to FIG. 5, outer surfaces of the holding component 13 may be defined as follows: 1) a side of the holding component 13 in contact with the skin of the user may be defined as an inner surface; 2) a side of the holding component 13 opposite to the inner surface in the X-direction may be defined as an outer surface; 3) a side of the holding component 13 facing the positive direction of the Z-direction may be defined as an upper surface; 4) a side of the holding component 13 facing the negative direction of the Z-direction may be defined as a lower surface; 5) a side of the holding component 13 facing the negative direction of the Y direction may be defined as a rear surface. If the holding component 13 does not have a cubic structure such as shown in FIG. 2 and FIG. 3, but has a structure such as a cylinder, an elliptic cylinder, or the like, the upper surface, the lower surface, and the rear surface may be uniformly defined as a peripheral surface.

The main difference from any embodiments mentioned above may be that in the present embodiment, the holding component 13 may not only press against the front side of the ear of the user, but may also be further extended and held in the concha boat and/or the triangular fossa of the ear. With the arrangement mentioned above, the holding component 13 may be stopped and blocked by the helix of the ear at least in the extending direction of the connecting component 12, so as to prevent the holding component 13 from turning out when the earphone 10 is in the wearing state, thereby improving the stability of the earphone 10 in terms of wearing.

Merely by way of example, as shown in FIG. 12, the earphone 10 may further include an extending component 17 connected to the holding component 13. In the extending direction of the connecting component 12 (as indicated by arrow X in FIG. 12), the extending component 17 and the holding component 13 may have a gap, and the gap may be smaller than or equal to the thickness of the helix of the ear. With the arrangement mentioned above, when the earphone 10 is in the wearing state, the extending component 17 may extend into the concha boat and/or the triangular fossa of the ear. At this time, since the concha boat and/or the triangular fossa have a certain depth and volume in the three-dimensional space, the holding component 13 may be hooked by the helix of the ear when the extending component 17 extends into the concha boat and/or the triangular fossa to prevent the holding component 13 from turning out when the earphone 10 is in the wearing state, thereby improving the stability of the earphone 10 in terms of wearing. At the same time, the holding component 13 may be pressed against the front side of the ear under the action of the pressing force mentioned above. The holding component 13 and the front side of the ear may cooperate with each other, which is beneficial to increase the stability of the earphone 10 in terms of wearing.

Figure 17:
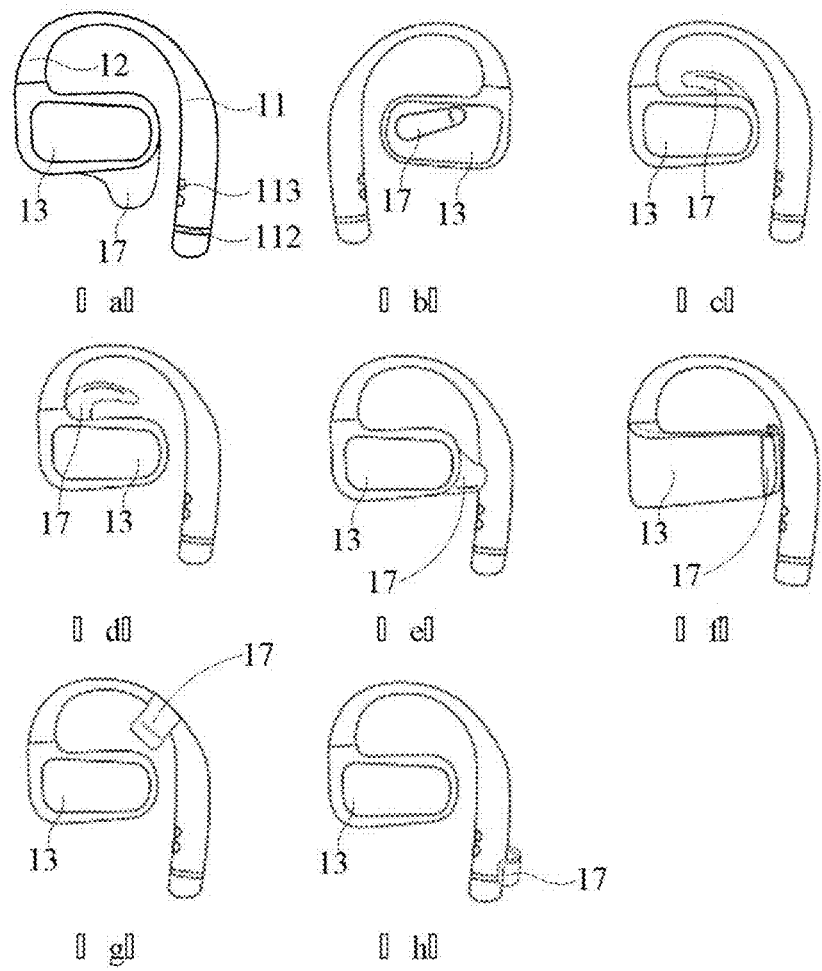
FIG. 17 is a schematic diagram illustrating different structures of the extending component in FIG. 12.

FIG. 17 is a schematic diagram illustrating different structures of the extending component in FIG. 12. In some embodiments, in combination with diagram (a) in FIG. 17, the extending component 17 may be mainly arranged at the inner surface and/or the lower surface of the holding component 13 and arranged to be able to extend into the concha cavity 102 after the user wears the earphone 10. At this time, the extending component 17 may be tightly attached with the concha cavity 102 and the surrounding body tissues in an elastically abutting manner.

In other embodiments, in combination with diagram (b) in FIG. 17, the extending component 17 may be mainly arranged at the inner surface of the holding component 13 and arranged to be able to extend into the concha boat 103 after the user wears the earphone 10. At this time, the extending component 17 may be tightly attached with the concha boat 103 and the surrounding body tissues in a manner of elastic clamping and/or elastic abutting.

In other embodiments, in combination with diagram (c) in FIG. 17, the extending component 17 may be mainly arranged at the upper surface of the holding component 13 and arranged to be able to extend into the triangular fossa 104 after the user wears the earphone 10. At this time, the extending component 17 may be tightly attached with the triangular fossa 104 and the surrounding body tissues in a manner of elastic clamping and/or elastic abutting.

In other embodiments, in combination with diagrams (d) or (e) in FIG. 17, the extending component 17 may be mainly arranged at the upper surface and/or the rear surface of the holding component 13 and arranged so as to be able to extend into the scapha 106 after the user wears the earphone 10. At this time, the extending component 17 may be tightly attached with the scapha 106 and the surrounding body tissues in a manner of elastic clamping and/or elastic abutting.

In other embodiments, in combination with diagram (f) in FIG. 17, the extending component 17 may be mainly arranged at the rear surface of the holding component 13 and arranged to be able to bend and extend from the front side of the ear 100 to the rear side of the ear 100 after the user wears the earphone 10 to hook the helix 107. At this time, the extending component 17 may be tightly attached with the helix 107 and the surrounding body tissues in a manner of hooking and covering.

In other embodiments, in combination with diagram (g) in FIG. 17, the extending component 17 may be mainly arranged on the hook-shaped component 11, for example, a position of the hook-shaped component 11 close to the battery part. The extending component 17 may be configured to be able to bend and extend from the rear side of the ear 100 to the front side of the ear 100 after the user wears the earphone 10 to hook the antihelix 105. At this time, the extending component 17 may be tightly attached with the antihelix 105 and the surrounding body tissues in a manner of hooking and covering.

In other embodiments, in combination with diagram (h) in FIG. 17, the extending component 17 may be mainly arranged on the hook-shaped component 11, such as the battery part, and configured to be able to bend and extend from the rear side of the ear 100 to the front side of the ear 100 after the user wears the earphone 10, thereby hooking the helix 107. At this time, the extending component 17 may be tightly attached with the helix 107 and the surrounding body tissues in a manner of hooking and covering.

It should be noted that structural parameters such as a size and a shape of the extending component 17 may be profiled and designed according to the matching requirements between the extending component 17 and the ear 100, which may not be limited herein. Further, the extending component 17 and the corresponding structural component on the earphone 10 may be integrally formed, that is, the extending component 17 and the corresponding structural component on the earphone 10 may not be detached. In some embodiments, the extending component 17 and the corresponding structural component on the earphone 10 may also be connected in a detachable manner. For example, the holding component 13 or the corresponding position of the battery part may be configured with a mounting hole, and the extending component 17 may be embedded in the mounting hole. As another example, the extending component 17 may be integrally formed with another elastic sleeve, so that the extending component 17 may be sleeved at a corresponding position on the holding component 13 or the hook-shaped component 11 through the elastic sleeve.

Further, in combination with FIG. 12, the size of the holding component 13 in the Y direction may be in a range of 22-34 mm, preferably may be in a range of 24-28 mm, and more preferably may be 26 mm, so that the holding component 13 may be pressed on the front side of the ear 100. At this time, in combination with FIG. 17, a height size of the extending component 17 in the Z direction may be in a range of 4-8 mm, and the length of the projection of the extending component 17 on the XY plane may be in a range of 8-15 mm, and the width of the projection may be in a range of 2-5 mm.

Referring to FIG. 13, FIG. 13 is a schematic diagram illustrating a front view of a structure of an earphone according to some embodiments of the present disclosure.

The main difference from any of the embodiments mentioned above may be that in the present embodiment, the holding component 13 may be a multi-section structure to facilitate adjustment of the relative position of the core 14 on the overall structure of the earphone 10. With the arrangement mentioned above, when the earphone 10 is in the wearing state, an external ear canal of the ear may not be covered, and the core 14 may be as close as possible to the external ear canal.

Merely by way of example, as shown in diagram (a) in FIG. 13, the holding component 13 may include a first holding section 131a, a second holding section 132a, and a third holding section 133a connected end to end in sequence. An end of the first holding section 131a away from the second holding section 132a may be connected to the connecting component 12. The third holding section 133a may be mainly configured to set up structural assemblies such as the core 14, the mainboard 15, or the like. Further, the second holding section 132a may be folded back relative to the first holding section 131a and maintains a distance therebetween to make the first holding section 131a and the second holding section 132a be in a U-shaped structure.

Merely by way of example, as shown in diagram (b) in FIG. 13, the holding component 13 may include a first holding section 131b, a second holding section 132b, and a third holding section 133b connected end to end in sequence. An end of the first holding section 131b away from the second holding section 132b may be connected to the connecting component 12. The third holding section 133b may be mainly configured to set up structural assemblies such as the core 14, the mainboard 15, or the like. Further, the second holding section 132b may be bent relative to the first holding section 131b, so that the third holding section 133b and the first holding section 131b may be provided with a distance.

Referring to FIG. 14 and FIG. 15, FIG. 14 is a schematic diagram illustrating a structure of an earphone according to some embodiments of the present disclosure. FIG. 15 is a schematic diagram illustrating a mechanical model of the earphone 10 in FIG. 14 in a wearing state. It should be noted that the YZ plane in FIG. 15 may be regarded as the plane where the head of the user is located. The BC section in FIG. 15 may be regarded as the hook-shaped component, the CD section in FIG. 15 may be regarded as the connecting component, the DEF section in FIG. 15 may be regarded as the holding component, and the GH section in FIG. 15 may be regarded as the extending component. Further, the point C in FIG. 15 may correspond to the region where the upper proximal end of the ear in FIG. 1 is located (e.g., the region indicated by the dashed box C in FIG. 1).

The main difference from any of the embodiments mentioned above may be that in the present embodiment, as shown in FIG. 14, the length of the hook-shaped component 11 may be relatively short, and the angle between the hook-shaped component 11 and the connecting component 12 may be relatively small. The extending component 17 may be connected to the holding component 13 and have a gap with the holding component 13. The gap may be less than or equal to the thickness of the helix of the ear. With the arrangement mentioned above, when the earphone 10 is in the wearing state, the hook-shaped component 11 may cooperate with the connecting component 12 so that the holding component 13 can be hung on the front side of the ear of the user, and the extending component 17 may extend into the concha boat and/or the triangular fossa of the ear to prevent the holding component 13 from turning out, thereby improving the stability of the earphone 10 in terms of wearing. In the embodiment, the extending component 17 that can be extended into the concha boat of the ear may be taken as an example for illustration.

As shown in FIG. 15, the point B may hook the depression on the rear side of the ear, and the point C may be regarded as the fulcrum, so that the hook-shaped component 11 may overcome the weight of the holding component 13, thereby preventing the holding component 13 from falling from the ear of the user. At this time, the friction between the hook-shaped component 11 and the ear may be increased to improve the stability of the earphone 10 in terms of wearing. Further, the point H may hook the helix of the ear, and the point G may be regarded as another fulcrum, so that the extending component 17 may overcome the weight of the holding component 13, thereby preventing the holding component 13 from turning out of the ear of the user. At this time, the friction between the extending component 17 and the ear may be increased to improve the stability of the earphone 10 in terms of wearing.

Based on the related description mentioned above, different users may have large differences in age, gender, and gene-controlled trait expression. As a result, the ears and heads of different users may be of different sizes and shapes. On the basis of any of the embodiments mentioned above, the following improvements may also be made to related structures of the earphone 10 so that the earphone 10 may meet the wearing needs of a wider user group and enable different users to have good comfort and stability when wearing the earphone 10.

Figure 18:
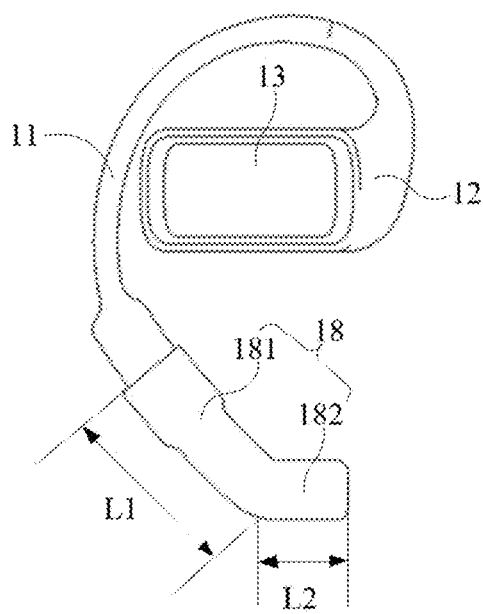
FIG. 18 is a schematic diagram illustrating a structure of an earphone according to some embodiments of the present disclosure.

Referring to FIG. 18, FIG. 18 is a schematic diagram illustrating a structure of an earphone according to some embodiments of the present disclosure.

The main difference from any of the embodiments mentioned above may be that in the present embodiment, in combination with FIG. 18, the free end of the hook-shaped component 11 may also be configured with an elastic structure 18. The elastic structure 18 may be made of soft materials, have a certain structural strength, and may take into account the comfort of the user wearing the earphone 10. Further, the elastic structure 18 may be tubular, and may be detachably sleeved on the free end of the hook-shaped component 11. In such cases, the elastic structure 18 may be used as an accessory of the earphone 10 to facilitate the user to install or disassemble according to actual usage requirements. In some embodiments, a part of the elastic structure 18 contacting the user may be configured with a texture structure and/or a matte surface.

Merely by way of example, the elastic structure 18 may include a first tubular part 181 and a second tubular part 182 that are integrally connected with each other. The first tubular part 181 and the second tubular part 182 may be in a bent shape, and a bending angle may be reasonably designed according to actual usage requirements. In some embodiments, the elastic structure 18 may have a certain memory performance at least at the bending position thereof, so that the user may flexibly adjust the bending angle through bending, turning, or the like. With the arrangement mentioned above, during the process that the user wears the earphone 10, the elastic structure 18 may hook the ear socket of the ear from the rear side of the ear of the user to prevent the earphone 10 from falling off.

Further, both the first tubular part 181 and the second tubular part 182 may have a hollow tubular shape, and the first tubular part 181 and the second tubular part 182 may be in communication with each other or not in communication with each other. The first tubular part 181 and the second tubular part 182 may both be sleeved on the free end of the hook-shaped component 11. In the embodiment, the first tubular part 181 and the second tubular part 182 not connecting with each other may be taken as an example for illustrative description, the structural strength of the elastic structure 18 at a bending position may be improved. The length (L1) of the first tubular part 181 and the length (L2) of the second tubular part 182 may not be equal, so that the user may select one of the first tubular part 181 and the second tubular part 182 to be sleeved on the free end of the hook-shaped component 11 according to actual usage requirements, thereby adjusting the actual total length of the hook-shaped component 11 and the elastic structure 18. In such cases, the elastic structure 18 may partially or completely cover the battery part. In combination with FIG. 18, in the embodiment, the elastic structure 18 partially covering the battery part may be taken as an example for illustrative description, for example, the elastic structure 18 may cover half of the battery part.

In the long-term study, the inventors of the present disclosure discovered that, in combination with FIG. 18, when a length difference between the length (L1) of the first tubular part 181 and the length (L2) of the second tubular part 182 is within the range of 2.0-8.0 mm, the elastic structure 18 may hook the ear socket on the rear side of the ear when different users wear the earphone 10. In some embodiments, the length difference may be within the range of 3.5 to 7.0 mm.

Based on the detailed description mentioned above, after the free end of the hook-shaped component 11 is sheathed with the elastic structure 18, the outer diameter of the battery part may also be increased. That is, the actual outer diameter of the free end of the hook-shaped component 11 may be changed, so that an opening angle of the outer auricle of different user groups may be adapted, especially the "wind ears", thereby solving the problems of rotation and eversion of the earphone 10. By designing the wall thickness of the first tubular part 181 and/or the second tubular part 182, a difference may be formed between the elastic structure 18 and the battery part, so as to achieve a technical effect similar to the progressive necking mentioned above.

Figure 19:
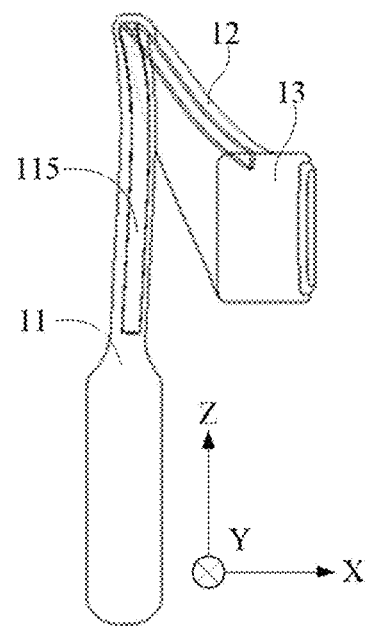
FIG. 19 is a schematic diagram illustrating a perspective view of a structure of the hook-shaped component in FIG. 8.
Figure 20:
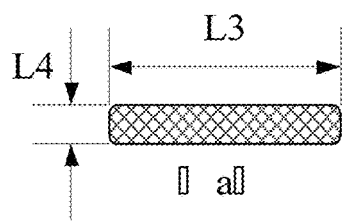
FIG. 20 is a schematic diagram illustrating a cross-sectional structure of the elastic metal wire in FIG. 19 on a reference plane perpendicular to an extending direction of the hook-shaped component.
Figure 20:
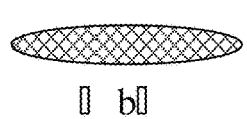
Figure 20:
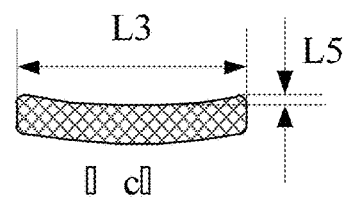

Referring to FIG. 19 and FIG. 20, FIG. 19 is a schematic diagram illustrating a perspective view of a structure of the hook-shaped component in FIG. 8. FIG. 20 is a schematic diagram illustrating a cross-sectional structure of the elastic metal wire in FIG. 19 on a reference plane perpendicular to an extending direction of the hook-shaped component. It should be noted that the elastic metal wire shown in FIG. 19 may be generally embedded in the hook-shaped component, or the like, which is not visible. In order to facilitate the description, the elastic metal wire may be shown as externally visible, for example, part of the material covering the elastic metal wire may be removed.

Based on the related description above, the hook-shaped component 11, the connecting component 12, the holding component 13, or other structures may also be configured with an elastic metal wire 115 such as a spring steel wire, a titanium alloy wire, a titanium nickel alloy wire, a chromium-molybdenum steel wire, or the like, to improve the structural strength of the earphone 10. Generally, the cross-section of the elastic metal wire 115 may be circular.

In combination with FIG. 19 and FIG. 20, the elastic metal wire 115 may have a flat sheet structure, so that the elastic metal wire 115 may have different deformability in various directions. The cross-section of the elastic metal wire 115 may be a rounded rectangle as shown in diagram (a) in FIG. 20. The cross-section of the elastic metal wire 115 may also be an ellipse as shown in diagram (b) in FIG. 20. Merely by way of example, a ratio of a long side (or a major axis, L3) of the elastic metal wire 115 to a short side (or a minor axis, L4) may be within the range of 4:1-6:1, preferably may be 5:1. Further, in combination with diagram (c) in FIG. 20, for the cross-section of the elastic metal wire 115 with the rounded rectangle shown in diagram (a) in FIG. 20, the elastic metal wire 115 may also be made into an arc shape in a minor axis direction through a process such as stamping, pre-bending, or the like, so that the elastic metal wire 115 may store a certain amount of elastic potential energy. For example, an original state of the elastic metal wire 115 may be in a curled state, and after straightening, the state of the elastic metal wire 115 may be made into the arc shape in the minor axis direction through the process of stamping, so that the elastic metal wire 115 may store certain internal stress and maintain a straight shape to become a "memory metal wire". When receiving a relatively small external force, the elastic metal wire 115 may return to the curled state, so that the hook-shaped component 11 may attach to and cover the ear of the user. Merely by way of example, a ratio of an arc height (L5) of the elastic metal wire 115 to the long side (L3) may be within the range of 0.1-0.4.

With the arrangement mentioned above, under the action of the elastic metal wire 115 with the flat sheet structure, the hook-shaped component 11 have a strong rigidity in the X direction, thereby making the hook-shaped component 11 and the holding component 13 cooperate to form an elastic clamp for the ear 100 of the user. In addition, the hook-shaped component 11 may have strong elasticity due to the bending along the length direction, so that the hook-shaped component 11 may be elastically pressed against the ear or the head of the user.

Figure 21:
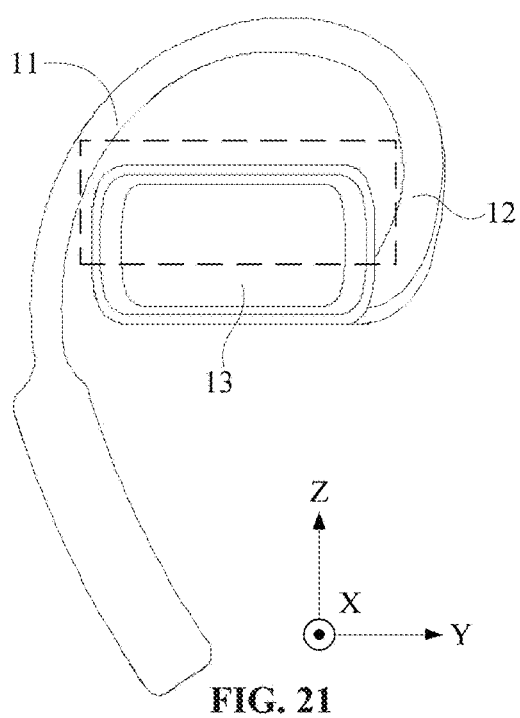
FIG. 21 is a schematic diagram illustrating a front view of a structure of an earphone according to some embodiments of the present disclosure.

Referring to FIG. 21, FIG. 21 is a schematic diagram illustrating a front view of a structure of an earphone according to some embodiments of the present disclosure.

The main difference from any of the embodiments mentioned above may be that in the present embodiment, in combination with FIG. 21, in order to improve the comfort and stability of the earphone 10 in terms of wearing, a connection position between the connecting component 12 and the holding component 13 may also be adjusted. For example, the connecting component 12 may be mainly connected with the lower edge of the holding component 13, so that the upper half of the holding component 13 (as indicated by the dashed frame in FIG. 21) may not be restricted by the connecting component 12, thereby compensating the turning moment of the holding component 13 facing away from the outside of the ear 100.

Figure 22:
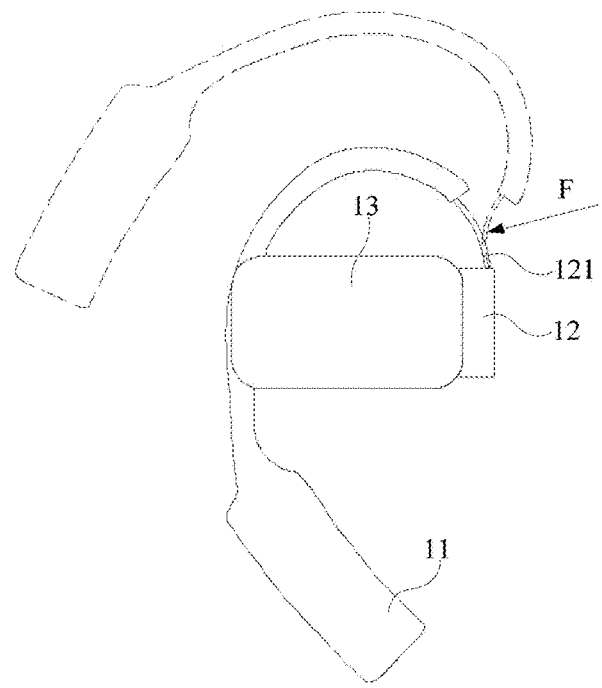
FIG. 22 is a schematic diagram illustrating a structure of a rotating shaft assembly according to an embodiment of the present disclosure.

Referring to FIG. 22 and FIG. 23, FIG. 22 is a schematic diagram illustrating a structure of a rotating shaft assembly according to an embodiment of the present disclosure. FIG. 23 is a schematic diagram illustrating a structure of the rotating shaft assembly in FIG. 22 before and after assembly. It should be noted that the rotating shaft assembly shown in FIG. 22 may be generally embedded in the connecting component, or the like, which is not visible. In order to facilitate the description, the rotating shaft assembly may be shown as externally visible, for example, a part of the material covering the rotating shaft assembly may be removed.

As shown in FIG. 22, a rotating shaft mechanism 121 may be arranged to be a bending metal elastic sheet. One end of the rotating shaft mechanism 121 may be connected to the hook-shaped component 11, and the other end may be used as part of the connecting component 12. For example, the metal elastic sheet may be integrated with the connecting component 12 through a process of metal insert injection molding, and connected with the hook-shaped component 11. With the arrangement mentioned above, the metal elastic sheet may be deformed under the action of the external force F, so that the hook-shaped component 11 may be switched between a first usage state (for example, as indicated by the solid line in FIG. 22) and a second usage state (for example, as indicated by the dashed line in FIG. 22) relative to the holding component 13. That is, the hook-shaped component 11 may rotate relative to the holding component 13.

Merely by way of example, in combination with FIG. 23, the metal elastic sheet may include a first deformed part 1211, a second deformed part 1212, and an intermediate connecting component 1213. Before the installation of the metal elastic sheet, in combination with diagram (a) in FIG. 23, the first deformed part 1211 and the second deformed part 1212 may be bent and connected to two ends of the intermediate connecting component 1213, respectively. Further, after the metal elastic sheet is installed, in combination with diagram (b) in FIG. 23, the free end of the first deformed part 1211 away from the intermediate connecting component 1213 and the free end of the second deformed part 1212 away from the intermediate connecting component 1213 may be directly hinged to form a triangular structure, and curved along the length direction of the hook-shaped component 11, or further connected to the elastic metal wire in the hook-shaped component 11. With the arrangement mentioned above, the metal elastic sheet may store a certain amount of elastic potential energy after installation, so that the metal elastic sheet may deform under the action of the external force F.

Further, before the installation of the metal elastic sheet, in combination with diagram (a) in FIG. 23, the length of the first deformed part 1211 and the length of the second deformed part 1212 may be equal (denoted as L6), and may be greater than the length of the intermediate connecting component 1213 (L7). L3 and L4 may satisfy the following relationship: $0.1 \leq L7/L6 \leq 0.6$. In some embodiments, the thickness of the metal elastic sheet may be in a range of 0.1-0.8 mm.

Referring to FIG. 24 to FIG. 28, FIG. 24 is a schematic diagram illustrating a structure of a rotating shaft assembly according to another embodiment of the present disclosure. FIG. 25 is a schematic diagram illustrating a disassembled structure of the rotating shaft assembly in FIG. 24 according to an embodiment of the present disclosure. FIG. 26 is a schematic diagram illustrating a cross-sectional structure of the rotating shaft assembly in FIG. 25. FIG. 27 is a schematic diagram illustrating a disassembled structure of the rotating shaft assembly in FIG. 24 according to another embodiment of the present disclosure. FIG. 28 is a schematic diagram illustrating a cross-sectional structure of the rotating shaft assembly in FIG. 27.

Merely by way of example, in combination with FIG. 24, the rotating shaft mechanism 121 may include a first connecting seat 1214, a second connecting seat 1215, a rotating shaft 1216, and an elastic assembly 1217. The first connecting seat 1214 may be part of the connecting component 12. The second connecting seat 1215 may be connected to the hook-shaped component 11 (or the metal elastic wire 115 therein). The second connecting seat 1215 may also be used as a part of the hook-shaped component 11. Further, the first connecting seat 1214 and the second connecting seat 1215 may be connected by the rotating shaft 1216, so that the first connecting seat 1214 and the second connecting seat 1215 may rotate relatively, and the hook-shaped component 11 may rotate relative to the connecting component 12 and the holding component 13 through the rotating shaft mechanism 121. In combination with FIG. 25 to FIG. 28, the elastic assembly 1217 may be arranged to be elastically supported between the first connecting seat 1214 and the second connecting seat 1215 so as to maintain the state of the hook-shaped component 11 after rotating relative to the holding component 13. With the arrangement mentioned above, when the user wears the earphone 10, the hook-shaped component 11 may be adjusted to be more attachable to the ear 100, thereby improving the comfort and stability of the earphone 10 in terms of wearing.

In some embodiments, in combination with FIG. 25 and FIG. 26, the second connecting seat 1215 may be partially inserted into the first connecting seat 1214, so that the rotating shaft 1216 may pass through the first connecting seat 1214 and the second connecting seat 1215 at the same time to realize the rotational cooperation. Further, the first connecting seat 1214 may be configured with an accommodating cavity 12141 with an open end, and the elastic assembly 1217 may include an elastic member 12171 and a supporting and holding member 12172. The elastic member 12171 may be arranged in the accommodating cavity 12141. One end of the supporting and holding member 12172 may partially extend into the accommodating cavity 12141 to support and hold the elastic member 12171. The other end of the supporting and holding member 12172 may support and hold the second connecting seat 1215.

It should be noted that in order to facilitate the elastic assembly 1217 to be elastically supported between the first connecting seat 1214 and the second connecting seat 1215, the elastic member 12171 may be in a compressed state after the rotating shaft mechanism 121 is assembled. In such cases, when the user wears the earphone 10, especially when the ear 100 of the user is large, the hook-shaped component 11 and the elastic metal wire 115 therein may be forced to rotate relative to the holding component 13, or have a tendency to rotate, thereby causing the second connecting seat 1215 to rotate relative to the first connecting seat 1214, and causing the supporting and holding member 12172 to compress the elastic member 12171. Based on Newton's third law, the elastic member 12171 may react to the supporting and holding member 12172 to support and hold the second connecting seat 1215, thereby at least making the hook-shaped component 11 be attached to the ear 100 of the user more closely.

In other embodiments, in combination with FIG. 27 and FIG. 28, the end of the supporting and holding member 12172 facing away from the elastic member 12171 may be set in a spherical structure, a columnar structure, or the like. The end of the second connecting seat 1215 away from the elastic metal wire 115 may be configured with a plurality of grooves distributed along a circumferential direction of the rotating shaft 1216. The supporting and holding member 12172 may be partially clamped into the grooves under the action of the elastic force of the elastic member 12171. In other words, after the hook-shaped component 11 rotates to different angles relative to the holding component 13, the supporting and holding member 12172 may be locked into different grooves, respectively, thereby achieving the purpose of multi-level adjustment.

Figure 29:
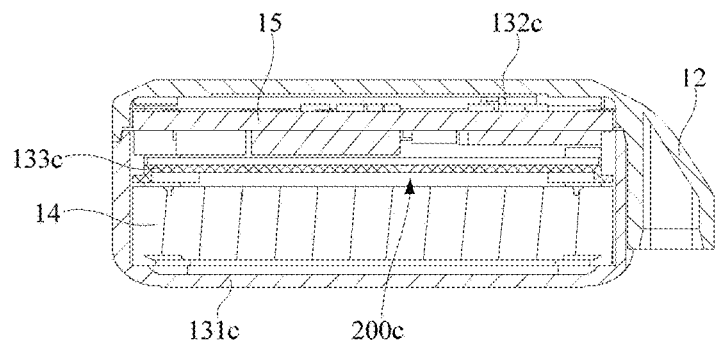
FIG. 29 is a schematic diagram illustrating a cross-sectional structure of an earphone in an XY plane according to some embodiments of the present disclosure.

Referring to FIG. 29, FIG. 29 is a schematic diagram illustrating a cross-sectional structure of an earphone in an XY plane according to some embodiments of the present disclosure.

In some embodiments, the earphone 10 may be an air conduction earphone. Taking the earphone 10 being the air conduction earphone an example, the holding component, the core, the mainboard, or other structural parts may be exemplarily described:

In combination with FIG. 29, the holding component 13 may include an inner housing 131*c* and an outer housing 132*c*, which may be connected to form a cavity structure for accommodating structural components such as the core 14, the mainboard 15, or the like. It should be noted that when the user wears the earphone 10, the inner housing 131*c* may be mainly in contact with the ear 100 of the user. Since a large number of electronic components with different sizes and shapes are often integrated on the mainboard 15, the inside of the cavity of the holding component 13 may become extremely complicated, which may easily affect the acoustic performance of the earphone 10. Accordingly, in the embodiment, a partition 133*c* may be arranged in the holding component 13 to separate the core 14 and the mainboard 15 and form a cavity 200*c* independent of the mainboard 15. The cavity 200*c* may have a relatively smooth inner wall. With the arrangement mentioned above, since the cavity 200*c* can be protected from the influence of the mainboard 15 and the electronic components thereon, the acoustic performance of the earphone 10 may be effectively improved.

Merely by way of example, the partition 133*c* may be directly connected to the core 14, for example, the partition 133*c* and the core 14 may be glued together to directly form the cavity 200*c*. The inner wall of the cavity 200*c* formed by the partition 133*c* and the core 14 may avoid sharp structures such as right angles, sharp corners, or the like, as much as possible. Further, edges of the partition 133*c* and the core 14 may also be wrapped with an elastic member (not shown in the figure), thereby forming an interference fit with the inner wall of the holding component 13 to achieve acoustic sealing.

Based on the description mentioned above, in the wearing state, the earphone 10 may be clamped on the ear. In order to increase the stability and comfort in terms of wearing, the earphone 10 may elastically clamp the ear.

Figure 30:
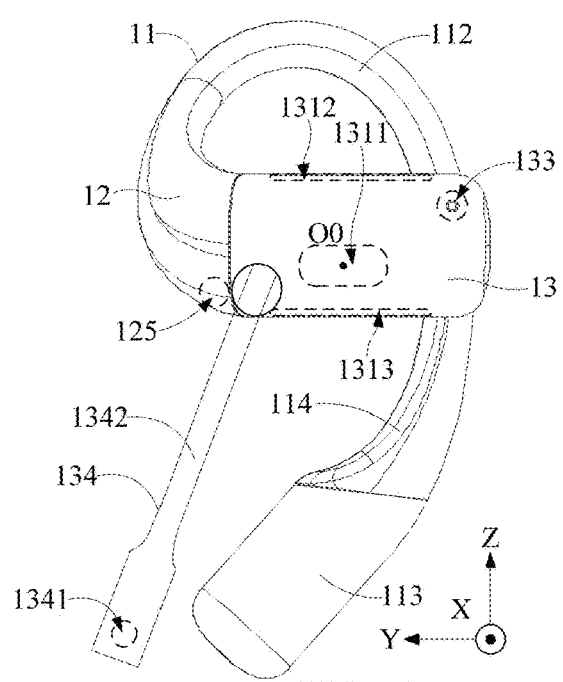
FIG. 30 is a schematic diagram illustrating a structure of an earphone on a side facing away from an ear according to some embodiments of the present disclosure.

Merely by way of example, in combination with FIG. 30, FIG. 30 is a schematic diagram illustrating a structure of an earphone on a side facing away from an ear according to some embodiments of the present disclosure. The hook-shaped component 11 may include an elastic component 112 connected to the connecting component 12 and a battery part 113 arranged at the free end of the hook-shaped component 11. The battery part 113 may be at least used to set the battery 16 of the earphone 10. The battery 16 may be arranged in a columnar shape. In order to facilitate the setting of the battery 16, the battery part 113 may be made of hard materials, such as a hard plastic material. Considering the wearing comfort, at least the region of the battery part 113 that is in contact with the skin of the user may be configured with an elastic covering layer, sprayed with elastic paint, or the like. Further, compared with the battery part 113, the elastic component 112 may have a certain elastic deformation ability, so that the hook-shaped component 11 may be deformed under the action of an external force, thereby generating a displacement relative to the holding component 13 to allow the hook-shaped component 11 to cooperate with the holding component 13 to elastically clamp the ear. During a process that the user is wearing the earphone 10, the user may first apply a little force to make the hook-shaped component 11 deviate from the holding component 13, so that the ear may extend between the holding component 13 and the hook-shaped component 11. After a wearing position is suitable, the user may let go to allow the earphone 10 to clamp the ear elastically. In some embodiments, the wearing position of the earphone 10 on the ear may also be further adjusted according to the actual wearing situations.

In some embodiments, a ratio of the length of the elastic component 112 to the length of the hook-shaped component 11 may be greater than or equal to 48%, and preferably may be greater than or equal to 60%. A radial size in any direction on the cross-section of the elastic component 112 may be smaller than or equal to 5 mm, and preferably may be smaller than or equal to 4 mm. In such cases, the elastic component 112 may be arranged in a slender structure, so that the elastic component 112 may have an excellent elastic deformation ability, thereby causing the earphone 10 elastically clamp the ear relatively well. In addition, an area of the cross-section of the elastic component 112 may be as small as possible, which can leave a corresponding wearing space for myopia glasses, hyperopia glasses, or smart glasses such as AR, VR, MR, or the like, thereby taking into account of the other wearing needs of the user. Further, since the hook-shaped component 11 is mainly hung between the head and the ear of the user, the cross-section of the elastic component 112 may be circular or elliptical, so that at least the elastic component 112 may make good contact with the ear and/or the head, and may be as close as possible to a boundary line between the ear and the head, thereby increasing the stability of wearing.

In some embodiments, a cross-sectional area of at least a part of the battery part 113 may be greater than the maximum cross-sectional area of the elastic component 112, so that the battery part 113 may be configured with the battery 16 with a relatively large capacity to increase the endurance of the earphone 10. In some embodiments, the battery part 113 may be arranged in a columnar shape, and the ratio of the length to the outer diameter may be less than or equal to 6.

Based on the related description above, for the hook-shaped component 11, since the elastic component 112 and the battery part 113 have different uses, the cross-sectional areas of the elastic component 112 and the battery part 113 may be quite different. Accordingly, the hook-shaped component 11 may further include a transition part 114 between the elastic component 112 and the battery part 113. A cross-sectional area of the transition part 114 may be between the cross-sectional area of the elastic component 112 and the cross-sectional area of the battery part 113, and gradually increase in a direction from the elastic component 112 to the battery part 113. In such cases, not only can the uniformity of the hook-shaped component 11 be increased in appearance, but also can make the hook-shaped component 11 good contact with the ear and/or the head. Further, since there are generally multiple bulges on the rear side of the ear, for example, a concha boat bulge corresponding to the concha boat and a concha cavity bulge corresponding to the concha cavity, and the concha cavity bulge is generally closer to the earlobe than the concha boat bulge, so that the transition part 114 may be configured with a profile depression corresponding to a rear contour of the ear on a side facing the ear, thereby helping the hook-shaped component 11 to form an effective contact with the rear side of the ear. For example, the profile depression may be in contact with the concha cavity bulge of the ear. In short, the bulges on the rear side of the ear may be avoided through the profile depression, so as to prevent the bulges on the rear side of the ear from pushing up the hook-shaped component 11, and make the hook-shaped component 11 good contact with the ear. In some embodiments, for the transition part 114, on a reference cross-section set along a central axis of the battery part 113, a radius of curvature of the profile depression may be smaller than a radius of curvature of the other side of the transition part 114 facing away from the ear. That is, a degree of curvature of the profile depression may be greater, so that the hook-shaped component 11 may adapt to various bulges and depressions on the rear side of the ear. The other regions of the transition part 114 may be mainly configured to smooth the gap between the elastic component 112 and the battery part 113 as quickly as possible, thereby increasing the uniformity of the hook-shaped component 11 in appearance.

It may be well known that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up and down direction of the body, which divides the human body into upper and lower parts. Correspondingly, the sagittal axis may refer to an axis that passes through the coronal plane perpendicular to the front and rear direction of the body. The coronal axis may refer to an axis that passes through the sagittal plane perpendicular to the left and right direction of the body. The vertical axis may refer to an axis that passes vertically through the horizontal plane along the up and down direction of the body.

Figure 31:
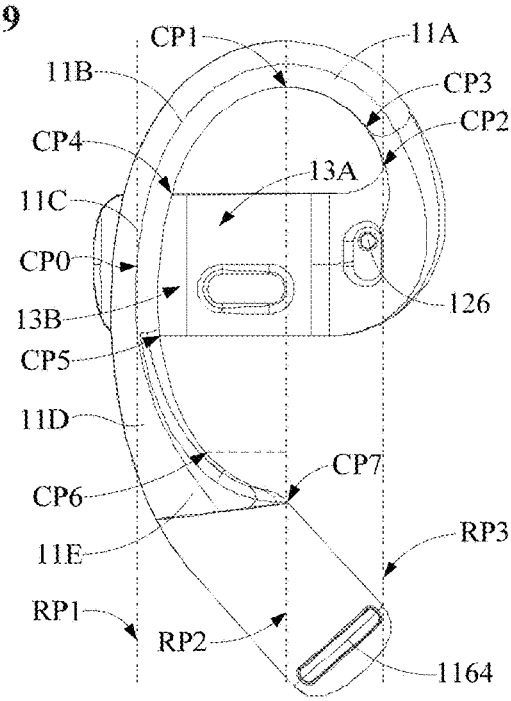
FIG. 31 is a schematic diagram illustrating a structure of an earphone on a side facing an ear according to some embodiments of the present disclosure.

Based on the related description above, the weight and the distribution of the weight of the earphone 10 may affect the stability of wearing to a certain extent. The weight of the hook-shaped component 11 may be mainly concentrated at the battery part 113. In some embodiments, a weight ratio of the total weight of the holding component 13 to the total weight of the battery part 113 may be smaller than or equal to 4. FIG. 31 is a schematic diagram illustrating a structure of an earphone on a side facing an ear according to some embodiments of the present disclosure. In combination with FIG. 31, in the wearing state and viewed from the side of the holding component 13 away from the ear, the battery part 113 may be at least partially arranged at a side of a first reference plane (denoted as RP1) facing directly in front of the user. The first reference plane may pass through the contact point (denoted as CP0) between the holding component 13 and the ear and may be parallel to the coronal plane. In such cases, it may be beneficial to reduce a moment of the center of gravity of the battery part 113 relative to, for example, the upper ear root, to prevent the battery part 113 from turning over due to excessive weight and/or excessive moment in the wearing state, thereby increasing the stability of wearing. Further, the battery part 113 may also intersect with a second reference plane (denoted as RP2). The second reference plane may pass through a first position point (denoted as CP1) of the elastic component 112 closest to the top of the head of the user along the vertical axis and may be parallel to the coronal plane. Further, an inner edge of the hook-shaped component 11 or the connecting component 12 facing the ear may have a second position point (denoted as CP2) farthest from the contact point between the holding component 13 and the ear. The battery part 113 may further intersect with a third reference plane (denoted as RP3). The third reference plane may pass through the second position point and be parallel to the coronal plane. The second position point may be on the connecting component 12, or on the boundary between the hook-shaped component 11 and the connecting component 12, which may be exemplarily illustrated in the following description. In such cases, it may be beneficial for the center of gravity of the battery part 113 and the center of gravity of the holding component 13 to be arranged at the same side of the first reference plane, thereby increasing the stability of wearing.

For ease of description and in combination with FIG. 30, the holding component 13 may have a thickness direction, a length direction, and a height direction orthogonal to each other which may be labeled as "X", "Y" and "Z" in sequence, respectively. The thickness direction may be defined as a direction in which the holding component 13 is close to or away from the ear in the wearing state. The length direction may be defined as a direction in which the holding component 13 is close to or away from the front of the user in the wearing state. The height direction may be defined as a direction in which the holding component 13 is close to or away from the top of the head of the user in the wearing state. In the wearing state, the height direction may be parallel to the vertical axis. The thickness direction and the length direction may be parallel to the horizontal plane.

Figure 32:
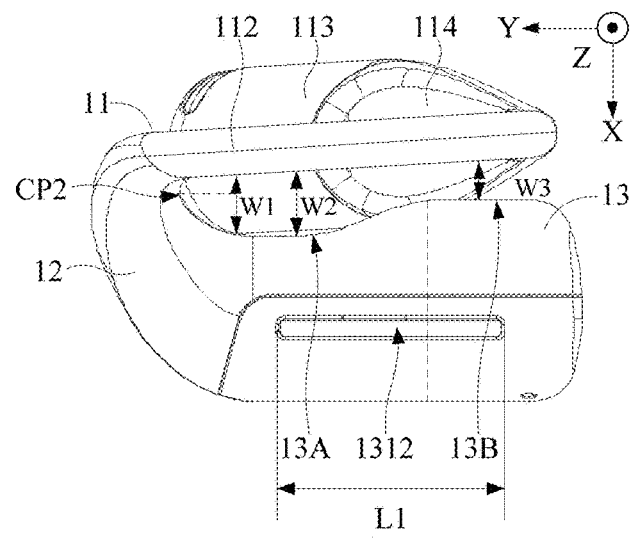
FIG. 32 is a schematic diagram illustrating a structure of an earphone viewed from a side on a top of a user's head according to some embodiments of the present disclosure.

FIG. 32 is a schematic diagram illustrating a structure of an earphone viewed from a side on a top of a user's head according to some embodiments of the present disclosure. In some embodiments, as shown in FIG. 30 to FIG. 32, an orthographic projection of a section of the hook-shaped component 11 close to the connecting component 12 on the reference plane perpendicular to the thickness direction (for example, the plane where YZ is located) and an orthographic projection of the holding component 13 on the reference plane mentioned above may partially overlap. The section of the hook-shaped component 11 close to the connecting component 12 may be an elastic component 112 with a much greater elastic deformation capacity than that of the battery part 113, or may be a rigid structure that is arranged between the battery part 113 and the connecting component 12 and has the same elastic deformation ability as that of the battery part 113. In such cases, not only can the holding component 13 and the hook-shaped component 11 elastically clamp the ear from the front side of the ear and the rear side of the ear, but the clamping force can be mainly manifested as compressive stress, thereby increasing the stability and comfort of wearing. In addition, it may also be beneficial for the center of gravity of the battery part 113 to be close to the face of the user, thereby increasing the stability of wearing. In other embodiments, such as the earphone shown in FIG. 4 and FIG. 5, or the earphone shown in FIG. 9 and FIG. 10, the orthographic projection of the hook-shaped component 11 on the reference plane perpendicular to the thickness direction and the orthographic projection of the holding component 13 on the reference plane mentioned above may also be spaced apart from each other.

Merely by way of example, in combination with FIG. 30 and FIG. 31, the orthographic projection of the elastic component 112 on the reference plane and the orthographic projection of the holding component 13 on the reference plane may partially overlap, and the orthographic projection of the battery part 113 on the reference plane and the orthographic projection of the holding component 13 on the reference plane may be spaced apart from each other. In such cases, it may be advantageous for the holding component 13 and the hook-shaped component 11 to elastically clamp the ear from the front and rear direction.

Further, a radius of curvature of an edge of the orthographic projection of the elastic component 112 and the transition part 114 on the reference plane facing the ear in a direction away from the battery part 113 from the connecting component 12 to the hook-shaped component 11 may be gradually increased first and then gradually decreased. The gradual increase in the radius of curvature of the edge may make the hook-shaped component 11 fit the contour shape of the rear side of the ear. Further, the gradual decrease in the radius of curvature of the edge may increase a bending degree of the hook-shaped component 11 close to the end of the battery part 113, so that the battery part 113 may be brought closer to the holding component 13, which facilitates the hook-shaped component 11 to hook the rear side of the ear to increase the stability of wearing. Further, the radius of curvature of the edge may be gradually increased and then gradually decreased in a continuous manner, or gradually increased first and then gradually decreased in a stepped changing manner, or combined in two manners mentioned above. For example, the edge may include a plurality of sections. Each section may have a radius of curvature, and in a direction from the connecting component 12 to the battery part 113, the radii of curvature of the plurality of sections may be gradually increased first and then gradually decreased, which may also be referred as a stepped change. To increase the stability of wearing, the section with the largest radius of curvature among the plurality of sections may partially overlap with the orthographic projection of the holding component 13 on the reference plane.

Merely by way of example, the edge of the orthographic projection of the elastic component 112 or the transition part 114 on the reference plane toward the ear may have a first section (denoted as 11A). The starting point of the first section (denoted as CP3) may be a connection point between the elastic component 112 and the connecting component 12, and the end point (for example, CP1) may be a highest point of the elastic component along the height direction in the wearing state. A radius of curvature of the first section may be in a range of 8 mm to 10 mm. The starting point of the first section may coincide with the second position point, or farther away from the connecting component 12 than the second position point, which may be illustrated in the following description. Further, the edge of the elastic component 112 or the transition part 114 may also have a second section (denoted as 11B). The starting point of the second section may be the end point of the first section. A distance between the end point of the second section (denoted as CP4) and the highest point in the length direction may be in a range of 8 mm to 11 mm, and a distance between the end point of the second section and the highest point in the height direction may be in a range of 7 mm to 10 mm. A radius of curvature of the second section may be in a range of 9 mm to 12 mm. Further, the edge of the elastic component 112 or the transition part 114 may also have a third section (denoted as 11C). The starting point of the third section may be the end of the second section. A distance between the end point of the third section (denoted as CP5) in the length direction and the highest point may be in a range of 9 mm to 12 mm, and a distance between the end point of the third section and the highest point in the height direction may be in a range of 19 mm to 21 mm. A radius of curvature of the third section may be in a range of 29 mm to 36 mm. Further, the edge of the elastic component 112 or the transition part 114 may also have a fourth section (denoted as 11D). The starting point of the fourth section may be the end of the third section. A distance between the end point of the fourth section (denoted as CP6) in the length direction and the highest point may be in a range of 7 mm to 10 mm, and a distance between the end point of the fourth section and the highest point in the height direction may be in a range of 25 mm to 32 mm. A radius of curvature of the fourth section may be in a range of 19 mm to 25 mm. Further, the edge of the elastic component 112 or the transition part 114 may also have a fifth section (denoted as 11E). The starting point of the fifth section may be the end of the fourth section. A distance between the end point of the fifth section (denoted as CP7) and the highest point in the length direction may be smaller or equal to 2 mm, and a distance between the end point of the fifth section and the highest point in the height direction may be in a range of 30 mm to 38 mm. A radius of curvature of the fifth section may be in a range of 9 mm to 13 mm. The fifth section may be configured with the profile depression, and a radius of curvature of the profile depression may also be smaller than the radius of curvature of the fourth section.

Figure 42:
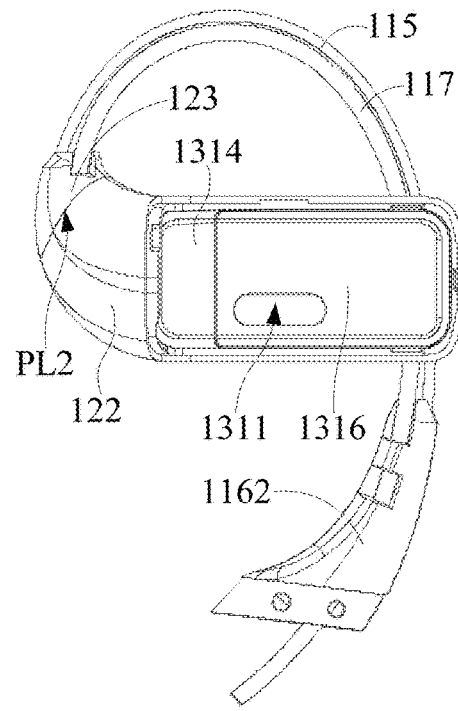
FIG. 42 is a schematic diagram illustrating a structure of an earphone on a side facing away from an ear according to some embodiments of the present disclosure.

It should be noted that the end point of the second section, that is, the starting point of the third section, may be an intersection point between the orthographic projection of the elastic component 112 on the reference plane and the upper edge of the holding component 13. Similarly, the end point of the third section, that is, the starting point of the fourth section, may be another intersection point between the orthographic projection of the elastic component 112 on the reference plane and the lower edge of the holding component 13. In such cases, the orthographic projection of the third section on the reference plane may all fall on the holding component 13. FIG. 42 is a schematic diagram illustrating a structure of an earphone on a side facing away from an ear according to some embodiments of the present disclosure. Further, in combination with FIG. 42, the boundary between the elastic component 112 and the transition part 114 may be located in the fourth section. Correspondingly, the starting point of the section of the hook-shaped component 11 close to the connecting component 12 may be the boundary between the hook-shaped component 11 and the connecting component 12. The end point of the section of the hook-shaped component 11 close to the connecting component 12 may be another intersection point between the orthographic projection of the elastic component 112 on the reference plane and the lower edge of the holding component 13.

Figure 33:
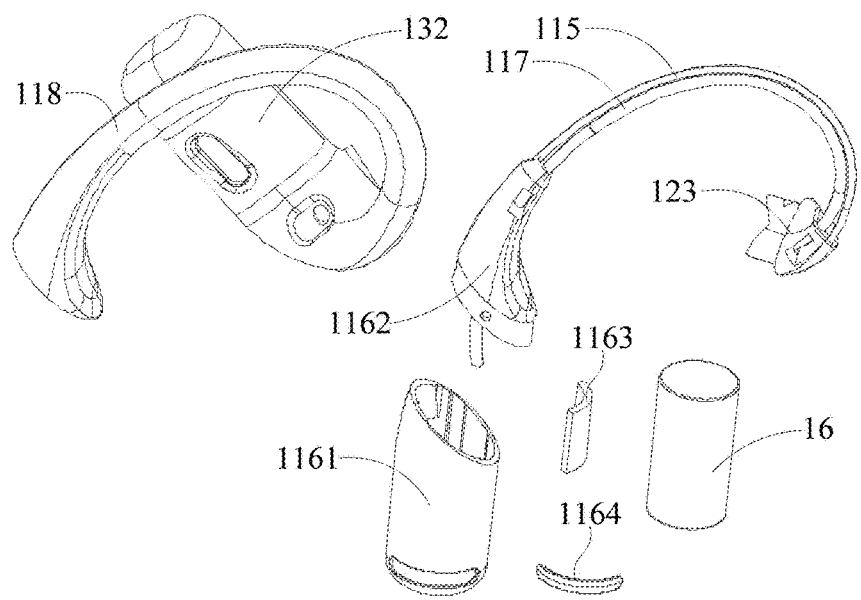
FIG. 33 is a schematic diagram illustrating a disassembled structure of an earphone according to some embodiments of the present disclosure.

FIG. 33 is a schematic diagram illustrating a disassembled structure of an earphone according to some embodiments of the present disclosure. In combination with FIG. 33, the hook-shaped component 11 may include the elastic metal wire 115, a battery compartment 1161, and a wire 117. One end of the elastic metal wire 115 may be connected to the connecting component 12, and the other end may be connected to the battery compartment 1161. The wire 117 may extend from the battery compartment 1161 to the connecting component 12 and the holding component 13 along with the elastic metal wire 115. The elastic metal wire 115 may make the hook-shaped component 11 have a certain elastic deformation ability. The battery compartment 1161 may be at least used to accommodate the battery 16. The wire 117 may be at least used to realize the electrical connection between the battery compartment 1161 and the electronic components in the holding component 13. Further, the hook-shaped component 11 may also include an elastic covering body 118, such as silica gel. The elastic covering body 118 may at least cover the elastic metal wire 115 and the wire 117 to increase the appearance quality and the wearing comfort. A cross-sectional area of the battery compartment 1161 may be greater than the cross-sectional area of the elastic component 112 formed by the elastic metal wire 115 and the elastic covering body 118, preferably greater than a sum of the cross-sectional areas of the elastic metal wire 115, the wire 117, and the elastic covering body 118.

Further, the hook-shaped component 11 may further include a transition member 1162 connected to the elastic metal wire 115, so that the elastic metal wire 115 may be connected to the battery compartment 1161 through the transition member 1162. For example, the transition member 1162 and the elastic metal wire 115 may be formed by a metal insert injection process. The battery compartment 1161 may be arranged in a cylindrical structure with an open end to facilitate the placement of structural members such as the battery 16. The transition member 1162 may be buckled with the open end of the battery compartment 1161. In other embodiments, the transition member 1162 and the battery compartment 1161 may be integrally formed. An end of the battery compartment 1161 away from the transition member 1162 may be arranged in an open shape and may be sealed by a cover plate. A cross-sectional area of the transition member 1162 may gradually increase in a direction along the length of the hook-shaped component 11 and away from the connecting component 12. Correspondingly, the elastic covering body 118 may also cover the transition member 1162. The profile depression may be formed in the transition member 1162 and appear through the elastic covering body 118. In other words, the transition member 1162 may be configured with the profile depression corresponding to the rear contour of the ear on the side facing the ear. On a reference plane set along a central axis of the battery compartment 1161, the radius of curvature of the profile depression may be smaller than the radius of curvature of the other side of the transition member 1162 facing away from the ear. That is, the bending degree of the profile depression may be greater, so that the transition part 114 may avoid the bulge on the rear side of the ear.

Based on the related description mentioned above, in combination with FIG. 42, for the hook-shaped component 11, the elastic component 112 may correspond to a part of the elastic metal wire 115 exposed to the connecting component 12 and the transition member 1162, and mainly include the elastic covering body 118, the elastic metal wire 115, and the wire 117 covered by the elastic covering body 118. The battery part 113 may correspond to the battery compartment 1161, and mainly include the battery compartment 1161 and the battery 16 therein. The transition part 114 may correspond to the transition member 1162, and mainly include the elastic covering body 118 and the transition member 1162 covered by the elastic covering body 118. In other words, the length of the elastic component 112 may be a length of the part of the elastic metal wire 115 exposed from the connecting component 12 and the transition member 1162 and covered by the elastic covering body 118.

Further, the earphone 10 may further include a processing circuit and a detecting member 1163 coupled with the processing circuit. The detecting member 1163 may be used to detect whether the hook-shaped component 11 is hung between the rear side of the ear and the head. The processing circuit may be used to determine whether the earphone 10 is in the wearing state according to the detection result of the detecting member 1163. The processing circuit may be integrated on the mainboard 15. The detecting member 1163 may be a sensing element arranged on the hook-shaped component 11 (for example, the transition member 1162 or the battery compartment 1161) facing the ear. The sensing element may include a capacitive sensing element, an inductive sensing element, a resistance sensing element, or the like, or any combination thereof. Merely by way of example, the detecting member 1163 may be a capacitive sensing element, and may be arranged in the profile depression of the transition member 1162.

In some application scenarios, when the detecting member 1163 detects that the earphone 10 is in the wearing state, the processing circuit may generate a first control signal for controlling the earphone 10 to switch to a playing state. When the detecting member 1163 does not detect that the earphone 10 is in the wearing state, the processing circuit may generate a second control signal for controlling the earphone 10 to switch to a pause state. In such cases, not only may the power of the earphone 10 be saved, but also the interactivity of the earphone 10 may be increased.

In other application scenarios, the earphone 10 may include a first earphone and a second earphone that are arranged in a pair and are communicatively connected. For example, the first earphone and the second earphone may be worn on the left and right ears of the user, respectively, and each of the first earphone and the second earphone may be configured with the detecting member 1163. The processing circuit may determine and select one of the first earphone and the second earphone as the main earphone to be communicatively connected with an audio source device (such as a mobile phone, a tablet, a smartwatch, etc.) according to detection results of the detecting member 1163 in the first earphone and the second earphone. When the user uses two earphones at the same time, one of the earphones may be selected as the main earphone to be communicatively connected with the audio source device according to a predetermined rule, and the other one may be selected as an auxiliary earphone to be communicatively connected with the main earphone. When the user only uses one of the two earphones, the earphone in usage may be regarded as the main earphone.

In combination with FIG. 30 and FIG. 32, the side of the holding component 13 facing the ear may include a first region 13A and a second region 13B. The second region 13B may be farther away from the connecting component 12 than the first region 13A. That is, the second region 13B may be arranged at the free end of the holding component 13 away from the connecting component 12. Based on the related description mentioned above, the orthographic projection of the section (e.g., the elastic component 112) of the hook-shaped component 11 close to the connecting component 12 along the thickness direction described above may partially overlap the second region 13B. Further, the first region 13A may be configured with a sound hole 1311. The second region 13B may be convex toward the ear compared to the first region 13A and used to contact with the ear, thereby allowing the sound hole 1311 to be spaced from the ear in the wearing state. In short, the free end of the holding component 13 may be configured in a convex hull structure. Since the core 14 may generate a sound transmitted to the ear through the sound hole 1311, the convex hull structure may prevent the ear from blocking the sound hole 1311 and cause the sound generated by the core 14 to be weakened or even fail to be output. Merely by way of example, a maximum protrusion height of the second region 13B relative to the first region 13A in the thickness direction may be greater than or equal to 1 mm, and a smooth transition may be made between the two regions. It should be noted that if it is only for the sound hole 1311 to be spaced from the ear in the wearing state, the second region 13B protruding toward the ear compared to the first region 13A may also be another region of the holding component 13, for example, a region between the sound hole 1311 and the connecting component 12. Further, since the concha cavity and the concha boat have a certain depth and are connected with the ear hole, the orthographic projection of the sound hole 1311 on the ear along the thickness direction may at least partially fall in the concha cavity and/or the concha boat. Merely by way of example, the holding component 13 may be arranged at a side of the ear hole close to the top of the head of the user and be contact the antihelix. The orthographic projection of the sound hole 1311 on the ear along the thickness direction may at least partially fall in the concha boat.

Figure 47:
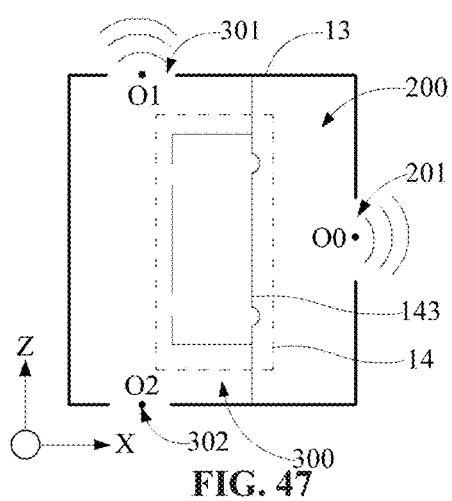
FIG. 47 is a schematic diagram illustrating a cross-sectional structure of an earphone according to some embodiments of the present disclosure.

FIG. 47 is a schematic diagram illustrating a cross-sectional structure of an earphone according to some embodiments of the present disclosure. Further, in combination with FIG. 30 and FIG. 47, the holding component 13 may form a front cavity 200 and a rear cavity 300 of the earphone 10 on opposite sides of the core 14, respectively. The sound hole 1311 may communicate with the front cavity 200 and output a sound to the ear. The holding component 13 may also be configured with a pressure relief hole 1312 communicating with the rear cavity 300. The pressure relief hole 1312 may be farther away from the ear hole than the sound hole 1311. The pressure relief hole 1312 may allow air to enter and exit the rear cavity 300 freely to make the change of air pressure in the front cavity 200 not be blocked by the rear cavity 300 as much as possible, thereby improving the sound quality of the sound output to the ear through the sound hole 1311. Moreover, since phases of sounds output to the outside of the earphone 10 through the sound hole 1311 and the pressure relief hole 1312 are opposite, the phases may be reversed and canceled in the far-field away from the ear, that is, an "acoustic dipole" may be formed to reduce sound leakage. An angle between a line between the center of the pressure relief hole 1312 and the center of the sound hole 1313 and the thickness direction may be between 0° and 50°. Preferably, the angle may be between 0° and 40°. Further, the holding component 13 may also be configured with a sound adjusting hole 1313 communicating with the rear cavity 300. The sound adjusting hole 1313 may be used to destroy a high-pressure region of a sound field in the rear cavity 300, so that a wavelength of a standing wave in the rear cavity 300 may be shortened, thereby increasing the resonance frequency of the sound output to the outside of the earphone 10 through the pressure relief hole 1312, for example, greater than 4 kHz, to reduce the sound leakage. Preferably, the sound adjustment hole 1313 and the pressure relief hole 1312 may be arranged at opposite sides of the core 14, respectively. For example, the sound adjusting hole 1313 and the pressure relief hole 1312 may be arranged opposite to each other in the height direction to destroy the high-pressure region of the sound field in the rear cavity 300 to the greatest extent. An opening direction of the pressure relief hole 1312 may face the top of the head of the user. For example, an angle between the opening direction and the vertical axis may be between 0° and 10°, to allow the pressure relief hole 1312 to be farther away from the ear hole than the sound adjusting hole 1313, thereby making it difficult for the user to hear the sound output to the outside of the earphone 10 through the pressure relief hole 1312 to reduce the sound leakage. The pressure relief hole 1312 may have a first center in the length direction. The sound adjusting hole 1313 may have a second center in the length direction, and the second center may be farther away from the center of the sound hole 1311 in the length direction than the first center, so as to increase the distance between the sound adjusting hole 1313 and the sound hole 1311 as much as possible, thereby weakening the anti-phase cancellation between the sound output to the outside of the earphone 10 through the sound adjusting hole 1313 and the sound transmitted to the ear through the sound hole 1311. In other words, the orthographic projection of the sound adjusting hole 1313 in the height direction and the orthographic projection of the second region 13B in the thickness direction may at least partially intersect with each other, so as to be as far away from the sound hole 1311 as possible.

Briefly, when the user wears the earphone 10, the user mainly listens to the sound transmitted to the ear hole through the sound hole 1311. Other acoustic holes, such as the pressure relief hole 1312 and the sound adjusting hole 1313, may be mainly used to make the sound as possible as to have the sound quality of bass diving and treble penetration. Therefore, a ratio of the size of an outlet end of the pressure relief hole 1312 in the length direction (for example, as indicated by L1 in FIG. 32) to the size of an end of the rear cavity 300 near the pressure relief hole 1312 in the length direction (for example, as indicated by L2 in FIG. 45) may be greater than or equal to 0.9. A size relationship between the sizes in the thickness direction may also be the same or similar. Therefore, the rear cavity 300 may be connected to the outside of the earphone 10 as large as possible to minimize the blocking of the rear cavity 300 to the front cavity 200. In addition, the resonance frequency of the sound output to the outside of the earphone 10 through the pressure relief hole 1312 may be shifted to a high frequency as much as possible.

It should be noted that since the structural parts such as a core housing 131 have a certain thickness, holes including the sound hole 1311, the pressure relief hole 1312, or the sound adjusting hole 1312 arranged on the core housing 131 may have a certain depth. Thus, with respect to the accommodating cavity formed by the core housing 131, the hole described in the present disclosure may have an inlet end close to the accommodating cavity and an outlet end far away from the accommodating cavity. A partition 137 and the connecting holes arranged on the partition 137 described in the following may be similar to the illustration mentioned above, which may not be repeated herein.

In combination with FIG. 30 to FIG. 32, in the natural state, and viewed from a side of the earphone 10 facing the top of the head of the user in the wearing state, for example, viewed along the height direction, the holding component 13 may be spaced apart from at least the section of the hook-shaped component 11 close to the connecting component 12 in the thickness direction, and the connecting component 12 may be arranged in an arc shape and connected between the holding component 13 and the hook-shaped component 11. In such cases, the connecting component 12 may cause the holding component 13 arranged at the front side of the ear and the hook-shaped component 11 arranged at the rear side of the ear always be spaced apart from each other at least in a section close to the connecting component 12 in the thickness direction, so that the earphone 10 can bypass the upper ear root and the nearby tissues in the wearing state, thereby preventing the earphone 10 from over-clamping the helix near the upper ear root and causing discomfort.

Figure 37:
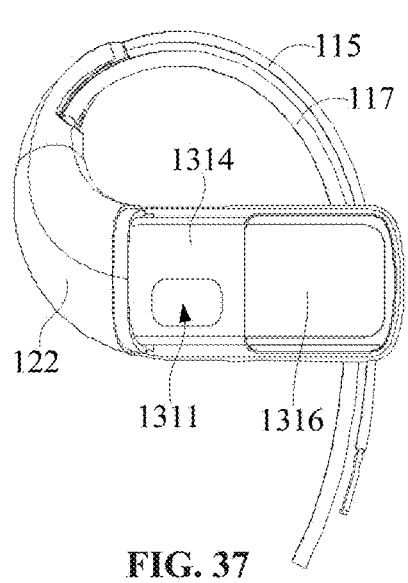
FIG. 37 is a schematic diagram illustrating a structure of an earphone at a side facing away from an ear according to some embodiments of the present disclosure.
Figure 38:
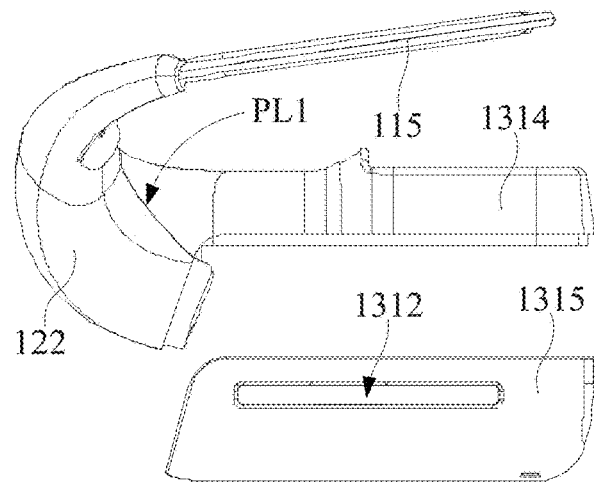
FIG. 38 is a schematic diagram illustrating a structure of an earphone viewed from a side on a top of a user's head according to some embodiments of the present disclosure.
Figure 43:
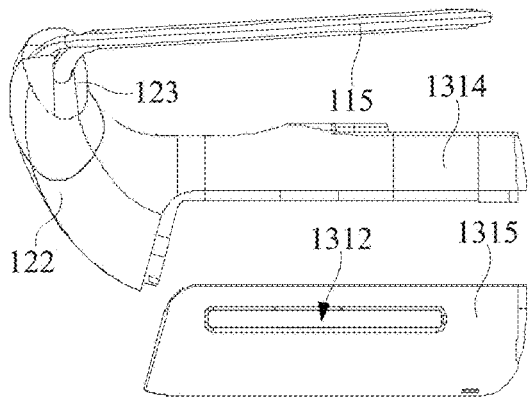
FIG. 43 is a schematic diagram illustrating a structure of an earphone viewed from a side on a top of a user's head according to some embodiments of the present disclosure.

Merely by way of example, the connecting component 12 and the holding component 13 may be connected along the length direction. At least part of the connecting component 12 may extend away from the free end of the holding component 13 along the length direction and the height direction at the same time in a direction from one end connecting the holding component 13 to the other end connecting the hook-shaped component 11 to convex toward the face of the user as a whole, so that a height difference between the hook-shaped component 11 and the holding component 13 in the height direction may be eliminated in a smooth transition manner. In some embodiments, at least part of the connecting component 12 may also extend away from the free end of the holding component 13 along the length direction in the direction from one end connecting the holding component 13 to the other end connecting the hook-shaped component 11. In addition, the connecting component 12 and/or the section of the hook-shaped component 11 close to the connecting component 12 may also extend away from the free end of the holding component 13 in the thickness direction, so that the holding component 13 and the section of the hook-shaped component 11 close to the connecting component 12 can be arranged at intervals in the thickness direction. FIG. 37 is a schematic diagram illustrating a structure of an earphone at a side facing away from an ear according to some embodiments of the present disclosure. FIG. 38 is a schematic diagram illustrating a structure of an earphone viewed from a side on a top of a user's head according to some embodiments of the present disclosure. In some embodiments, in combination with FIG. 37 and FIG. 38, the connecting component 12 may further extend close to the free end of the holding component 13 along the length direction and extend away from the free end of the holding component 13 along the height direction at the same time in the direction from one end connecting the holding component 13 to the other end connecting the hook-shaped component 11. That is, the connecting component 12 may form a circuitously extending structure in the three-dimensional space. FIG. 43 is a schematic diagram illustrating a structure of an earphone viewed from a side on a top of a user's head according to some embodiments of the present disclosure. In other embodiments, in combination with FIG. 42 and FIG. 43, the connecting component 12 may only extend away from the free end of the holding component 13 along the length direction and the height direction at the same time in the direction from one end connecting the holding component 13 to the other end connecting the hook-shaped component 11. That is, a first half of the circuitously extending structure may be formed. The section of the hook-shaped component 11 close to the connecting component 12 (for example, the elastic component 112) may continue to extend close to the free end of the holding component 13 along the length direction in a direction away from the connecting component 12 and extend away from the free end of the holding component 13 along the height direction at the same time. That is, a second half of the circuitously extending structure may be formed, thereby cooperating with the first half of the circuitously extending structure to form the circuitously extending structure in the three-dimensional space. In other embodiments, the circuitously extending structure may have only the first half part or the second half part.

In some embodiments, the section of the hook-shaped component 11 close to the connecting component 12 (for example, the elastic component 112), the edge of the connecting component 12 or the holding component 13 toward the ear may be arranged in a shape of a circuitous arc. In a reference direction that passes through a roundabout inflection point of the circuitous arc (for example, CP2) and is parallel to the length direction, the minimum width W1 of the circuitous arc along the thickness direction at a position 3 mm away from the roundabout inflection point may be in a range of 1 mm to 5 mm.

In other embodiments, in the thickness direction, the minimum distance between the section (e.g., the elastic component 112) of the hook-shaped component 11 close to the connecting component 12 and the holding component 13 may be greater than 0, and smaller than or equal to 5 mm.

In other embodiments, in the thickness direction, a distance W2 between the center of the sound hole 1311 (denoted as O0) and the section of the hook-shaped component 11 close to the connecting component 12 (for example, the elastic component 112) may be between 3 mm and 6 mm.

In other embodiments, in the thickness direction, a distance W3 between the second region 13B and the section of the hook-shaped component 11 close to the connecting component 12 (for example, the elastic component 112) may be between 1 mm and 5 mm.

Figure 34:
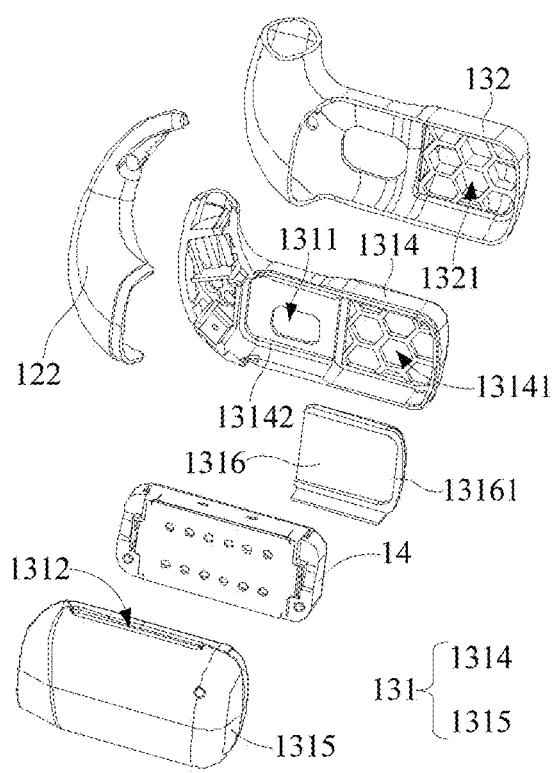
FIG. 34 is a schematic diagram illustrating a disassembled structure of an earphone according to some embodiments of the present disclosure.

FIG. 34 is a schematic diagram illustrating a disassembled structure of an earphone according to some embodiments of the present disclosure. In combination with FIG. 34 and FIG. 32, the holding component 13 may include the core housing 131 connected to the connecting component 12. Structural components such as the core 14 and the mainboard 15 may be fixed in the accommodating space of the core housing 131. Merely by way of example, the core housing 131 may include a first housing 1314 and a second housing 1315 that are arranged opposite to each other in the thickness direction. The first housing 1314 may be closer to the ear than the second housing 1315. In some embodiments, the first housing 1314 and the second housing 1315 may also be arranged opposite to each other in a vibration direction of the core 14. The vibration direction may be parallel to the thickness direction. Specifically, the core 14 may be fixed on a side of the first housing 1314 facing the second housing 1315 to form the front cavity 200. The second housing 1315 may be buckled with the first housing 1314 and surround the core 14 to form the rear cavity 300. Correspondingly, the sound hole 1311 may be arranged on the first housing 1314, for example, on a side of the first housing 1314 facing the ear. The pressure relief hole 1312 and the sound adjusting hole 1313 may be arranged on opposite sides of the second housing 1315, respectively. For example, the pressure relief hole 1312 and the sound adjusting hole 1313 may be arranged opposite to each other in the height direction. Based on the related description mentioned above, a ratio of the size of the outlet end of the pressure relief hole 1312 in the length direction to the size of the second housing 1315 in the length direction may be greater than or equal to 0.55. Preferably, the ratio may be between 0.8 and 1, so that the rear cavity 300 communicates with the outside of the earphone 10 as much as possible while taking into account the structural strength of the second housing 1315.

In some embodiments, in combination with FIG. 34, the connecting component 12 may include a third housing 122 connected to an end of the elastic metal wire 115 away from the battery compartment 1161. For example, the third housing 122 and the end of the elastic metal wire 115 may be formed by a metal insert injection molding process. The size of the second housing 1315 or the third housing 122 in the length direction may be less than that of the first housing 1314. The size of the second housing 1315 may be much larger than the size of the third housing 122. The second housing 1315 may be buckled with the first housing 1314, and the orthographic projection of the second housing 1315 in the thickness direction may be partially overlapped with that of the first housing 1314. The third housing 122 may be buckled with the part of the first housing 1314 located at the periphery of the orthographic projection of the second housing 1315. In short, the third housing 122 may be buckled on the same side of the second housing 1315 and the first housing 1314. In addition, most of the first housing 1314 may be used as the housing of the holding component 13, and a small part may be used as the housing of the connecting component 12. In a specific embodiment, a ratio of the maximum size of the third housing 122 in the length direction to the size of the second housing 1315 in the length direction may be less than or equal to 0.4.

Based on the related description mentioned above, in combination with FIG. 37 and FIG. 38, in the natural state, and viewed from the side of the earphone 10 facing the top of the head of the user in the wearing state, for example, viewed along the height direction, the first housing 1314 and the elastic metal wire 115 may be spaced apart in the thickness direction. The third housing 122 may be arranged in the arc shape and connect the first housing 1314 and the elastic metal wire 115, thereby allowing the holding component 13 arranged at the front side of the ear and the hook-shaped component 11 arranged at the rear side of the ear to be spaced apart from each other in the thickness direction at least in the section close to the connecting component 12. Further, the third housing 122 may first extend away from the second housing 1315 along the length direction and the height direction at the same time in a direction from one end connecting the first housing 1314 to the other end connecting the elastic metal wire 115, and then extend close to the second housing 1315 along the length direction and extend away from the second housing 1315 along the height direction, thereby allowing the height difference between the hook-shaped component 11 and the holding component 13 in the height direction to be eliminated in a smooth transition manner. In such cases, the second position point may fall on the connecting component 12, and the starting point of the first section may be farther away from the connecting component 12 than the second position point. The part of the first housing 1314 that is used as the housing of the connecting component 12 may have the same or similar changing trend with the third housing 122. Thus, the connecting component 12 may form a circuitously extending structure in the three-dimensional space. In combination with FIG. 38, a parting line (denoted as PL1) may be provided between the third housing 122 and the first housing 1314. The third housing 122 and the first housing 1314 may be separately molded and then buckled together, so as to solve the problem that the housing of the connecting component 12 is difficult to mold due to its circuitously extending structure in the three-dimensional space, thereby increasing production efficiency and reducing production costs.

Figure 41:
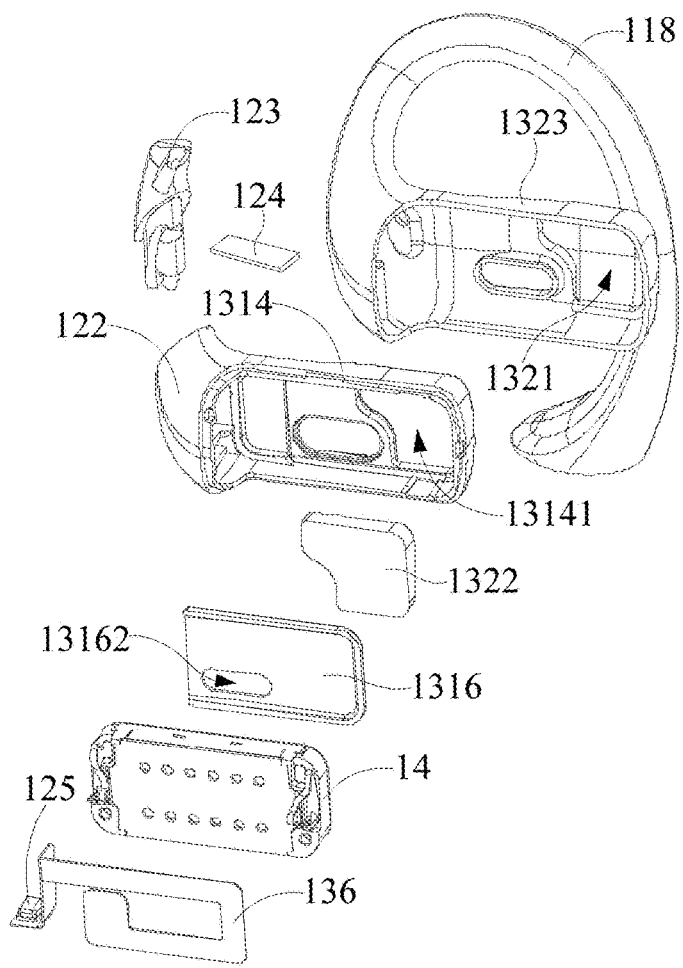
FIG. 41 is a schematic diagram illustrating a disassembled structure of an earphone according to some embodiments of the present disclosure.

FIG. 41 is a schematic diagram illustrating a disassembled structure of an earphone according to some embodiments of the present disclosure. In some embodiments, in combination with FIG. 41, the third housing 122 and the first housing 1314 may be integrally formed, and a connecting plug hole may also be formed. Further, the connecting component 12 may also include a connecting plug member 123. One end of the connecting plug member 123 may be connected to the hook-shaped component 11, and the other end may be plugged and fixed in the connecting plug hole, thereby realizing the connection between the hook-shaped component 11 and the connecting component 12. Specifically, an end of the connecting plug hole 123 away from the third housing 122 may be connected (e.g., be molded by a metal insert injection process) to the other end of the elastic metal wire 115 away from the battery compartment 1161. Further, the connecting component 12 may also include a locking member 124. A part of the connecting plug member 123 inserted into the third housing 122 may be locked with the third housing 122 by the locking member 124, which is convenient for assembly and increases the reliability of assembly. In some embodiments, the locking member 1224 may be a wedge arranged in a column shape or a sheet shape.

Based on the related description mentioned above, in combination with FIG. 42 and FIG. 43, the third housing 122 may extend away from the second housing 1315 along the length direction and the height direction at the same time in a direction from one end connecting the first housing 1314 to the other end connecting the connecting plug member 123. The section of the elastic metal wire 115 exposed to the connecting plug member 123 and close to the connecting plug member 123 may further extend close to the second housing 1315 along the length direction and extend away from the second housing 1315 along the height direction at the same time in a direction away from the connecting plug member 123. Correspondingly, the third housing 122 may also extend away from the second housing 1315 in the thickness direction at the same time. The section of the elastic metal wire 115 exposed to the connecting plug member 123 and close to the connecting plug member 123 may continue to extend away from the second housing 1315 along the thickness direction. In such cases, the second position point may fall on the boundary between the hook-shaped component 11 and the connecting component 12, and the starting point of the first section may coincide with the second position point. The part of the first housing 1314 that is used as the housing of the connecting component 12 and the part of the connecting plug member 123 exposed to the third housing 122 may have the same or similar changing trend with the third housing 122. Thus, the connecting component 12 may be allowed to form only the first half of the circuitously extending structure, and the hook-shaped component 11 may continue to form the second half of the circuitously extending structure, thereby cooperating to form the circuitously extending structure in the three-dimensional space. Therefore, in combination with FIG. 42, a parting line (denoted as PL2) may be provided between the connecting plug member 123 and the third housing 122 (and/or the first housing 1314). The connecting plug member 123 and the third housing 122 (and/or the first housing 1314) may be formed separately and then plugged in to solve the problem that the housing of the connecting component 12 is difficult to mold due to the circuitously extending structure in the three-dimensional space, thereby increasing the production efficiency and reducing the production cost.

It should be noted that the housings of the connecting component 12 and the holding component 13 may also be divided according to other dividing manners. For example, the housing of the holding component 13 may be divided into two housings with substantially equal orthographic projection areas along the thickness direction. The housing of the connecting component 12 may be divided into two housing along the roundabout inflection point or may include only one housing, and the other housing may be composed of the elastic metal wire 115, and the housings may be assembled accordingly.

Based on the related description mentioned above, in combination with FIG. 34 and FIG. 32, the holding component 13 may need to be in contact with the front side of the ear, in particular, the free end of the holding component 13 may further need to form a contact point (for example, CP0) with the antihelix of the ear. Thus, a side of the core housing 131 facing the ear may be configured with a flexible covering structure 132 that does not cover at least the sound hole 1311. For example, the flexible covering structure 132 may be configured with a through-hole corresponding to the sound hole 1311. The Shore hardness of the flexible covering structure 132 may be less than the Shore hardness of the core housing 131, so that the holding component 13 can be in contact with the ear through the flexible covering structure 132. That is, the flexible covering structure 132 may be elastically supported between the core housing 131 and the ear, thereby improving the wearing comfort. Further, based on the dividing and splicing manner of the housings of the connecting component 12 and the holding component 13, to increase the appearance quality of the earphone 10, the flexible covering structure 132 may be directly attached to the first housing 1314, the third housing 122, or the like, through an injection molding process. In some embodiments, the flexible covering structure 132 may cover the first housing 1314, the third housing 122, or the like, through a gluing connection manner. Since the hook-shaped component 11 may also be configured with the elastic covering body 118, the elastic covering body 118 and the flexible covering structure 132 may be formed by the one injection molding process, or be separately formed by two injection molding processes. The materials of the two processes may be the same or different. It should be noted that without special descriptions, the present application mainly describes the part where the flexible covering structure 132 and the elastic covering 118 are in contact with the user's skin.

In some embodiments, the flexible covering structure 132 may be at least partially arranged at the side of the holding component 13 away from the free end of the connecting component 12 and facing the ear, that is, the second region 13B. Correspondingly, the orthographic projection of the elastic component 112 on the reference plane (for example, the plane where YZ is located) and the orthographic projection of the flexible covering structure 132 on the reference plane may partially overlap with each other. Further, the thickness of the flexible covering structure 132 may be designed differently. For example, the flexible covering structure 132 corresponding to the second region 13B may be relatively thick, so that the free end of the holding component 13 may protrude toward the ear, and have good flexibility. In some embodiments, if only for the second region 13B to protrude toward the ear compared to the first region 13A, a side of the first housing 1314 toward the ear may also be designed with a thickness difference. Thus, the first housing 1314 may also include a first region and a second region, so as to correspond to the first region 13A and the second region 13B on the side of the holding component 13 facing the ear, respectively.

In some embodiments, a side of the flexible covering structure 132 facing the core housing 131 may be recessed with blind hole(s) 1321 spaced from each other. The blind hole 1321 may be mainly used to provide a deformation space for the flexible covering structure 132 to allow the flexible covering structure 132 to undergo more deformation under pressure in the wearing state, thereby further improving the wearing comfort. In some embodiments, a count of the blind holes 1321 may be multiple, for example at least two, which may be spaced apart from each other to form a bone position to support the own structure, thereby having both elastic deformation and structural strength. In other embodiments, the count of the blind holes 1321 may also be only one. In such cases, by controlling the elastic modulus, thickness, size of the blind hole 1321, and other parameters of the flexible covering structure 132, the blind hole 1321 may also have elastic deformation and structural strength at the same time. To make the flexible covering structure 132 have the blind hole(s) 1321, the core housing 131 (e.g., the part of the first housing 1314 corresponding to the second region 13B) may be configured with through-hole(s) 13141 corresponding to and communicating with the blind hole(s) 1321, respectively. The through-hole(s) 13141 may be used for inserting molding cores of the flexible covering structure 132. In such cases, the plurality of through-holes 13141 may cause the part of the first housing 1314 corresponding to the second region 13B to be arranged in a honeycomb or grid shape so as to balance the structural strength of the first housing 1314 in the region and the support for the flexible covering structure 132. Further, the outer side of the first housing 1314 may also be configured with protrusions surrounding the through-holes 13141 along the honeycomb or grid structure. In some embodiments, the protrusions may be embedded in the flexible covering structure 132. In some embodiments, the flexible covering structure 132 may be partially embedded in the through-holes 13141 to increase a bonding area of the flexible covering structure 132 between the second region 13B and the first housing 1314, thereby increasing the bonding strength. Thus, the first housing 1314 may have the corresponding through-holes 13141 during the molding process, and the molding cores of the flexible covering structure 132 may be inserted into the through-holes 13141 after the molding is completed. The molding cores may protrude from the first housing 1314, and the maximum protrusion height may depend on the actual requirements of the convex hull structure. The flexible covering structure 132 may be directly molded on the first housing 1314 through the injection molding process, and then the molding cores may be drawn out. Correspondingly, the holding component 13 may further include a cover plate 1316 arranged in the core housing 131. For example, the cover plate 1316 may be fixedly arranged at an inner side of the first housing 1314 away from the flexible covering structure 132 to seal the through-holes 13141, thereby allowing the first housing 1314 and the cover plate 1316 to surround the core 14 to form the front cavity 200. The cover plate 1316 may be supported on the honeycomb or grid structure of the first housing 1314.

Merely by way of example, a first flange 13142 may be arranged on an inner wall surface of the first housing 1314 away from the flexible covering structure 132. A second flange 13161 may be arranged on an inner wall surface of the cover plate 1316 away from the flexible covering structure 132. Two ends of the second flange 13161 and two ends of the first flange 13142 may extend oppositely and respectively to form an annular flange by splicing. In such cases, the core 14 may be held on the annular flange to form the front cavity 200. The first housing 1314 may be configured with a sink groove in the second region 13B. The cover plate 1316 may be embedded into the sink groove to allow the inner wall surface of the cover plate 1316 to be flush with the inner wall surface of the first housing 1314 away from the flexible covering structure 132, thereby causing an inner cavity surface of the front cavity 200 to be as flat as possible. Further, a glue groove may be arranged on the inner wall surface of the first housing 1314 away from the flexible covering structure 132. The glue groove may be arranged at the edge of the sink groove and surrounded by a plurality of through-holes 13141. The cover plate 1316 may be glued with the first housing 1314 through the glue in the glue groove. In short, the first flange 13142 and the glue groove may be both arranged on the inner side of the first housing 1314 away from the flexible covering structure 132, however, the former may mainly correspond to the first region 13A, and the latter may mainly correspond to the second region 13B.

It should be noted that in other embodiments such as the flexible covering structure 132 does not have the blind holes 1321, or the flexible covering structure 132 is formed separately and then connected to (e.g., through glue) the core housing 131, the first housing 1314 may not need to be configured with the through-holes 13141, and the corresponding cover plate 1316 may not be provided. In such cases, the first flange 13142 may be a complete annular flange, and the front cavity 200 may be formed by supporting and holding by the core 14 on the annular flange.

In other embodiments, in combination with FIG. 41, the flexible covering structure 132 may include an inner flexible body 1322 arranged on the core housing 131 and an outer flexible body 1323 at least covering the inner flexible body 1322. The inner flexible body 1322 may be arranged in the second region 13B. The outer flexible body 1323 may cover the inner flexible body 1322, the first housing 1314, the third housing 122, or the like. In such cases, the flexible covering structure 132 may be in contact with the ear through the outer flexible body 1323. In short, the flexible covering structure 132 may also be configured as a double-layer structure, so as to adjust the thickness and softness of a part of the flexible covering structure 132 corresponding to the second region 13B. Correspondingly, the orthographic projection of the elastic component 112 on the reference plane (for example, the plane where YZ is located) and the orthographic projection of the inner flexible body 1322 on the reference plane may partially overlap with each other. Similarly, the sound hole 1311 may be arranged between the inner flexible body 1322 and the connecting component 12. Further, the inner flexible body 1322 may also protrude toward the ears. That is, the inner flexible body 1322 may protrude from the core housing 131 (specifically, the first housing 1314) to facilitate the flexible covering structure 132 to form the convex hull structure.

Merely by way of example, the blind hole(s) 1321 may be arranged in the inner flexible body 1322, and the function and forming manner may be the same as or similar to those described above, which may not be repeated herein. The number of the blind hole(s) 1321 may be multiple, so that the inner flexible body 1322 may have the bone positions arranged in the honeycomb shape or the grid shape, or may have a plurality of bone positions arranged at intervals. In other embodiments, the blind hole(s) 1321 may further penetrate the inner flexible body 1322 to be a through-hole. Similarly, gaps between the bone positions, that is, the blind holes 1321, may be used to provide a deformation space for the flexible covering structure 132. In some embodiments, the materials of the inner flexible body 1322 and the outer flexible body 1323 may be silica gel with zero degrees.

Merely by way of example, the Shore hardness of the inner flexible body 1322 may be less than the Shore hardness of the outer flexible body 1323 to allow the part of the flexible covering structure 132 corresponding to the second region 13B to be softer. A side of the outer flexible body 1323 facing the core housing 131 may be recessed with the blind hole(s) 1321. The inner flexible body 1322 may be arranged in the blind hole(s) 1321 and in contact with the outer flexible body 1323. In other words, the blind hole(s) 1321 may be arranged in the outer flexible body 1323 so as to accommodate the more flexible inner flexible body 1322. Specifically, the part of the first housing 1314 corresponding to the second region 13B may be configured with the through-holes 13141 for inserting the molding cores of the outer flexible body 1323. In such cases, the outer flexible body 1323 may be formed on the first housing 1314 through the injection molding process, and the molding cores may be drawn out after the outer flexible body 1323 is molded, so that the outer flexible body 1323 may form the corresponding blind holes 1321, thereby forming an accommodating region. The inner flexible body 1322 may be arranged in the blind hole(s) 1321 through the through-hole(s) 13141. That is, the inner flexible body 1322 may be arranged in the accommodating region, and the through-hole(s) 13141 may be sealed by the cover plate 1316. A side of the cover plate 1316 facing the inner flexible body 1322 may be partially embedded in the through-hole(s) 13141 to increase the sealing performance of the accommodating region. Further, the number of the blind hole(s) 1321 may be one, and the number of the through-hole(s) 13141 may also be one. In such cases, when an opening area of the through-hole 13141 is relatively large, the cover plate 1316 may be extended to partially overlap with the first housing 1314 in the first region 13A, so as to increase a supporting area of the cover plate 1316 by the first housing 1314. The cover plate 1316 may be configured with a communicating hole 13162 connecting the sound hole 1311 and the front cavity 200 to avoid blocking the sound hole 1311. In a specific embodiment, the material of the outer flexible body 1323 may be silica gel with 30-50 degrees, and the material of the inner flexible body 1322 may be silica gel with zero degrees, and the outer flexible body 1323 and the inner flexible body 1322 may be formed in the accommodating region through a glue dropping process. In another specific embodiment, the material of the outer flexible body 1323 may be silica gel with 30-50 degrees, and the material of the inner flexible body 1322 may be silica gel with 0-10 degrees, and the outer flexible body 1323 and the inner flexible body 1322 may be preformed into a block to be filled in the accommodating region. In some embodiments, when the inner flexible body 1322 can withstand the impact force of the outer flexible body 1323 during the molding process, the first housing 1314 may not be configured with the through-hole 13141, and the corresponding cover plate 1316 may not be provided.

Based on the detailed description mentioned above, structural components such as the first housing 1314, the outer flexible body 1323, the inner flexible body 1322, the cover plate 1316, etc., may form a housing assembly, that is, the structural components can be modularized to facilitate assembly.

In combination with FIG. 30, the earphone 10 may further include a microphone 125 and a microphone 133 arranged on the holding component 13 and/or the connecting component 12. The two microphones 125 and 133 may be electrically connected to the mainboard 15. A distance between the microphone 125 and the microphone 133 in the length direction may be greater than a distance between the microphone 125 and the microphone 133 in the height direction. The distance between the two microphones 125 and 133 can be set to be as large as possible when the size of the earphone 10 is relatively determined, thus interference between the two microphones 125 and 133 may be avoided, and the sound pickup effect and/or the noise reduction effect of the earphone 10 may be increased. Further, a line between the orthographic projection of the microphone 125 on the reference plane (for example, the plane where YZ is located) and the orthographic projection of the microphone 133 on the reference plane may pass through the orthographic projection of the core 14 on the reference plane. In other words, if the orthographic projection of the core 14 on the reference plane is arranged in a rectangle shape, the two microphones 125 and 133 may be arranged substantially along the diagonal of the core 14.

In some embodiments, the microphone 125 may be arranged at the connecting component 12, and the microphone 133 may be arranged at the free end of the holding component 13 away from the connecting component 12. The microphone 125 may be closer to the mouth of the user than the microphone 133, which is mainly used to pick up the voice of the user. In some embodiments, the earphone 10 may also include the processing circuit, which may be integrated on the mainboard 15, and may designate the microphone 125 as the main microphone and the microphone 133 as the auxiliary microphone. The sound signal collected by the auxiliary microphone may be used to reduce the noise of the sound signal collected by the main microphone, thereby increasing the sound pickup effect. At least one of the two microphones 125 and 133 may also be used to perform a noise reduction processing on the sound output from the earphone 10 to the ear, or only one microphone for sound pickup or noise reduction may be provided.

Merely by way of example, the microphone 125 may be arranged between the third housing 122 and the first housing 1314, and the microphone 133 may be arranged between the second housing 1315 and the first housing 1314. The sides of the third housing 122 and the second housing 1315 away from the first housing 1314 may be respectively configured with through-holes for microphones to collect sounds.

In other embodiments, the earphone 10 may also include a stick microphone 134 that is detachably connected to the free end (i.e., the battery part 113) of the holding component 13 or the hook-shaped component 11 away from the connecting component 12. The free end of the stick microphone 134 may be configured with a microphone 1341 electrically connected to the mainboard 15. Compared with the microphone 125 and the microphone 133, the stick microphone 134 may cause the microphone 1341 closer to the mouth of the user, which is beneficial to increase the sound pickup effect. In the present disclosure, the detachable connection of the stick microphone 134 and the holding component 13 may be taken as an example for illustration. For example, a main rod 1342 of the stick microphone 134 and the second housing 1315 may be detachably connected by ways of buckle, magnetism, or the like. As another example, the main rod 1342 and the second housing 1315 may be detachably connected by a type-C plug-in manner, so as to shorten a wiring distance between the microphone 1341 and the mainboard 15.

Further, in addition to the microphone 1341 on the stick microphone 134, the earphone 10 may also be configured with other microphones, such as the microphone 125 and/or the microphone 133. The processing circuit may use the microphone 1341 as the main microphone when the stick microphone 134 is connected to the holding component 13, and use at least one of the microphone 133 and the microphone 125 as the auxiliary microphone. The sound signal collected by the auxiliary microphone may be used to reduce the noise of the sound signal collected by the main microphone, thereby increasing the sound pickup effect. Correspondingly, the processing circuit may switch the microphone 133 and the microphone 125 to an enabled state when the stick microphone 134 is separated from the holding component 13. One of the microphone 133 and the microphone 125 may be used as the main microphone, and the other may be used as the auxiliary microphone. In some embodiments, the processing circuit may also switch at least one of the microphone 133 and the microphone 125 to a disabled state when the stick microphone 134 is connected to the holding component 13, so as to save power while taking into account sound pickup and/or noise reduction.

In combination with FIG. 30 and FIG. 31, the earphone 10 may further include a first charging electrode 126 arranged at the holding component 13 or the connecting component 12 and a second charging electrode 1164 arranged at the hook-shaped component 11. One of the first charging electrode 126 and the second charging electrode 1164 may be used as a positive charging electrode, and the other may be used as a negative charging electrode. In the present disclosure, for illustration purposes, the first charging electrode 126 may be used as the positive charging electrode and the second charging electrode 1164 may be used as the negative charging electrode. In such cases, the earphone 10 may be charged by the two charging electrodes. In addition, the shortest distance between the two charging electrodes may be greatly increased, which helps prevent short circuits between the charging electrodes caused by sweat, water droplets, dust, or the like. In some embodiments, in the case of satisfying the short-circuit prevention, the two charging electrodes may also be arranged in one of the hook-shaped component 11, the connecting component 12, and the holding component 13. Further, the two charging electrodes may be set to be invisible in the wearing state. For example, both charging electrodes may face the skin of the user, so as to take into account the appearance quality of the earphone 10.

Merely by way of example, the first charging electrode 126 may be arranged at the connecting component 12, and the second charging electrode 1164 may be arranged at the battery part 116. Specifically, the first charging electrode 126 may be at least partially arranged at the periphery of the second housing 1315, for example, arranged between the third housing 122 and the first housing 1314. Correspondingly, the second charging electrode 1164 may be arranged in the battery compartment 1161, for example, at the bottom of the battery compartment 1161 away from the open end. The first charging electrode 126 may be arranged in a column shape, and the second charging electrode 1164 may be arranged in a strip shape. The length direction of the second charging electrode 1164 may extend along the circumferential direction of the battery compartment 1161. Further, the first housing 1314 and the battery compartment 1161 may be respectively configured with through-holes that allow the charging electrodes to be exposed, so that the charging electrodes can be in contact with output electrodes on a charging box. Compared with the charging electrode with the column shape, the charging electrode with the strip shape may have a larger contact area with the output electrode, which may increase the reliability of the charging electrode.

It should be noted that the connecting component 12 may be provided with a plurality of first charging electrodes 126 arranged at intervals. For example, the connecting component 12 may be provided with two first charging electrodes 126 so that after one of the first charging electrodes 126 fails, the other can still be available. Further, a magnetic adsorption member, such as a magnet, may also be arranged near each of the two charging electrodes to allow the earphone 10 to make good contact with the output electrode(s) on the charging box by ways of magnetic adsorption. For the charging box, the position(s) of the output electrode(s) may be adjusted with the change of the charging electrode(s) on the earphone 10.

Figure 35:
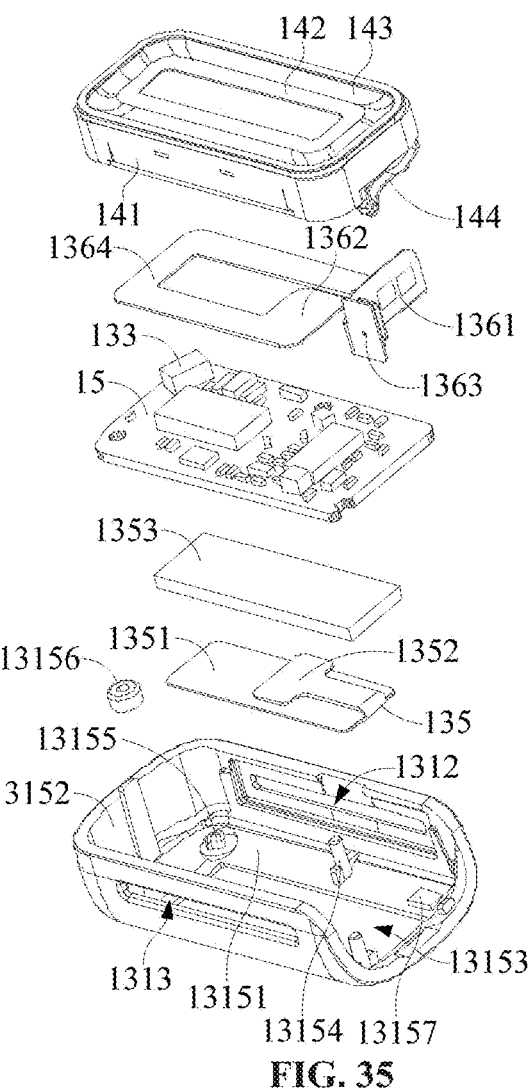
FIG. 35 is a schematic diagram illustrating a disassembled structure of an earphone according to some embodiments of the present disclosure.

FIG. 35 is a schematic diagram illustrating a disassembled structure of an earphone according to some embodiments of the present disclosure. In combination with FIG. 35, since the second housing 1315 is farther away from the ears than the first housing 1314, the second housing 1315 may be configured with interactive components such as a button (e.g., a physical button, a virtual button), a display, a touch circuit board, or the like, to facilitate the user to interact with the earphone 10. In some embodiments, the user may also interact with the earphone 10 in other ways, which is not limited herein. For example, the second housing 1315 may also be configured with a sliding control component. The user may interact with the earphone 10 by scrolling the sliding control component, or sliding along the surface of the sliding control component.

In some embodiments, the user may interact with the earphones 10 through operating the left and right earphones 10 simultaneously (e.g., by touching the touch circuit boards of the left and right earphones 10 at the same time or pressing the buttons on the left and right earphones 10 at the same time). For example, when two earphones 10 are both in the battery compartment 1161, the user may press the buttons arranged on the two earphones 10 for a first duration (e.g., 5 s, 3 s) simultaneously to make the earphones 10 enter a pairing state. As another example, when the two earphones 10 are both in the battery compartment 1161, the user may press the buttons arranged on the two earphones 10 for a second duration (e.g., 15 s, 10 s) simultaneously, to restore a factory setting of the earphones 10. The second duration may be longer than the first duration. As a further example, when the two earphones 10 are both worn on the ears of the user and the earphones 10 are in a connected state, the user may press the buttons arranged on the two earphones 10 for a certain period of time (e.g., 5 s, 3 s) simultaneously, to switch the prompt language.

In some embodiments, the user may interact with the earphones 10 through operating one of the left and right earphones 10. Specifically, when the user wears two earphones 10 on the ears of the user and the earphones 10 are in a connected state, the user may interact with the left or right earphones 10 to realize functions such as answering a call, playing audio, adjusting volume, calling a voice assistant, or the like. For example, the user may double-click the earphone 10 on either the left or right earphone to realize functions such as playing, pausing, answering a call, hanging up a call, or the like. As another example, the user may slide along the surface of the sliding control component of the left or right earphone backward or forward to play a previous or next music. As a further example, the user may slide along the surface of the sliding control component of the left or right earphone backward or forward to increase or decrease the volume. As still an example, when a phone call comes in, the user may press and hold a button for 2 s on the left or right earphone 10 to reject the phone call. As still another example, when the user is in a non-talking state or no phone call comes in, the user may call the voice assistant through pressing and holding a button for 2 s arranged on the right earphone 10.

In some embodiments, the earphone 10 may perform a wearing detection. As used herein, the wearing detection may refer to detecting whether the earphone is in the wearing state. In some embodiments, the wearing detection may be performed by detecting a distance between the earphone 10 and the ear of the user. Specifically, when the distance between the earphone 10 and the ear of the user is smaller than or equal to a distance threshold, the earphone 10 (e.g., the mainboard 15) may determine that the user is wearing the earphone 10, i.e., the earphone 10 is in the wearing state. Conversely, when the distance between the earphone 10 and the ear of the user is larger than the distance threshold, the earphone 10 may determine that the user is not wearing the earphone 10, that is, the earphone 10 is in the natural state. In some embodiments, the wearing detection may be performed by detecting a change of light intensity. For example, when the light intensity is smaller than or equal to a light intensity threshold, the earphone 10 (e.g., the mainboard 15) may determine that the the earphone 10 is in the wearing state. Conversely, when the light intensity is greater than the light intensity threshold, the earphone 10 may determine that the earphone 10 is in the natural state. In some embodiments, the wearing detection may be performed by detecting a pressure applied on the first housing 1314. For example, when the pressure applied on the first housing 1314 is greater than or equal to a pressure threshold, the earphone 10 (e.g., the mainboard 15) may determine that the the earphone 10 is in the wearing state. Conversely, when the pressure applied on the first housing 1314 is smaller than the pressure threshold, the earphone 10 may determine that the earphone 10 is in the natural state. In some embodiments, the wearing detection may be performed in other ways, such as detecting a connection state of the earphone 10 and the battery compartment 1161, acceleration data of the earphone 10, or the like, which are not limited herein. In some embodiments, when the power of the left or right earphone 10 is less than a certain percentage (e.g., 30%, 20%, 10%) of the full power, the earphone 10 may send a reminder of low power.

Merely by way of example, the second housing 1315 may include a bottom wall 13151 arranged opposite to the first housing 1314 and a side wall 13152 connected to the bottom wall 13151. The side wall 13152 may extend toward the first housing 1314. A side of the bottom wall 13151 facing the first housing 1314 may be configured with a flexible touch circuit board 135 electrically connected to the mainboard 15. The flexible touch circuit board 135 may include a capacitive flexible touch circuit board, a resistive flexible touch circuit board, a pressure-sensitive flexible touch circuit board, or the like, which is not limited herein. In such cases, the interaction with the earphone 10 can be realized, and there may be no need to arrange an additional through-hole on the core housing 131, thereby increasing the waterproof and dustproof performance. Specifically, the flexible touch circuit board 135 may include a touch part 1351 for receiving touch operations and an electrical connection part 1352 for connecting with the mainboard 15. For example, the flexible touch circuit board 135 may be buckled with the mainboard 15 via a BTB connector. A ratio of an area of the touch part 1351 to an area of the bottom wall 13151 may be greater than or equal to 70%. In some embodiments, a ratio of the area of the touch part 1351 to an area of the second housing 1315 (i.e., a total area of the bottom wall 13151 and the side wall 13152) may be greater than 20% (e.g., 25%, 30%, 35%, etc.). Based on the related description mentioned above, a side of the side wall 13152 close to the third housing 122 may be opened to facilitate the splicing of the second housing 1315 and the third housing 122. The pressure relief hole 1312 and the sound adjusting hole 1313 may be arranged on the side wall 13152, and specifically arranged on the opposite sides of the open end, respectively.

Further, the bottom wall 13151 may be configured with a sink groove 13153, and the touch part 1351 may be attached to the bottom of the sink groove 13153. In such cases, the second housing 1315 may be equivalent to being partially thinned to increase the sensitivity of the flexible touch circuit board 135. In some embodiments, the mainboard 15 may also be connected to the second housing 1315. The flexible touch circuit board 135 may be pressed on the bottom wall 13151 through an elastic pad 1353. Thus, the touch part 1351 may be in close contact with the bottom wall 13151, and the touch part 1351 may be prevented from being crushed. The depth of the sink groove 13153 may be greater than or equal to the thickness of the touch part 1351, and smaller than a sum of the thicknesses of the touch part 1351 and the elastic pad 1353, so as to increase the pressing and holding effect.

In some embodiments, the bottom wall 13151 may be configured with a plurality of hot melt columns 13154 arranged at the periphery of the sink groove 13153 and extend toward the mainboard 15. For example, the number of the hot melt columns may be three. A connection line between the orthographic projections of at least two of the plurality of hot melt columns 13154 on the bottom wall 13151 may pass through the orthographic projection of the touch part 1351 on the bottom wall 13151. Correspondingly, the mainboard 15 may be configured with a connecting hole corresponding to each hot melt column 13154 to allow the mainboard 15 to be sleeved and fixed on the hot melt column 13154 through the connecting hole. In short, if the touch part 1351 is arranged in a rectangular shape, at least two hot melt columns 13154 may be arranged substantially along the diagonal of the touch part, so as to increase the uniformity of the force distribution of the mainboard 15. In other embodiments, the hot melt column 13154 may also be replaced with a screw, a buckle, or the like, which is not limited herein.

Based on the related description mentioned above, the microphone 133 may be directly arranged at a side of the mainboard 15 away from the bottom wall 13151 through the SMT process. Correspondingly, the bottom wall 13151 may be configured with a flange 13155 arranged at the periphery of the sink groove 13153. The flange 13155 may extend toward the mainboard 15 and have a sound pickup hole communicating with the outside of the earphone 10. The mainboard 15 may be pressed on the flange 13155 to allow the microphone 133 to collect sound signals through the sound pickup hole. In some embodiments, a silicone sleeve 13156 may be sleeved on the flange 13155 to allow the mainboard 15 to be elastically supported on the flange 13155 through the silicone sleeve 13156. As a result, not only the sealing of the sound path of the microphone 133 can be increased, but also the uniformity of the force distribution on the mainboard 15 can be increased.

In some embodiments, a metal antenna pattern may be arranged on the second housing 1315 to serve as a communication antenna of the earphone 10. Correspondingly, the bottom wall 13151 may be configured with an antenna contact point 13157 arranged at the periphery of the sink groove 13153 and electrically connected to the metal antenna pattern. The mainboard 15 may be configured with a metal elastic sheet for elastic contact with the antenna contact point 13157. In short, the mainboard 15 may be connected to the antenna contact point 13157 through the metal elastic sheet to avoid unnecessary welding, thereby reducing the difficulty of assembly and saving the internal space of the core housing 131.

As stated above, the connection between the mainboard 15 and the second housing 1315 may not only realize the fixation of the mainboard 15, but also realize the pressing and holding of the flexible touch circuit board 135, the sealing of the sound path of the microphone 133, and the electrical connection between the mainboard 15 and the metal antenna pattern. That is, multiple purposes may be achieved at one stroke.

Based on the related description mentioned above, in combination with FIG. 35 and FIG. 41, electronic components arranged in the hook-shaped component 11 may be electrically connected to the mainboard 15 through the wire 117. Since the electronic components arranged in the connecting component 12 are relatively close to the mainboard 15, the electronic components may be directly electrically connected to the mainboard 15 through leads of the electronic components. The wire 117 may be arranged in a plurality of strands, and may include a positive lead and a negative lead of the battery 16, a signal line and a shielding line of the detecting member 1163, and a negative lead of the second charging electrode 1164. In some embodiments, the shielding wire of the detecting member 1163 and the wire of the second charging electrode 1164 may be a same wire to simplify the wiring. Further, since a size of the mainboard 15 is limited and there are many electronic components integrated on the mainboard 15, the wire 117 or other leads may be welded to the flexible circuit board 136 first, and then buckled and connected to the mainboard 15 through the flexible circuit board 136, which is beneficial to enlarge the size of each pad and increase the spacing between each two pads, thereby reducing the difficulty of welding and increasing the reliability of welding.

Merely by way of example, the flexible circuit board 136 may include at least a first connection region 1361 for electrical connection with the battery 16 and a second connection region 1362 for electrical connection with the mainboard 15. The second connection region 1362 may be arranged along the main surface of the mainboard 15 to facilitate the buckling connection of the flexible circuit board 136 and the mainboard 15. Further, the first connection region 1361 may be bent toward the side of the mainboard 15 relatives to the second connection region 1362, and may be configured with a plurality of pads. That is, the welding may occur on the side of the mainboard 15. As a result, since there is no interference from the electronic components on the main surface of the mainboard 15, the difficulty of welding may be reduced. Moreover, due to the thin thickness, the flexible circuit board 136 may be partially bent toward the side of the mainboard 15, which may also save the internal space of the core housing 131. Based on the related description mentioned above, the plurality of pads arranged in the first connection region 1361 may include a first pad and a second pad respectively used to weld the positive electrode lead and the negative electrode lead of the battery 16. The plurality of pads arranged in the first connection region 1361 may further include a third pad and a fourth pad respectively used to weld the positive electrode lead and the negative electrode lead of the charging electrode. The plurality of pads arranged in the first connection region 1361 may further include a fifth pad and a sixth pad respectively used to weld the signal line and the shielding line of the detecting member 1163. Since the shielding wire of the detecting member 1163 and the lead of the second charging electrode 1164 can be a same lead, one of the fourth pad and the sixth pad may be omitted, which is beneficial to enlarge the sizes of other pads and the spacing between every two pads.

Based on the related description mentioned above, since the microphone 125 can be arranged at the connecting component 12 so as to be closer to the mainboard 15, the flexible circuit board 136 may be further extended to the connecting component 12. The flexible circuit board 136 may further include a third connection region 1363 connected to the first connection region 1361. The third connection region 1363 may be bent in a direction away from the mainboard 15 compared to the first connection region 1361, so that the third connection region 1363 can be attached to the first housing 1314 and/or the third housing 122. The microphone 125 may be arranged in the third connection region 1363 through the SMT process. The first connection region 1361 and the third connection region 1363 may be perpendicular to the main surface of the mainboard 15, respectively. The second connection region 1362 may be parallel to the main surface of the mainboard 15.

Different from the first connection region 1361, the second connection region 1362 may be buckled with the mainboard 15 by ways of the BTB connector. The flexible circuit board 136 may further include a transition region 1364 connecting the first connection region 1361 and the second connection region 1362. The transition region 1364 and the second connection region 1362 may be arranged at the same side of the mainboard 15. A length of the transition region 1364 may be greater than the minimum distance between the first connection region 1361 and the second connection region 1362, so that the first connection region 1361 can be buckled with the mainboard 15. Merely by way of example, the transition region 1364 may be arranged in a multi-segment bending structure, and arranged along the main surface of the mainboard 15.

In combination with FIG. 35, the core 14 may include a magnetic circuit system 141 and a coil 142. The coil 142 may extend into a magnetic gap of the magnetic circuit system 141 and move in a magnetic field formed by the magnetic circuit system 141 in an energized state. The magnetic circuit system 141 may include structural components such as a permanent magnet, a yoke, a bracket, or the like. The specific structure and connection relationship of the magnetic circuit system 141 may be well known to those skilled in the art, which are not repeated herein. Further, if the core 14 is applied to a bone conduction earphone, the coil 142 may be arranged to drive a vibration plate to move. If the core 14 is applied to an air conduction earphone, the coil 142 may be arranged to drive a diaphragm to move. In some embodiments, the coil 142 may also be configured to simultaneously drive the vibration plate and the diaphragm to move. In the present disclosure, the coil 142 driving the diaphragm to move may be taken as an example for illustration. The core 14 may further include a diaphragm 143 connected between the coil 142 and the magnetic circuit system 141. The diaphragm 143 may generate a sound during a vibration process which can be transmitted to the ear through the sound hole 1311.

Further, the core 14 may further include a metal elastic sheet 144 fixed on the periphery of the magnetic circuit system 141. The metal elastic sheet 144 may be electrically connected to the coil 142. The core 14 may be elastically pressed on the mainboard 15 by the metal elastic sheet 144, so that the coil 142 can be electrically connected to a contact point on the mainboard 15. Thus, by replacing welding wires in the related technology with the metal elastic sheet 144, unnecessary welding can be avoided, thereby reducing the difficulty of assembly. In addition, there is no need to reserve a welding space, thereby saving the internal space of the core housing 131. A count of the metal elastic sheet(s) 144 may be two, which can be used as the positive lead and the negative lead of the coil 142, respectively.

Figure 40:
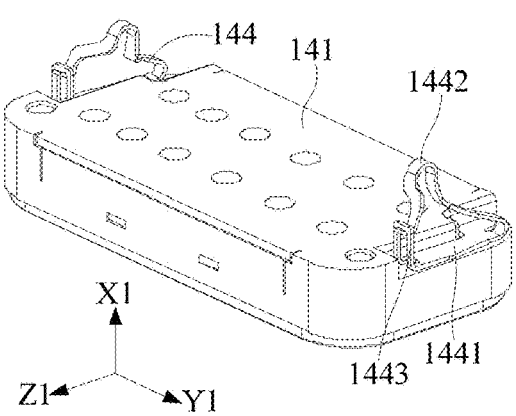
FIG. 40 is a schematic diagram illustrating a structure of a core facing a side of a main board according to some embodiments of the present disclosure.

FIG. 40 is a schematic diagram illustrating a structure of a core facing a side of a mainboard according to some embodiments of the present disclosure. Merely by way of example, in combination with FIG. 40, the metal elastic sheet 144 may include a fixing part 1441 and an elastic contact part 1442 connected to one end of the fixing part 1441. The fixing part 1441 may be connected to the magnetic circuit system 141. The elastic contact part 1442 may extend toward the fixing part 1441 away from the magnetic circuit system 141. In short, the part of the metal elastic sheet 144 for electrically connecting with the contact point on the mainboard 15 may protrude from the magnetic circuit system 141. Further, the metal elastic sheet 144 may further include a limiting part 1443 connected to the other end of the fixing part 1441. The limiting part 1443 and the elastic contact part 1442 may extend toward a same direction. The elastic contact part 1442 may be further bent and extended toward the limiting part 1443, and the free end of the elastic contact part 1442 may be inserted into a limiting groove of the limiting part 1443, so that the elastic contact part 1442 may store an elastic potential energy in advance, thereby increasing the goodness of the contact between the metal elastic sheet 144 and the contact point on the mainboard 15. In such cases, the height of the middle part of the elastic contact part 1442 relative to the fixing part 1441 may be greater than the height of the free end of the elastic contact part 1442 relative to the fixing part 1441 so as to facilitate the contact with the contact point on the mainboard 15.

Based on the related description mentioned above, the magnetic circuit system 141 may be connected to the side of the first housing 1314 facing the second housing 1315. The mainboard 15 may be connected to the side of the second housing 1315 facing the first housing 1314. The second housing 1315 may be buckled with the first housing 1314, so that the core 14 may elastically press the metal elastic sheet 144 on the mainboard 15, which is simple and reliable, and has high assembly efficiency. Each side of the opposite sides of the magnetic circuit system 141 may be configured with a metal elastic sheet 144 to increase the stability of the core 14 clamped by the second housing 1315 and the mainboard 15 together with the first housing 1314. Correspondingly, the diaphragm 143 may be enclosed with the first housing 1314 to form the front cavity 200. For example, the magnetic circuit system 141 may be supported and held on the annular flange formed by splicing the second flange 13161 and the first flange 13142 mentioned above. The magnetic circuit system 141 may be configured with a through-hole connecting the rear cavity 300 and a side of the diaphragm 143 away from the front cavity 200. In other words, the core 14

(specifically, the diaphragm 143) may divide the accommodating cavity formed by the core housing 131 into the front cavity 200 and the rear cavity 300 opposite to each other. The orthographic projection of the sound hole 1311 along the vibration direction of the core 14 may at least partially fall on the diaphragm 143. Further, the mainboard 15 and the core 14 may be stacked in the thickness direction, and the core 14 may be closer to the ear than the mainboard 15 to avoid arranging the through-hole connecting the side of the diaphragm 143 away from the rear cavity 300 and the front cavity 200 on the mainboard 15, thereby simplifying the structure. A ratio of an overlap area between the orthographic projection of the core 14 on the reference plane (for example, the plane where YZ is located) and the orthographic projection of the mainboard 15 on the reference plane to the larger one of an area of the orthographic projection of the mainboard 15 on the reference plane and the area of the orthographic projection of the core 14 on the reference plane may be in a range of 0.8 to 1. For example, the area of the orthographic projection of the core 14 on the reference plane may be substantially equal to the area of the orthographic projection of the mainboard 15 on the reference plane. Specifically, a ratio of an absolute value of a difference between a size of core 14 in the length direction and a size of the mainboard 15 in the length direction to the larger one of the size of the mainboard 15 in the length direction and the size of the core 14 in the length direction may be in a range of 0 to 0.2. A dimensional relationship between the core 14 and the mainboard 15 in the height direction may be the same as or similar to their dimensional relationship in the length direction. Thus, under a condition that a volume of the accommodating cavity formed by the core housing 131 is constant, the core 14 can be as large as possible, which is beneficial to increase the loudness of the earphone 10 and widen the frequency response range of the earphone 10.

It should be noted that, in combination with FIG. 40, although the core 14 has a major axis direction (indicated by Y1) and a minor axis direction (indicated by Z1) orthogonal to each other and perpendicular to the vibration direction of the core 14 (indicated by X1), for ease of description, the vibration direction, the major axis direction, and the minor axis direction in the embodiment provided in the present disclosure may be respectively parallel to the thickness direction, the major axis direction, and the height direction mentioned above. In other embodiments, an angle may be allowed between the vibration direction and the thickness direction, or between the major axis direction of the core 14 and the major axis direction mentioned above, or between the minor axis direction of the core 14 and the height direction. Further, the size of the core 14 in the major axis direction may be greater than or equal to the size of the core 14 in the minor axis direction. Merely by way of example, the orthographic projection of the core 14 on the reference plane perpendicular to the vibration direction may be in a rectangular shape. The major axis direction may be a direction of a long side of the rectangle, and the minor axis direction may be a direction of a short side of the rectangle.

Figure 36:
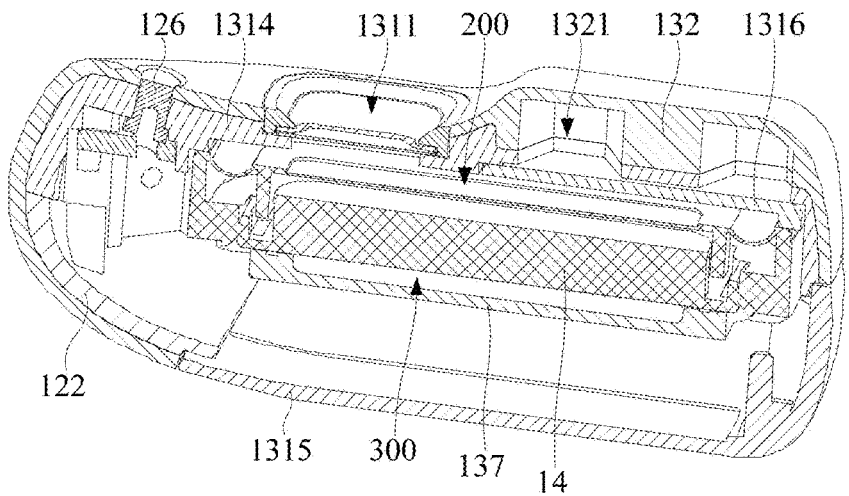
FIG. 36 is a schematic diagram illustrating a cross-sectional structure of an earphone according to some embodiments of the present disclosure.
Figure 46:
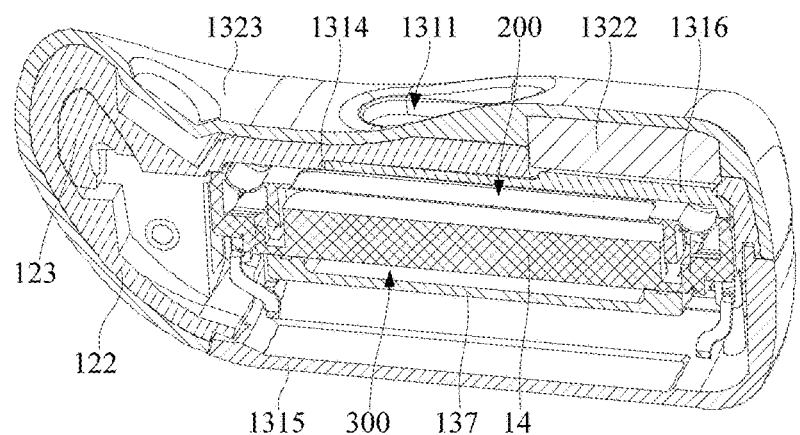
FIG. 46 is a schematic diagram illustrating a cross-sectional structure of an earphone according to some embodiments of the present disclosure.

The inventor(s) of the present disclosure has discovered in long-term research that when the mainboard 15 is arranged at the side of the core 14 away from the front cavity 200, a large number of electronic components with different sizes and shapes arranged on the mainboard 15 may affect the sound quality of the earphone 10. FIG. 36 is a schematic diagram illustrating a cross-sectional structure of an earphone according to some embodiments of the present disclosure. FIG. 46 is a schematic diagram illustrating a cross-sectional structure of an earphone according to some embodiments of the present disclosure. Thus, in combination with FIG. 36 and FIG. 46, the holding component 13 may further include the partition 137 arranged in the core housing 131. The partition 137 may be mainly used to separate the core 14 from the mainboard 15, and may be enclosed with the core 14 to form the rear cavity 300, that is, an independent sound cavity. Specifically, the partition 137 may be arranged between the magnetic circuit system 141 and the mainboard 15, and may be enclosed with the magnetic circuit system 141 to form the rear cavity 300. In other embodiments, the mainboard 15 may be covered by a layer to make the side of the mainboard 15 facing the core 14 as flat as possible.

Figure 39:
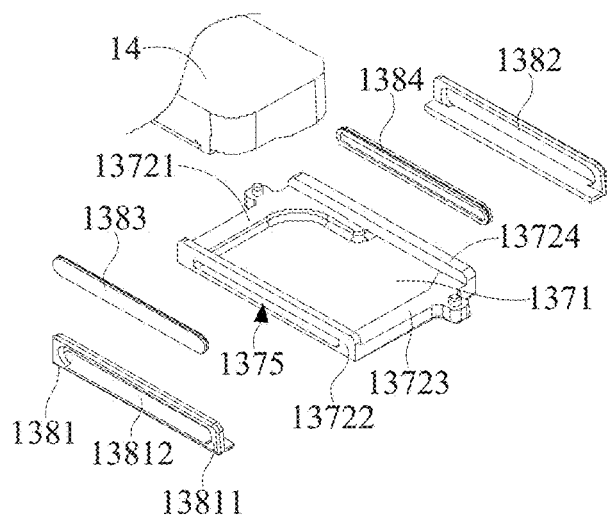
FIG. 39 is a schematic diagram illustrating a disassembled structure of an earphone according to some embodiments of the present disclosure.
Figure 44:
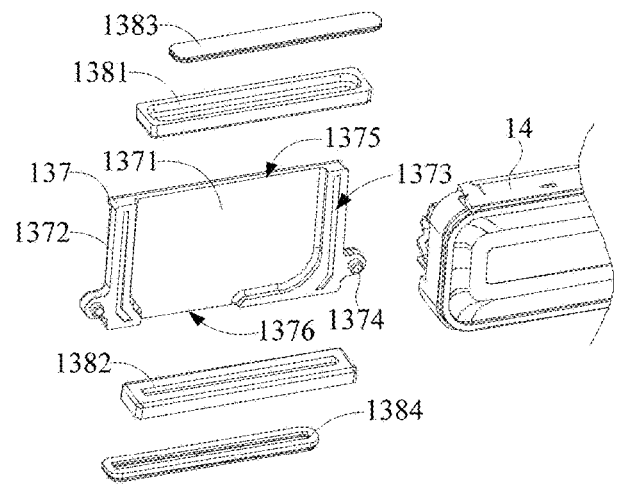
FIG. 44 is a schematic diagram illustrating a disassembled structure of an earphone according to some embodiments of the present disclosure.

Merely by way of example, the partition 137 may be connected to the core 14, that is, the partition 137 and the core 14 can be modularized to facilitate assembly. FIG. 39 is a schematic diagram illustrating a disassembled structure of an earphone according to some embodiments of the present disclosure. FIG. 44 is a schematic diagram illustrating a disassembled structure of an earphone according to some embodiments of the present disclosure. Specifically, in combination with FIG. 39 and FIG. 44, the partition 137 may include a bottom wall 1371 and a side wall 1372 connected to the bottom wall 1371. The bottom wall 1371 may be separated from the magnetic circuit system 141. The side wall 1372 may extend toward the core 14 and be connected to the core 14 (specifically, the magnetic circuit system 141), so as to allow the partition 137 to be enclosed with the core 14 to form the rear cavity 300. A side of the partition 137 facing the magnetic circuit system 141 may further be configured with a glue groove 1373 and a positioning column 1374 matched with the magnetic circuit system 141 to facilitate the accurate assembly of the partition 137 with the core 14. Correspondingly, the metal elastic sheet 144 may be arranged at the periphery of the partition 137.

Based on the related description mentioned above, the side wall 1372 may also be configured with a communicating hole that allows the rear cavity 300 to communicate with the outside of the earphone 10, for example, a first communicating hole 1375 connecting the pressure relief hole 1312 and the rear cavity 300, a second communicating hole 1376 connecting the sound adjusting hole 1313 and the rear cavity 300, etc. The partition 137 and the core housing 131 may also elastically support a sealing member that surrounds the communicating hole, so as to seal the sound path communicating between the rear cavity 300 and the outside of the earphone 10.

Figure 45:
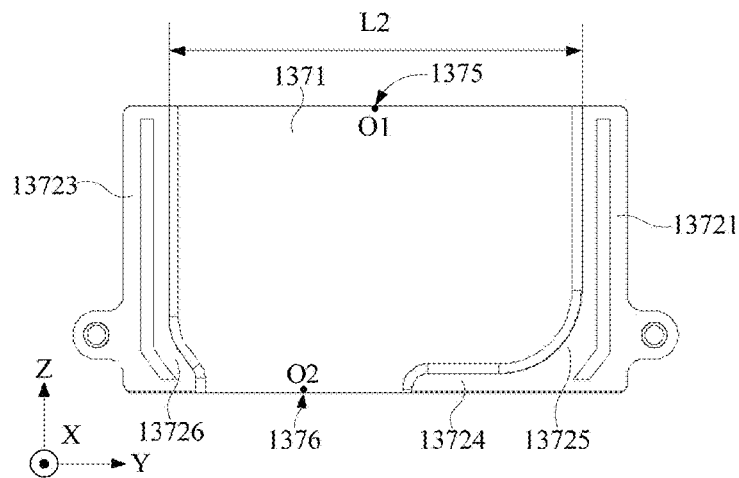
FIG. 45 is a schematic diagram illustrating a structure of a baffle facing a side of a core according to some embodiments of the present disclosure.

In the present disclosure, the structural components such as the core housing 131, the core 14, etc., may be generally arranged in a cubic structure or a cylindrical structure, which is not limited herein. In the present disclosure, the core 14 being arranged in a cubic structure may be taken as an example for illustration. A size of the partition 137 in the length direction may be greater than or equal to a size of the partition 137 in the height direction. In combination with FIG. 39, the side wall 1372 may include a first side wall 13721 and a third side wall 13723 spaced apart from each other in the length direction, and a second side wall 13722 and a fourth side wall 13724 spaced apart from each other in the height direction. Further, one of the second side wall 13722 and the fourth side wall 13724 may be configured with the first communicating hole 1375, and the other may be configured with the second communicating hole 1376. Based on the related description mentioned above, the first communicating hole 1375 may be arranged in the second side wall 13722, and the second communicating hole 1376 may be arranged in the fourth side wall 13724. FIG. 45 is a schematic diagram illustrating a structure of a baffle facing a side of a core according to some embodiments of the present disclosure. It should be noted that, in combination with FIG. 44 and FIG. 45, the second side wall 13722 may also be omitted, and the first communicating hole 1375 may be directly enclosed by the bottom wall 1371, the first side wall 13721, and the third side wall 13723, which may be exemplarily described in the following descriptions.

Further, the third side wall 13723 may be farther away from the sound hole 1311 than the first side wall 13721, that is, farther away from the connecting component 12 and closer to the free end of the holding component 13. A size of the first communicating hole 1375 in the length direction may be greater than a size of the second communicating hole 1376 in the length direction, and sizes of the first communicating hole 1375 and the second communicating hole 1376 in the thickness direction may be equal, so as to adjust an actual area of an effective communication region between the rear cavity 300 and the outside of the earphone 10 through the first communicating hole 1375 and the second communicating hole 1376. The first side wall 13721 and the fourth side wall 13724 may be connected by a first arc-shaped transition wall 13725 to avoid sharp structures such as a right angle, a sharp corner, etc., on the inner wall of the enclosed rear cavity 300, thereby helping to eliminate standing waves. The first arc-shaped transition wall 13725 may be arranged in a shape of a circular arc (referred to as a circular arc shape for brevity). A radius of the circular arc may be greater than or equal to 2 mm. Similarly, the third side wall 13723 and the fourth side wall 13724 may be connected by a second arc-shaped transition wall 13726. A radius of curvature of at least part of the inner wall surface of the first arc-shaped transition wall 13725 may be greater than a radius of curvature of the corresponding part of the inner wall surface of the second arc-shaped transition wall 13726, which may also be possible to avoid sharp structures such as a right angle, a sharp corner, etc., on the inner wall of the enclosed rear cavity 300. In other embodiments, the second arc-shaped transition wall 13726 may be omitted. For example, a part of the fourth side wall 1374 close to the third side wall 13723 may be used to arrange the second communicating hole 1376 so that the second communicating hole 1376 can extend along the length direction to be flush with the inner wall surface of the third side wall 13723.

It should be noted that in the thickness direction, an inner wall surface of the first communicating hole 1375 away from the core 14 may be flush with an inner wall surface of the bottom wall 1371 facing the core 14. The inner wall surface of the second communicating hole 1376 far away from the core 14 may be flush with the inner wall surface of the bottom wall 1371 facing the core 14. That is, the first communicating hole 1375 and the second communicating hole 1376 may extend along the thickness direction to be flush with the inner wall surface of the bottom wall 1371, so as to avoid sharp structures such as a right angle, sharp corner, etc., on the inner wall surface of the enclosed rear cavity 300, thereby helping to eliminate standing waves. Further, the inner wall surface of at least one of the first side wall 13721 and the third side wall 13723 may be arc-shaped when viewed from the height direction, so as to avoid sharp structures such as a right angle, a sharp corner, etc., on the inner wall surface of the enclosed rear cavity 300. In some embodiments, the inner wall surfaces of the side wall 1372 and the bottom wall 1371 may be arc connected.

In some embodiments, in combination with FIG. 39, heights of the second side wall 13722 and the fourth side wall 13724 relative to the bottom wall 1371 may both be greater than heights of the first side wall 13721 and the third side wall 13723 relative to the bottom wall 1371, so that the core 14 can be embedded between the second side wall 13722 and the fourth side wall 13724. The first side wall 13721 and the third side wall 13723 may respectively abut against a side of the core 14 facing the bottom wall 1371. In the thickness direction, a size of the first communicating hole 1375 may be greater than or equal to a distance between the bottom wall 1371 and the core 14. The size of the second communicating hole 1376 may be greater than or equal to a distance between the bottom wall 1371 and the core 14 to prevent the inner wall surface of the enclosed rear cavity 300 from appearing with sharp structures such as a right angle, a sharp corner, etc., thereby helping to eliminate standing waves. Further, the holding component 13 may further include a first sealing member 1381 and a second sealing member 1382 elastically supported between the partition 137 and the core housing 131. For example, the first sealing member 1381 may be elastically supported between the second side wall 13722 and the second housing 1315 and surround the first communicating hole 1375. As another example, the second sealing member 1382 may be elastically supported between the fourth side wall 13724 and the second housing 1315 and surround the second communicating hole 1376. Further, an outlet end of the first communicating hole 1375 may be covered with a first acoustic resistance net 1383, and a side of the first acoustic resistance net 1383 away from the side wall 1372 may also be covered with a protective cover. Similarly, an outlet end of the second communicating hole 1376 may be covered with a second acoustic resistance net 1384, and a side of the second acoustic resistance net 1384 away from the side wall 1372 may also be covered with a protective cover. The acoustic resistance net may not only increase the waterproof and dustproof performance, but also reduce the sound leakage. The structural strength of the protective cover may be greater than the structural strength of the acoustic resistance net so as to prevent the acoustic resistance net from being punctured by foreign objects. In some embodiments, to improve the waterproof performance of the earphone 10, the first communicating hole 1375 and/or the second communicating hole 1376 may be a hole with a slender shape. Further, a ratio of the size of the first communicating hole 1375 (or the second communicating hole 1376) in the major axis direction of the core 14 to the size of the first communicating hole 1375 (or the second communicating hole 1376) in the minor axis direction of the core 14 may be less than or equal to 5, preferably, may be less than or equal to 3. In some embodiments, a ratio of the area of the first communicating hole 1375 to the area of the second side wall 13722 may be greater than or equal to 50%, preferably, may be greater than or equal to 80%. Similarly, a ratio of the area of the second communicating hole 1376 to the area of the fourth side wall 13724 may be greater than or equal to 50%, preferably, may be greater than or equal to 80%. In some embodiments, the shape of the first acoustic resistance net 1383 and/or the second acoustic resistance net 1384 may be similar to the shape of the corresponding communicating hole, that is, the shape of the first acoustic resistance net 1383 and/or the second acoustic resistance net 1384 may have a slender shape. In some embodiments, the number of openings in the minor axis direction of the first acoustic resistance net 1383 and/or the second acoustic resistance net 1384 may be less than or equal to 6, preferably, may be less than or equal to 4. In some embodiments, a porosity of the first acoustic resistance net 1383 and/or the second acoustic resistance net 1384 in the minor axis direction thereof may be less than or equal to 50%, preferably may be less than or equal to 39.9%. Further, the porosity of the second acoustic resistance net 1384 may be less than or equal to the porosity of the first acoustic resistance net 1383. It should be noted that in some embodiments, acoustic resistance nets corresponding to other openings or holes described in the present disclosure may have same or similar features as the first acoustic resistance net 1383 or the second acoustic resistance net 1384.

Merely by way of example, the first sealing member 1381 may include a first extending part 13811 and a second extending part 13812 connected to the first extending part 13811. The first extending part 13811 and the second extending part 13812 may be attached and fixed on the side wall 1372 and the bottom wall 1371 away from the rear cavity 300, respectively, to increase a combined area between the first sealing member 1381 and the partition 137. Correspondingly, the first extending part 13811 may allow a region of the first acoustic resistance net 1383 corresponding to the first communicating hole 1375 to be exposed. For example, the first extending part 13811 may surround the first communicating hole 1375 and the first acoustic resistance net 1383 thereon, so as to facilitate the communication between the rear cavity 300 and the outside of the earphone 10. Further, the first extending part 13811 may press and fix the first acoustic resistance net 1383 on the side of the side wall 1372 away from the rear cavity 300 to prevent the first acoustic resistance net 1383 from being separated from the side wall 1372.

In the embodiment, the structure of the second sealing member 1382 and the connection relationship between the second sealing member 1382 and the partition 137 may be the same as or similar to that of the first sealing member 1381, which may not be repeated herein. Further, the first sealing member 1381 and the second sealing member 1382 may be formed on the partition 137 through the injection molding process.

It should be noted that in the embodiment, structural components such as the core 14, the partition 137 or the acoustic resistance net, the sealing member thereon, etc., may form a loudspeaker assembly, that is, the structural components can be modularized to facilitate assembly.

In other embodiments, in combination with FIG. 44, the second side wall 13722 may be omitted. The fourth side wall 13724 may be partially used for arranging the second communicating hole 1376, and the height of the fourth side wall 13724 relatives to the bottom wall 1371 may be equal to each height of the first side wall 13721 and the third side wall 13723 relatives to the bottom wall 1371 to abut against the magnetic circuit system 141 together with the first side wall 13721 and the third side wall 13723. The first sealing member 1381 may be embedded in the preset sink groove of the first sealing member 1381 or the second housing 1315 first. Then the first sealing member 1381 may be attached and fixed to the second housing 1315. Thus, the second housing 1315 and the first sealing member 1381 may clamp the first acoustic resistance net 1383 together, and the subsequent assembly may be performed. The side of the first sealing member 1381 facing the second housing 1315 may be configured with a sink groove for accommodating the first acoustic resistance net 1383. Similarly, the second sealing member 1382 and the second acoustic resistance net 1384 may also be attached and fixed on the second housing 1315 to form a housing assembly, that is, the second sealing member 1382, the second acoustic resistance net 1384, and the second housing 1315 can be modularized to facilitate assembly.

Based on the detailed description mentioned above, to facilitate the description, the following definitions may be made in combination with FIG. 47: the front cavity 200 may have a first opening 201 that allows the front cavity 200 to communicate with the outside of the earphone 10, and the rear cavity 300 may have a second opening 301 and a third opening 302 that allow the rear cavity 300 to communicate with the outside of the earphone 10. Correspondingly, the second opening 301 may be farther away from the ear hole than the first opening 201 and the third opening 302. Each of the first opening, the second opening, and the third opening may refer to an effective communication region between the front cavity 200 or the rear cavity 300 and the outside of the earphone 10. That is, a region with the smallest cross section through which the sound is transmitted from the front cavity 200 or the rear cavity 300 to the outside of the earphone 10. For example, the core 14 may cooperate with the first housing 1314 (and the cover plate 1316) to form the front cavity 300, and the first opening 201 may correspond to the sound hole 1311. In the embodiment in which the earphone 10 is configured with the partition 137, that is, the partition 137 cooperates with the core 14 to form the rear cavity 300, if an actual area of the pressure relief hole 1312 is greater than an actual area of the second communicating hole 1376, the second opening 301 may correspond to the second communicating hole 1376. If the actual area of the pressure relief hole 1312 is smaller than the actual area of the second communicating hole 1376, the second opening 301 may correspond to the pressure relief hole 1312. If the pressure relief hole 1312 and the second communicating hole 1376 are staggered with each other, the second opening 301 may correspond to a portion where the pressure relief hole 1312 and the second communicating hole 1376 are not shielded from each other. The third opening 302 may be similar to the second opening 301, and details may not be repeated herein. In an embodiment in which the earphone 10 is not configured with the partition 137, that is, the second housing 1315 cooperates with the core 14 to form the rear cavity 300, the second opening 301 and the third opening 302 may directly correspond to the pressure relief hole 1312 and the sound adjusting hole 1313, respectively. In some embodiments, if the earphone 10 is not configured with at least one of the front cavity 200 or the rear cavity 300, the corresponding opening may naturally no longer exist.

Further, in order to facilitate the description, an effective area described in the present disclosure may be defined as a product of an actual area of an effective communication region and a porosity of the corresponding acoustic resistance net. For example, when the first opening 201 is covered with an acoustic resistance net, the effective area of the first opening 201 may be the product of an actual area of the first opening 201 and a porosity of the acoustic resistance net. When the first opening 201 is not covered with an acoustic barrier, the effective area of the first opening 201 may be the actual area of the first opening 201. The second opening 301 and the third opening 302 may be similar to the first opening 201, and details may not be repeated herein. In the present disclosure, an effective area of the third opening 302 may be smaller than an effective area of the second opening 301.

In some embodiments, in combination with FIG. 39 and FIG. 44, an actual area of the outlet end of the second communicating hole 1376 may be smaller than or equal to an actual area of the outlet end of the first communicating hole 1375, so that an actual area of an effective communication region between the sound adjusting hole 1313 and the rear cavity 300 may be smaller than or equal to an actual area of an effective communication region between the pressure relief hole 1312 and the rear cavity 300. An actual area of the outlet end of the pressure relief hole 1312 may be greater than or equal to the actual area of the outlet end of the first communicating hole 1375. In such cases, a size of the outlet end of the sound adjusting hole 1313 in the length direction may be equal to a size of the outlet end of the pressure relief hole 1312 in the length direction. In some embodiments, the size of the outlet end of the sound adjusting hole 1313 in the thickness direction may be equal to the size of the outlet end of the pressure relief hole 1312 in the thickness direction. Thus, an actual area of an effective communication region between the rear cavity 300 and the outside of the earphone 10 at the sound adjusting hole 1313 or the pressure relief hole 1312 may be adjusted by adjusting the size of the corresponding communicating hole to meet the corresponding acoustic design requirements. In addition, the sound adjusting hole 1313 and the pressure relief hole 1312 may be designed to have little difference in appearance to increase the consistency of the appearance, thereby allowing them to use the acoustic resistance net with the same specification to reduce the count of types of materials or avoid material mixing. In other embodiments, the size of the sound adjusting hole 1313 may be changed with the change of the second communicating hole 1376 to make the sound adjusting hole 1313 look different from the pressure relief hole 1312 in appearance, so as to increase the appearance recognition degree. Further, a porosity of the second acoustic resistance net 1384 may be smaller than or equal to a porosity of the first acoustic resistance net 1383, so that the effective area of the effective communication region between the sound adjusting hole 1313 and the rear cavity 300 can be smaller than or equal to the effective area of the effective communication region between the pressure relief hole 1312 and the rear cavity 300.

Further, the effective communication region (for example, the first communicating hole 1375) between the pressure relief hole 1312 and the rear cavity 300 may have a first center (denoted as O1) in the length direction. The effective communication region (for example, the second communicating hole 1376) between the sound adjusting hole 1313 and the rear cavity 300 may have a second center (denoted as O2) in the length direction, and the second center may be farther away from the center of the sound hole 1311 (denoted as O0) than the first center in the length direction. That is, the second center may be closer to the third side wall 13723, so as to increase the distance between the sound adjusting hole 1313 and the sound hole 1311 as much as possible, thereby weakening the anti-phase cancellation between the sound output to the outside of the earphone 10 through the sound hole 1313 and the sound transmitted to the ear through the sound hole 1311.

It should be noted that a center of a hole or an opening in the present disclosure may refer to a position where distances to the circumference of the closed curve surrounding the hole or opening are equal. For a regular shape such as a circle, a rectangle, or the like, the center of the hole or opening described in the present disclosure may be the geometric center. For other irregular shapes, the center of the hole or opening described in the present disclosure may be the centroid.

Figure 48:
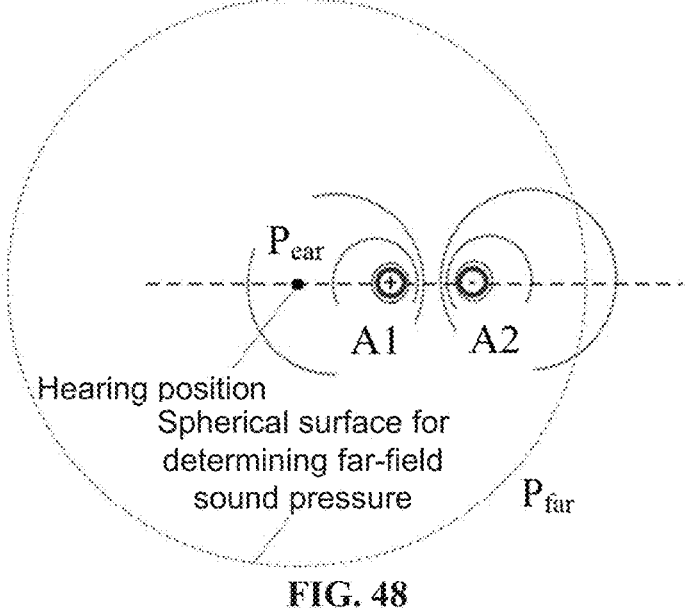
FIG. 48 is a schematic diagram illustrating a sound field distribution of an acoustic dipole according to some embodiments of the present disclosure.

FIG. 48 is a schematic diagram illustrating a sound field distribution of an acoustic dipole according to some embodiments of the present disclosure. In combination with FIG. 48, the sound transmitted to the outside of the earphone 10 through the first opening 201 may be simply regarded as a first sound formed by a monopole sound source A1. The sound transmitted to the outside of the earphone 10 through the second opening 301 may be simply regarded as a second sound formed by a monopole sound source A2. The second sound may be opposite to the first sound in phase, which may be reversed and canceled in the far-field. That is, an "acoustic dipole" may be formed to reduce sound leakage. Preferably, in the wearing state, a connection line of the two monopole sound sources may be directed to the ear hole (denoted as "hearing position"), so that the user can hear a sufficiently loud sound. A sound pressure at the hearing position (denoted as $P_{ear}$) may be used to indicate the strength of the sound heard by the user. Further, the sound pressures (denoted as $P_{far}$) on a spherical surface centered on the hearing position of the user may be used to indicate the strength of the sound leakage of the earphone 10 radiated to the far-field. A variety of statistical manners may be used to obtain $P_{far}$, such as taking an average value of the sound pressure at each point on the spherical surface, taking the sound pressure distribution at each point on the spherical surface for area classification, etc. Generally, the sound pressure $P_{ear}$ transmitted by the earphone 10 to the ear of the user should be large enough to increase the listening effect, and the sound pressure $P_{far}$ in the far-field should be small enough to increase the sound leakage reduction effect. Therefore, parameter α may be used as an indicator for evaluating the sound leakage reduction or listening effect of the earphone 10, which may be determined according to Equation as follows:

$$\alpha = \frac{|P_{far}|^2}{|P_{ear}|^2}$$

Further, when the earphone 10 is in the wearing state, the orthographic projection of the holding component 13 (for example, a side of the holding component 13 arranged at the ear hole close to the top of the head of the user, which is in contact with the antihelix at the front side of the ear) on the ear may mainly fall within the range of the helix. The first opening 201 may be arranged between the antihelix and the upper ear root, and transmit the sound to the ear hole. Further, since the concha cavity and the concha boat have a certain depth and are connected with the ear hole, the orthographic projection of the first opening 201 on the ear may at least partially fall within the concha cavity and/or the concha boat, so that the sound transmitted to the outside of the earphone 10 through the first opening 201 can be transmitted to the ear hole. FIG. 49 is a schematic diagram illustrating a sound field distribution of an acoustic dipole with a baffle according to some embodiments of the present disclosure. FIG. 50 is a schematic diagram illustrating a sound pressure in far-field of when an acoustic dipole with and without a baffle according to some embodiments of the present disclosure. In addition, in combination with FIG. 49 and FIG. 50, the ear may also be equivalent to a baffle set near the hearing position, which has an effect of converging and reflecting the sound transmitted to the outside of the earphone 10, thereby changing the sound field distribution. As a result, it not only helps to increase the sound pressure of the hearing position, but also reduces the sound pressure in the far-field. Specifically, the hearing position may be set between the baffle and the monopole sound source A1. The baffle may distort the sound field distribution, thereby increasing the sound pressure at the hearing position. Meanwhile, an entire sound field may still retain a large region for anti-phase cancellation may still, thereby reducing the sound pressure in the far-field. It should be noted that the head of the user may also be used as a part of the baffle. Further, since a distance between each of the two monopole sound sources and the ear may be much smaller than the size of the ear, the ear may achieve an effect similar to an acoustic reflector.

FIG. 51 is a schematic diagram illustrating a theoretical model of an acoustic dipole with a baffle according to some embodiments of the present disclosure. The inventors of the present disclosure have discovered in long-term research that, in a theoretical model of the coordination of the acoustic dipole and the baffle, in combination with FIG. 51, the parameter α may be mainly affected by the factors including an angle θ between a connection line of the two monopole sound sources (denoted as A1-A2) and a normal line of the baffle, a distance d between the two monopole sound sources, a distance D between the monopole sound source A1 and the hearing position, a length L of the baffle, a distance B between the baffle and the hearing position, or the like. When the angle θ and the distance d are constant, the greater the length L of the baffle is and the smaller the distance B is, the smaller the parameter α may be, that is, the better the sound leakage reduction effect may be. Based on the related description mentioned above, the ear of the user may be regarded as the baffle, so that the length L may be relatively determined, for example, about 50-80 mm, and the distance B may be about zero. Further, in order to increase the sound pressure at the hearing position to increase the listening effect, the first opening 201 may be generally set as close to the ear hole as possible, that is, the distance D may be generally as small as possible. For example, a distance between the center of the first opening 201 and the center of the ear hole may be smaller than or equal to 16 mm. As another example, a distance between the lower edge of the holding component 13 facing the ear hole and the highest point (for example, CP1) of the hook-shaped component 11 away from the holding component 13 in the height direction may be greater than or equal to 19 mm. Further, if the distance d is too small, the sound pressure at the hearing position may decrease, which is not conducive to listening sound. If the distance d is too large, the sound pressure in the far-field may increase, which is not conducive to reducing sound leakage. In addition, an actual size of the holding component 13 may also be considered. Therefore, the distance between the center of the second opening 301 and the center of the first opening 201 may be in a range of 7 mm to 15 mm. In a specific embodiment, the distance between the centers of the second opening 301 and the first opening 201 may be 9 mm.

Figure 52:
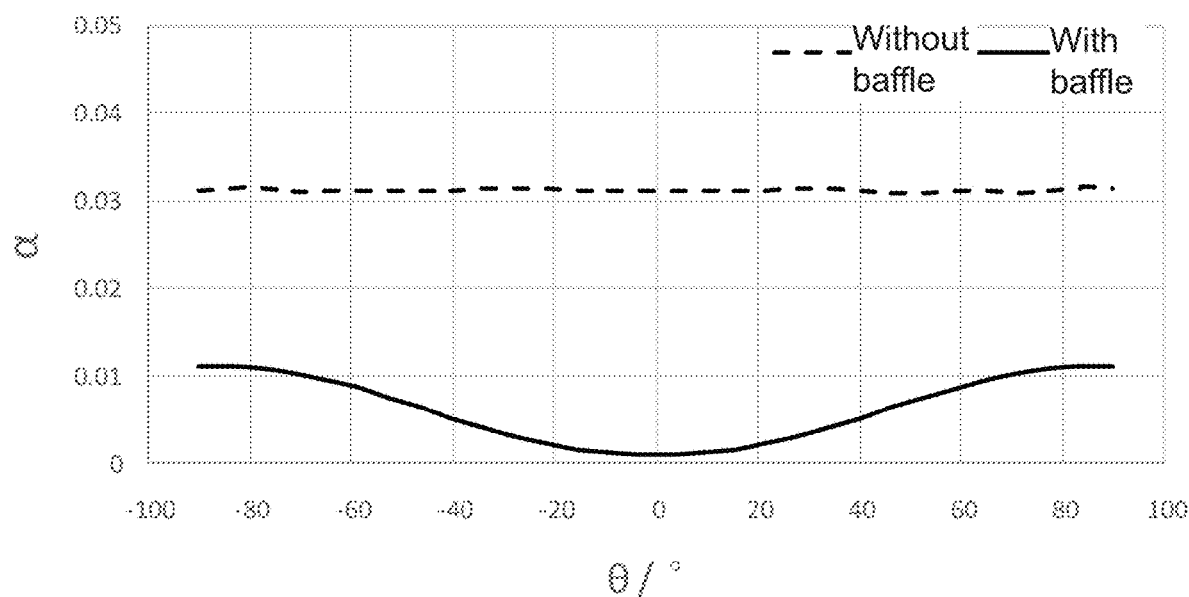
FIG. 52 is a schematic diagram illustrating a relationship between a parameter $\alpha$ and an angle $\theta$ according to some embodiments of the present disclosure.

FIG. 52 is a schematic diagram illustrating a relationship between a parameter α and an angle θ according to some embodiments of the present disclosure. Further, in combination with FIG. 52, taking "without baffle" as a reference, "with baffle" may be obviously beneficial to reduce the parameter α, that is, to increase the sound leakage reduction effect. When the angle θ=0°, the parameter α may reach the minimum value, which indicates that the best sound leakage reduction effect is obtained. In the present disclosure, the angle θ may be within the range of ±80°. Preferably, the angle θ may be within the range of ±40°. More preferably, the angle θ may be within the range of ±20°. In combination with FIG. 47, considering that the second opening 301 is generally arranged at the side of the first opening 201 away from the ear hole, the angle θ may only take a positive value.

Figure 53:
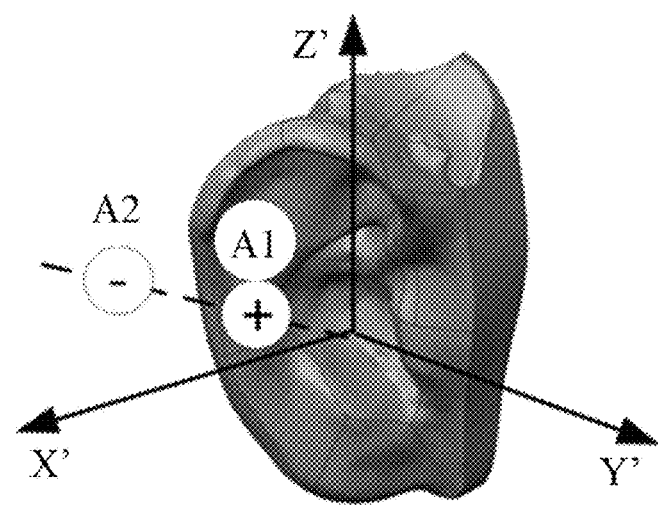
FIG. 53 is a schematic diagram illustrating a relative relationship between an acoustic dipole and an ear according to some embodiments of the present disclosure.

FIG. 53 is a schematic diagram illustrating a relative relationship between an acoustic dipole and an ear according to some embodiments of the present disclosure. Merely by way of example, in combination with FIG. 53 and FIG. 47, a three-dimensional reference coordinate system (denoted as X'Y'Z') may be established based on any three of the basic sections and any three of the basic axes of the human body that are perpendicular to each other. The angle θ between the connection line of the two monopole sound sources and the normal line of the baffle may be determined by angles between the line A1-A2 and the X' axis, the Y' axis, and the Z' axis, respectively. Based on the related description mentioned above, the connection line A1-A2 between the two monopole sound sources may also be regarded as the connection line (denoted as O1-O0) between the center (for example, O1) of the second opening 301 and the center (for example, O0) of the first opening 201. An angle θ1 between the connection line O1-O0 and the sagittal plane may be greater than or equal to 10°. Preferably the angle θ1 may be greater than or equal to 30°. An angle θ2 between the connection line O1-O0 and the coronal plane may be greater than 0°, preferably the angle θ2 may be greater than or equal to 4°. An angle θ3 between the connection line O1-O0 and the horizontal plane may be smaller than or equal to 80°, preferably the angle θ3 may be smaller than or equal to 60°. In a specific embodiment, the three angles θ1, θ2, and θ3 may be 34°, 5° and 56°, respectively.

Further, when the earphone 10 is in the wearing state, the holding component 13 may be close to the front side of the ear, and the first opening 201 on the holding component 13 may face the ear, so that the holding component 13 can be simply regarded as an average normal line of the baffle perpendicular to the first opening 201. An angle between the connection line O1-O0 and the reference plane perpendicular to the average normal line of the first opening 201 may be between 25° and 55°. The average normal line may be determined according to Equation as below.

$$\hat{r}_0 = \frac{\oiint_s \hat{r} ds}{|\oiint_s \hat{r} ds|};$$

where $\hat{r}_0$ denotes the average normal line; $\hat{r}$ denotes a normal line of any point on a surface, ds denotes a face unit.

When the first opening 210 is a plane, the reference plane perpendicular to the average normal line may be a tangent plane of the first opening 201. Correspondingly, the average normal line may be parallel to the vibration direction of the core 14 and the thickness direction. Therefore, an angle between the connection line O1-O0 and the vibration direction may be between 0° and 50°, preferably may be between 0° and 40°.

Further, based on the related description mentioned above, the ear may be simply regarded as the baffle cooperating with the acoustic dipole. A reference plane may be determined through at least three physiological positions on the front side of the ear that are not collinear. For example, connection lines between each two of the upper ear root, the intertragic notch, and the Darwin's nodule may form a reference plane (denoted as LA-LB-LD), which may be used to describe the baffle. The angle between the connection line O1-O0 and the reference plane may be between 23° and 53°.

In a specific embodiment, the angle between the connection line O1-O0 and the reference plane may be 38°.

Further, when the earphone 10 is in the wearing state, the earphone 10 may form a plurality of contact points with the ear to ensure the stability of wearing. As a result, there may also be positions on the earphone 10 corresponding to the contact points, respectively. In the embodiment in which the hook-shaped component 11 is configured with the elastic component 112, the elastic deformation of the elastic component 112 before and after wearing may cause a certain deviation in the correspondence relationship, and the deviation may be controlled by the deformability of the elastic component 112. Therefore, for ease of description, the deviation may be tolerable. Merely by way of example, in combination with FIG. 31 and FIG. 59, the free end of the holding component 13 away from a fixing assembly 20 may have a first reference point (for example, CP0) for contact with the front side of the ear. The fixing assembly 20 may have a second reference point (for example CP3) for contact with the upper ear root and a third reference point (for example CP6) for contact with the ear on the rear side of the ear. Connection lines between each two of the first reference point, the second reference point, and the third reference point may form a reference plane (denoted as CP0-CP3-CP6), and the reference plane may be used to describe the baffle. The angle between the connection line O1-O0 and the reference plane may be between 15° and 45°. In a specific embodiment, the angle between the connection line O1-O0 and the reference plane may be 30°.

It should be noted that compared with the baffle, the front surface of the ear may not be a flat and regular structure. Therefore, the above-mentioned parameters related to the parameter α may be obtained through theoretical analysis and actual measurement. The actual measurement may refer to a measurement performed after the earphone 10 is worn on the simulator (for example, GRAS 45BC KEMAR).

As is known to all, although a frequency range of sounds that can be felt by normal people's ears is between 20 Hz and 20 kHz, it does not mean that all of these sounds can be heard. In general, normal people's ears may mainly hear sounds with frequencies below 4 kHz. Thus, on the one hand, a resonant frequency of the first sound transmitted to the outside of the earphone 10 through the first opening 201 may be shifted to a high frequency as much as possible, so that a frequency response curve of the first sound can be as flat as possible in a medium-high frequency band, thereby increasing the listening effect. On the other hand, a resonant frequency of the second sound transmitted to the outside of the earphone 10 through the second opening 301 may also be shifted to the high frequency as much as possible, which can not only reduce the user's sensitivity to the sound leakage, but also make the anti-phase cancellation can be extended to a high frequency band, so as to reduce the sound leakage without affecting the listening effect. Therefore, the frequency response curve of the first sound may have a first lowest resonance peak of the medium-high frequency. The first lowest resonance peak of the medium-high frequency may be a resonance peak with the lowest frequency among all resonance peak frequencies in the medium-high frequency and above frequency bands of the frequency response curve formed by the first opening 201. Similarly, the frequency response curve of the second sound may have a second lowest resonance peak of the medium-high frequency. The second lowest resonance peak of the medium-high frequency may be a resonance peak with the lowest frequency among all resonant peak frequencies in the medium-high frequencies and above frequency bands of the frequency response curve formed by the second opening 301. In short, the frequency response curve of the first sound may have a first resonance peak with the lowest frequency in the medium-high frequency band and above frequency band. Similarly, the frequency response curve of the second sound may have a second resonance peak with the lowest frequency in the medium-high frequency band and above frequency band. A peak resonance frequency of the first lowest resonance peak of the medium-high frequency and a peak resonance frequency of the second lowest resonant peak of the medium-high frequency may be greater than or equal to 5 kHz. Preferably, the peak resonance frequency of the first lowest resonance peak of the medium-high frequency and the peak resonance frequency of the second lowest resonant peak of the medium-high frequency may be greater than or equal to 6 kHz. Further, a difference between the peak resonance frequency of the first lowest resonance peak of the medium-high frequency and the peak resonance frequency of the second lowest resonant peak of the medium-high frequency may be smaller than or equal to 1 kHz, so that the anti-phase cancellation may be better performed on the second sound and the first sound in the far-field.

It should be noted that in the present disclosure, a frequency range corresponding to a low-frequency band may be in a range of 20 Hz-150 Hz. A frequency range corresponding to a middle-frequency band may be a range of 150 Hz-5 kHz. A frequency range corresponding to a high-frequency band may be a range of 5 k-20 kHz. A frequency range corresponding to a medium-low frequency band may be a range of 150 Hz-500 Hz. A frequency range corresponding to the medium-high frequency band may be a range of 500 Hz-5 kHz. For a frequency response curve described in the present disclosure, the horizontal axis may represent frequency, and the unit may be Hz. The vertical axis may represent intensity, and the unit may be dB. Further, the first lowest resonance peak of the medium-high frequency may include a resonant peak generated by cavity resonance, and/or a standing wave peak generated by reflection from a cavity surface of a cavity. The second lowest resonance peak of the medium-high frequency may be similar to the first lowest resonance peak of the medium-high frequency, and details may not be described herein.

Based on the detailed description mentioned above, the user may mainly hear the first sound when wearing the earphone 10, thus the peak resonance frequency of the first lowest resonance peak of the medium-high frequency may have a great influence on the listening effect. The first lowest resonance peak of the medium-high frequency is studied to improve the listening effect. The resonant peaks of the frequency response curve of the first sound in the medium-high frequency band and above frequency band may be mainly caused by cavity resonance, which generally satisfies the calculation formula of the resonant frequency of the Helmholtz resonant cavity:

$$f_0 = \frac{c_0}{2\pi}\sqrt{\frac{S}{V(l+1.7r)}}$$

where, $f_0$ denotes the resonance frequency of the cavity resonance, $c_0$ denotes a speed of sound in the air, S denotes the actual area of the first opening 201, V denotes a volume of the front cavity 200, l denotes a length of the first opening 201, and r denotes an equivalent radius of the first opening 201. l generally depends on a wall thickness of the housing.

Obviously, the greater the actual area of the first opening 201 is and the smaller the volume of the front cavity 200 is, the higher the resonance frequency corresponding to cavity resonance may be, that is, the first lowest resonant peak of the medium-high frequency may be easier to shift to a higher frequency. Further, the first opening 201 may be generally covered with a acoustic resistance net to increase the waterproof and dustproof performance and adjust the frequency response curve. Merely by way of example, an effective area of the first opening 201 may be greater than or equal to 2 mm². In a specific embodiment, the actual area of the first opening 201 may be greater than or equal to 7 mm², and a porosity of the acoustic resistance net covered on the first opening 201 may be greater than or equal to 13%. In some embodiments, a pore size may be greater than or equal to 18 μm. Further, the volume of the front cavity 200 may be smaller than or equal to 90 mm³. The volume of the front cavity 200 may be approximately a product of the area of the diaphragm 143 and the depth of the front cavity 200 in the vibration direction of the core 14. After the specification and model of the core 14 are selected, and on a premise that the vibration stroke of the diaphragm 143 is satisfied, the depth of the front cavity 200 in the vibration direction may be as small as possible. Therefore, the maximum depth of the front cavity 200 in the vibration direction may be smaller than or equal to 3 mm, preferably may be smaller than or equal to 1 mm.

Figure 54:
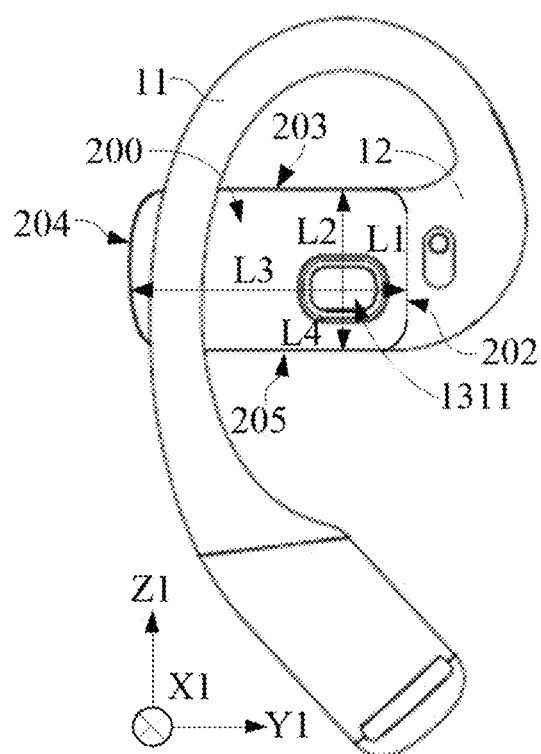
FIG. 54 is a schematic diagram illustrating a structure of an earphone facing a side of an ear according to some embodiments of the present disclosure.

FIG. 54 is a schematic diagram illustrating a structure of an earphone facing a side of an ear according to some embodiments of the present disclosure. Further, in combination with FIG. 54, when the front cavity 200 is configured as a cubic structure, the cavity surface of the front cavity 200 may form at least a pair of parallel or approximately parallel reflecting surfaces, thereby forming a standing wave. Specifically, when a sound wave is reflected in the cavity, an incident wave and a reflected wave may be superimposed to form a fixed antinode and a fixed node, thereby triggering a standing wave at a specific frequency. In other words, the resonance peaks of the frequency response curve of the first sound in the medium-high frequency band and above frequency band may also be derived from a standing wave, which generally satisfies the calculation equation as follows:

$$f_0 = \frac{c_0}{4L}(2n-1),$$

where, $f_0$ denotes a frequency of a standing wave peak, $c_0$ denotes the speed of sound in the air, L denotes a distance between the center of the first opening 201 and the cavity surface of the front cavity 200, and n denotes a positive integer.

Obviously, the smaller the distance L is, the higher the frequency corresponding to the standing wave peak may be. That is, the first lowest resonance peak of the medium-high frequency may be easier to shift to a higher frequency. Merely by way of example, on a reference plane perpendicular to the vibration direction of the core 14 (for example, the plane where Y1Z1 is located), the distance between the center of the first opening 201 and the cavity surface of the front cavity 200 may be smaller than or equal to 17.15 mm.

Based on the related description mentioned above, the front cavity 200 may have a first front cavity surface 202 and a third front cavity surface 204 spaced apart from each other in the major axis direction of the core 14, and a second front cavity surface 203 and a fourth front cavity surface 205 spaced apart from each other in the minor axis direction of the core 14. The first front cavity surface 202 may be closer to the connecting component 12 than the third front cavity surface 204. The fourth front cavity surface 205 may be closer to the ear hole than the second front cavity surface 203. A distance between the first front cavity surface 202 and the third front cavity surface 204 may be greater than or equal to a distance between the second front cavity surface 203 and the fourth front cavity surface 205. Further, vertical distances from the center of the first opening 201 to the first front cavity surface 202, the second front cavity surface 203, the third front cavity surface 204, and the fourth front cavity surface 205 may be defined as a first distance L1, a second distance L2, a third distance L3, and a fourth distance L4, respectively. Assuming that the four vertical distances have the following basic relationship: L1≥L2≥L3≥L4, then frequencies corresponding to the corresponding standing wave peaks may have the following relationship: f1≤f2≤f3≤f4. A first standing wave peak of the first sound in the medium-high frequency band and above frequency band may be determined by the greatest distance among the four vertical distances, so that L1≤17.15. Merely by way of example, the first distance may be smaller than or equal to the third distance, and the fourth distance may be smaller than or equal to the second distance, so that the first opening 201 may be closer to the ear hole.

It should be noted that the first opening 201 may be opposite to the diaphragm 143 in the vibration direction of the core 14, and a ratio of the size of the first opening 201 in the major axis direction of the core 14 to the size of the first opening 201 in the minor axis direction of the core 14 may be smaller than or equal to 3. For example, the first opening 201 may be set in a circular shape. As another example, the first opening 201 may be set in a racetrack shape.

Figure 55:
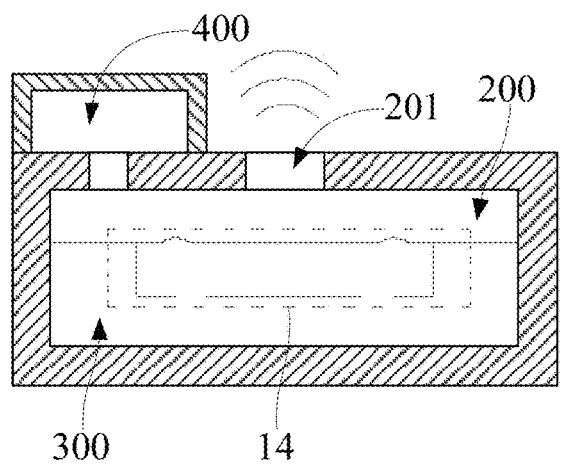
FIG. 55 is a schematic diagram illustrating a structure of an earphone according to some embodiments of the present disclosure.
Figure 56:
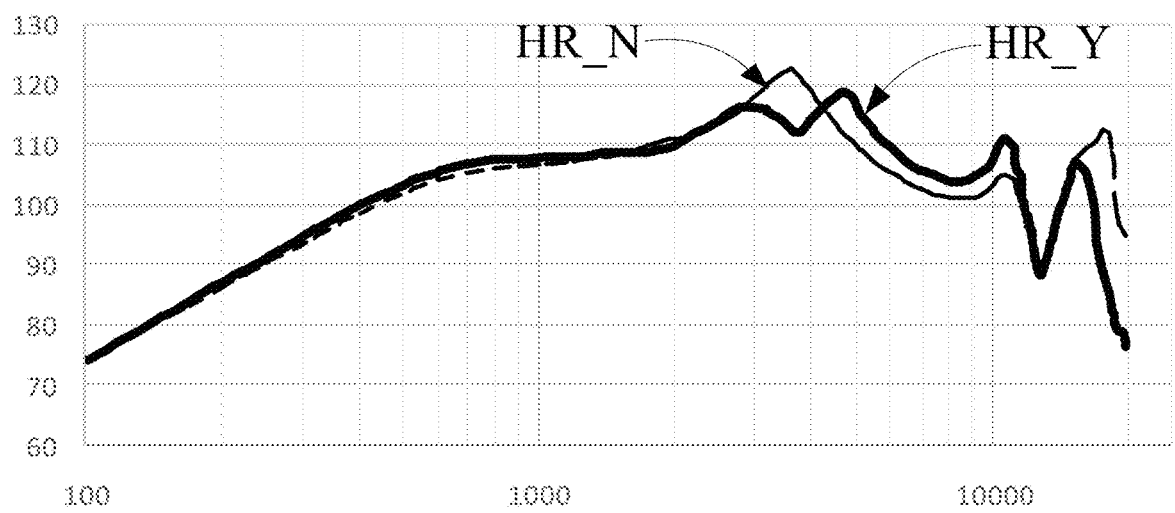
FIG. 56 is a schematic diagram illustrating a frequency response curve of an earphone according to some embodiments of the present disclosure.

FIG. 55 is a schematic diagram illustrating a structure of an earphone according to some embodiments of the present disclosure. In combination with FIG. 55, the earphone 10 may further include a Helmholtz resonant cavity 400 communicating with the front cavity 200. The Helmholtz resonant cavity 400 may be configured to weaken a peak resonance intensity of the first lowest resonance peak of the medium-high frequency. That is, a sound energy in the front cavity 200 near the peak resonance frequency may be absorbed to suppress a sudden increase of the peak resonance intensity, so that the frequency response curve can be flatter, and the sound quality may be more balanced. FIG. 56 is a schematic diagram illustrating a frequency response curve of an earphone according to some embodiments of the present disclosure. Merely by way of example, in combination with FIG. 56, a difference between the peak resonance intensity of the first lowest resonant peak of the medium-high frequency when the opening connecting the Helmholtz resonant cavity 400 and the front cavity 200 is in an open state (denoted as "HR_Y") and the peak resonance intensity of the first lowest resonant peak of the medium-high frequency when the opening connecting the Helmholtz resonant cavity 400 and the front cavity 200 is in a closed state (denoted as "HR_N") may be greater than or equal to 3 dB. Further, the opening connecting the Helmholtz resonant cavity 400 and the front cavity 200 may be configured with an acoustic resistance net to further adjust the frequency response curve. A porosity of the acoustic resistance net may be greater than or equal to 3%.

Further, there may be multiple Helmholtz resonance cavities 400 to better absorb the acoustic energy in the front cavity 200 near the peak resonance frequency. The multiple Helmholtz resonance cavities 400 may be arranged in parallel with the front cavity 200, for example, respectively in communication with the front cavity 200. Alternatively, the multiple Helmholtz resonant cavities 400 may be arranged in series with the front cavity 200, for example, communicating with the front cavity 200 through one of the multiple Helmholtz resonant cavities 400.

In some embodiments, in combination with FIG. 36, the Helmholtz resonance cavity 400 may be arranged in the second region 13B, for example, in the flexible covering structure 132. Specifically, the blind hole 1321 in the flexible covering structure 132 may not only provide a deformation space for the flexible covering structure 132, but also serve as the Helmholtz resonant cavity 400. Correspondingly, a communicating hole connecting the Helmholtz resonant cavity 400 and the front cavity 200 may be arranged on the cover plate 1316.

In other embodiments, in combination with FIG. 41, the Helmholtz resonance cavity 400 may be arranged in the connecting component 12, for example, between the third housing 122 and the first housing 1314. Specifically, the first flange may be arranged on the inner wall surface of the first housing 1314 facing the third housing 122, and the third housing 122 may be pressed and held on the first flange to enclose and form the Helmholtz resonance cavity 400. Alternatively, the inner wall surface of the third housing 122 facing the first housing 1314 may be configured with the second flange. The first housing 1314 may be pressed and held on the second flange to enclose and form the Helmholtz resonance cavity 400. In short, the third housing 122 and the first housing 1314 may be buckled together to form the Helmholtz resonance cavity 400. Further, the Helmholtz resonance cavity 400 may be formed by a blow molding process, and then be arranged and fixed in the connecting component 12.

Figure 58:
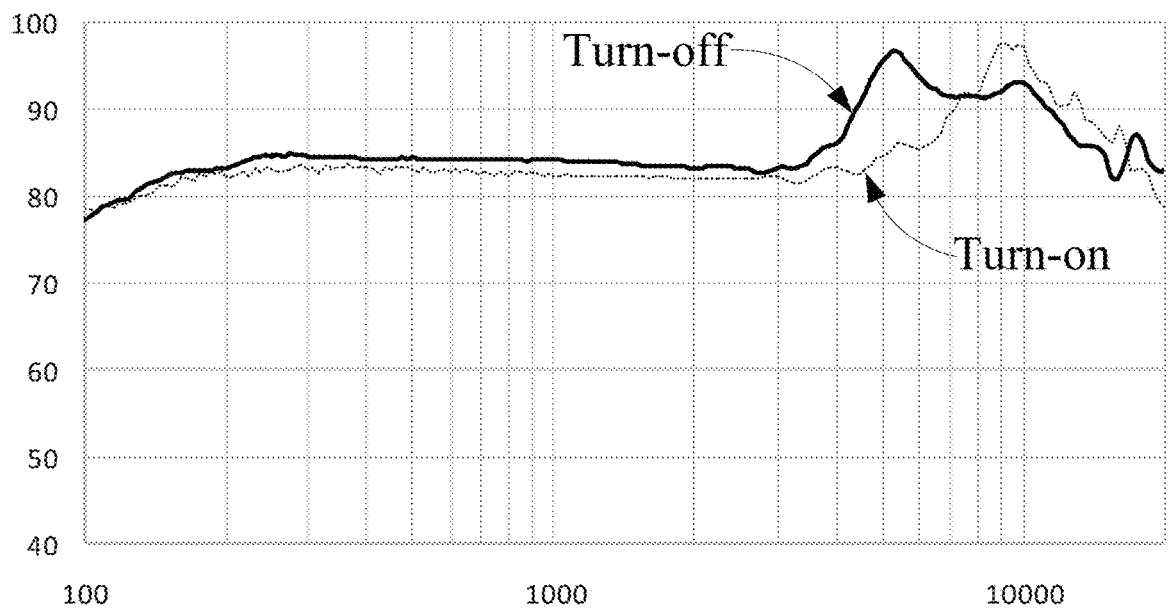
FIG. 58 is a schematic diagram illustrating a frequency response curve of an earphone according to some embodiments of the present disclosure.

Based on the detailed description mentioned above, in order to shift the resonant frequency of the second sound to the high frequency as much as possible, the rear cavity 300 may adopt the same or similar technical solution as the front cavity 200, which may not be repeated herein. A main difference from the front cavity 200 may be that for a standing wave, the rear cavity 300 may destroy a high pressure region of the sound field in the rear cavity 300 to shorten the wavelength of the standing wave in the rear cavity 300, thereby making the peak resonant frequency of the second lowest resonant peak of the medium-high frequency as large as possible. In combination with FIG. 47, the third opening 302 may be arranged in the high pressure region of the sound field in the rear cavity 300. For example, the third opening 302 and the second opening 301 may be arranged on opposite sides of the core 14. FIG. 58 is a schematic diagram illustrating a frequency response curve of an earphone according to some embodiments of the present disclosure. Merely by way of example, in combination with FIG. 58, the peak resonance frequency of the second lowest resonant peak of the medium-high frequency when the third opening 302 is in the open state (denoted as "Turn-on") may be shifted to a high frequency compared to the peak resonance frequency of the second lowest resonance peak of the medium-high frequency when the third opening 302 is in the closed state (denoted as "Turn-off"), and a shift amount may be greater than or equal to 1 kHz. Further, an effective area of the third opening 302 may be smaller than an effective area of the second opening 301 so as to adjust the peak resonance frequency of the second lowest resonance peak of the medium-high frequency. In some embodiments, the size of the second opening 301 in the major axis direction of the core 14 may be larger than the size of the first opening 201 in the major axis direction of the core 14.

Figure 57:
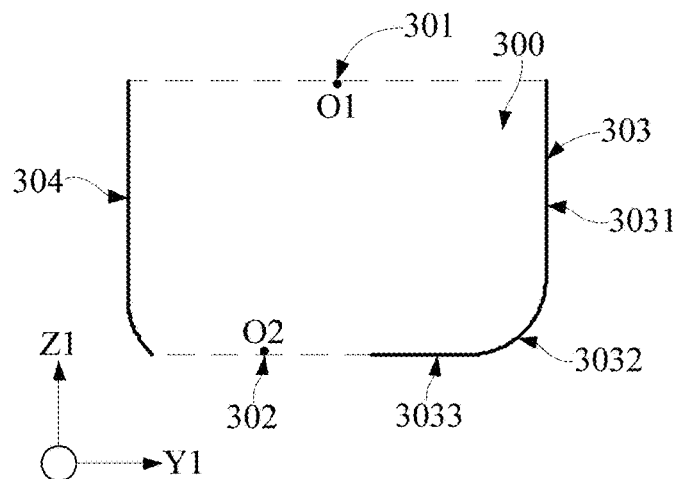
FIG. 57 is a schematic diagram illustrating a structure of a rear cavity of an earphone according to some embodiments of the present disclosure.

FIG. 57 is a schematic diagram illustrating a structure of a rear cavity of an earphone according to some embodiments of the present disclosure. Based on the related description mentioned above, in combination with FIG. 57, the rear cavity 300 may have a first rear cavity surface 303 and a second rear cavity surface 304 spaced apart from each other in the major axis direction of the core 14. The second opening 302 and the third opening may be spaced apart from each other in the minor axis direction of the core 14. An actual area of the third opening 302 may be smaller than an actual area of the second opening 301, so that an effective area of the third opening 302 may be smaller than an effective area of the second opening 301. A section of at least one of the first rear cavity surface 303 and the second rear cavity surface 304 close to the third opening 302 may be arranged in an arc shape along the vibration direction of the core 14 to avoid sharp structures such as a right angle, a sharp corner etc., on the inner wall of the enclosed rear cavity 300, which is beneficial to eliminate standing waves. Further, at least one of the first cavity surface 303 and the third cavity surface 305 may be arranged in an arc shape along the minor axis direction, which is also beneficial to eliminate standing waves.

Further, the opening direction of the second opening 301 may face the top of the head of the user. For example, an angle between the opening direction and the vertical axis may be between 0° and 10°, so as to allow the second opening 301 to be farther away from the ear hole than the third opening 302. As a result, it can be difficult for the user and other people in the surrounding environment to hear the sound output to the outside of the earphone 10 through the second opening 301, thereby reducing sound leakage. The opening direction of the second opening 301 may refer to a direction where the average normal line is located. Correspondingly, the second opening 301 may have the first center (for example O1) in the major axis direction of the core 14. The third opening 302 may have the second center (such as O2) in the major axis direction. The second center may be farther from the center of the first opening 201 than the first center in the major axis direction, so as to increase the distance between the third opening 302 and the first opening 201 as much as possible, thereby weakening the anti-phase cancellation between the sound output to the outside of the earphone 10 through the third opening 302 and the sound transmitted to the ear through the first opening 201. The first rear cavity surface 303 may be closer to the connecting component 12 than the second rear cavity surface 304. A radius of curvature of at least a part of the first rear cavity surface 303 may be greater than a radius of curvature of the corresponding part of the second rear cavity surface 204.

Merely by way of example, the first rear cavity surface 303 may include a first sub-rear cavity surface 3031, a second sub-rear cavity surface 3032, and a third sub-rear cavity surface 3033 that are sequentially connected. The first sub-rear cavity surface 3031 may be closer to the second opening 301 and farther from the second rear cavity surface 304 than the third sub-rear cavity surface 3033. At least the second sub-rear cavity surface 3032 of the second sub-rear cavity surface 3032 and the third sub-rear cavity surface 3033 may be arranged in an arc shape. For example, the second sub-rear cavity surface 3032 may be arranged in a shape of an arc. A radius of the arc may be greater than or equal to 2 mm. In a direction in which the second opening 301 points to the third opening 302, an angle between a tangent line of the second sub-rear cavity surface 3032 and the minor axis direction of the core 14 may gradually increase, and an angle between a tangent line of the third sub-rear cavity surface 3033 and the minor axis direction may keep unchanged or gradually decrease.

Figure 59:
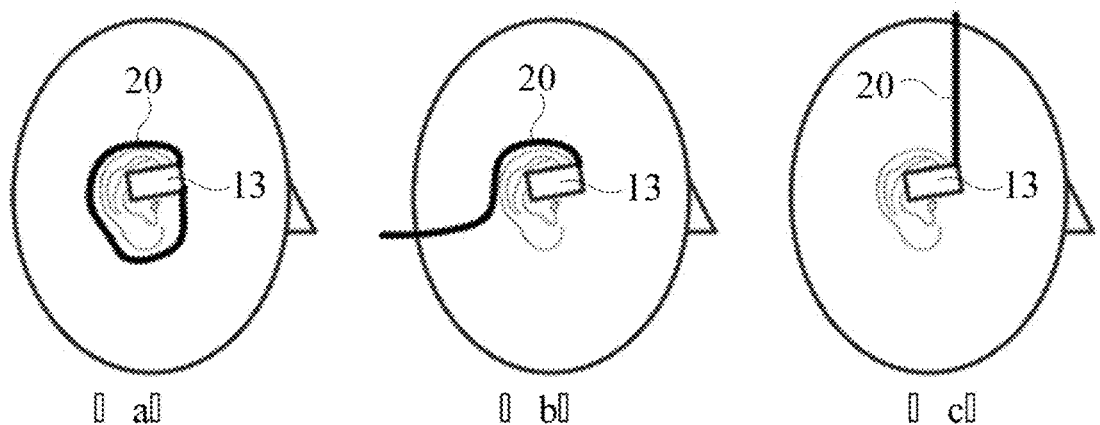
FIG. 59 is a schematic diagram illustrating structures of earphones in a wearing state respectively according to some embodiments of the present disclosure.

It should be noted that the fixing assembly 20 being connected to the holding component 13 described in the present disclosure may be mainly used to cause the holding component 13 to contact the front side of the ear in the wearing state. In some embodiments, the fixing assembly 20 may include the hook-shaped component 11 and the connecting component 12 connected to the hook-shaped component 11 and the holding component 13. The related structure and the connection relationship may refer to the detailed description for any embodiment of the present disclosure, which may not be repeated herein. FIG. 59 is a schematic diagram illustrating structures of earphones in a wearing state respectively according to some embodiments of the present disclosure. In other embodiments, in combination with FIG. 59, the fixing assembly 20 may be arranged in an annular shape and around the ear, for example, as shown in diagram (a) in FIG. 59. In some embodiments, the fixing assembly 20 may also be arranged as an ear hook and a rear hook structure and around the rear side of the head, as shown in diagram (b) in FIG. 59. In some embodiments, the fixing assembly 20 may also be arranged into a head beam structure and around the top of the head, as shown in diagram (c) in FIG. 59. Further, the technical solutions described in the present disclosure may be applied to an earphone, a hearing aid, audio glasses, or other smart glasses such as AR, VR, MR, or the like.

The descriptions may be only part of the embodiments of the present disclosure and may not limit the scope of the present disclosure. Any equivalent device or equivalent process transformation made by using the illustration for the description and drawings of the present disclosure, or directly or indirectly used in other related technical fields, may be included in the scope of the present disclosure with the same principles.

What is claimed is:

1. An earphone, comprising: a hook-shaped component and a holding component, wherein when the earphone is in a wearing state,
   the hook-shaped component is configured to hang between a rear side of an ear of a user and a head of the user, wherein an elastic metal wire is arranged inside the hook-shaped component, the elastic metal wire has a major axis direction and a minor axis direction orthogonal to each other on a cross section of the elastic metal wire, and a size of the elastic metal wire in the major axis direction is greater than a size of the elastic metal wire in the minor axis direction, and
   the holding component is configured to contact a front side of the ear to cooperate with the hook-shaped component to clamp the ear the user, wherein the holding component includes a core housing configured to accommodate a core for converting an electrical signal into a vibration signal, a bottom wall of the core housing away from the ear is configured with a flexible touch circuit board including a touch part, the touch part is configured to receive touch operations, and a ratio of an area of the touch part of the flexible touch circuit board to an area of the bottom wall of the core housing is greater than 70%.

2. The earphone of claim 1, further comprising:
   a connecting component configured to connect the hook-shaped component and the holding component and extend from the head along a coronal axis of the user towards an outside of the head to cooperate with the hook-shaped component to provide the holding component with a pressing force on the front side of the ear.

3. The earphone of claim 2, wherein in a direction from a first connection point between the hook-shaped component and the connecting component to a free end of the hook-shaped component,
   the hook-shaped component is bent toward the rear side of the ear to form a first contact point with the rear side of the ear, and
   the holding component forms a second contact point with the front side of the ear, wherein a distance between the first contact point and the second contact point along an extending direction of the connecting component in a natural state is smaller than that in a wearing state to provide the holding component with the pressing force on the front side of the ear.

4. The earphone of claim 3, wherein the hook-shaped component further forms a third contact point with the rear side of the ear, the third contact point being located between the first connection point and the first contact point and being closer to the first connection point, wherein
   a distance between projections of the first contact point and the third contact point on a reference plane perpendicular to the extending direction of the connecting component in the natural state is smaller than that in the wearing state.

5. The earphone of claim 2, wherein in a direction from a first connection point between the hook-shaped component and the connecting component to a free end of the hook-shaped component, the hook-shaped component is bent toward the head to form a first contact point and a second contact point with the head, wherein
   the first contact point is located between the second contact point and the first connection point, so that the hook-shaped component forms a lever structure with the first contact point as a fulcrum; and
   a force directed to the outside of the head and provided by the head at the second contact point causes a force directed to the head at the first connection point by the lever structure to provide the holding component with the pressing force on the front side of the ear through the connecting component.

6. The earphone of claim 2, wherein in the wearing state, the connecting component is connected to a lower edge of the holding component.

7. The earphone of claim 2, wherein the holding component has a thickness direction, a length direction, and a height direction orthogonal to each other, the thickness direction is configured as a direction in which the holding component is close to or away from the ear in the wearing state, and the height direction is configured as a direction in which the holding component is close to or away from a top of the user's head in the wearing state, wherein
   in a natural state, and viewed along the height direction, the holding component is at least spaced apart from a section of the hook-shaped component close to the connecting component in the thickness direction; and
   the connecting component is arranged in a shape of an arc and connected between the holding component and the hook-shaped component.

8. The earphone of claim 7, wherein in the thickness direction, a minimum distance between the section of the hook-shaped component close to the connecting component and the holding component is greater than 0 and smaller than or equal to 5 mm.

9. The earphone of claim 7, wherein
edges of the section of the hook-shaped component close to the connecting component, the connecting component, and the holding component facing the ear are arranged in a shape of a circuitous arc; and
in a reference direction that passes through a roundabout inflection point of the circuitous arc and is parallel to the length direction, a minimum width of the circuitous arc along the thickness direction at a position 3 mm away from the roundabout inflection point is in a range of 1 mm to 5 mm.

10. The earphone of claim 7, wherein a side of the holding component facing the ear is configured with a sound hole, and a distance between a center of the sound hole and the section of the hook-shaped component close to the connecting component in the thickness direction is in a range of 3 mm to 6 mm.

11. The earphone of claim 7, wherein a side of the holding component facing the ear includes a first region and a second region, wherein
the first region is configured with a sound hole; and
the second region is farther away from the connecting component than the first region and is more protruding toward the ear than the first region, so as to allow the sound hole to be spaced from the ear in the wearing state.

12. The earphone of claim 11, wherein a distance between the second region and the section of the hook-shaped component close to the connecting component in the thickness direction is in a range of 1 mm to 5 mm.

13. The earphone of claim 12, wherein an orthographic projection of the section of the hook-shaped component close to the connecting component in the thickness direction partially overlaps the second region.

14. The earphone of claim 11, wherein a maximum protrusion height of the second region relative to the first region in the thickness direction is greater than or equal to 1 mm.

15. The earphone of claim 1, wherein the holding component extends and is held in a concha boat of the ear.

16. The earphone of claim 1, wherein the elastic metal wire is in a shape of an arc in the minor axis direction, and a ratio of a height of the arc to the size of the elastic metal wire in the major axis direction is within a range of 0.1-0.4.

17. The earphone of claim 1, further including an extending component, wherein
the extending component is arranged on the holding component, and extends into any one of a concha cavity, a concha boat, a triangular fossa, and a scapha of the ear in the wearing state; or
the extending component is arranged on the hook-shaped component, and hooks a helix or an antihelix of the ear in the wearing state.

18. The earphone of claim 17, wherein the extending component is sleeved on the holding component through an elastic sleeve.

19. The earphone of claim 1, wherein the holding component is in contact with an antihelix of the ear.

* * * * *